US012681623B2

(12) United States Patent
Heath et al.

(10) Patent No.: US 12,681,623 B2
(45) Date of Patent: Jul. 14, 2026

(54) USER EXPERIENCE PLATFORM FOR INTERACTING WITH AN ORGANIC MATTER PROCESSING APPARATUS

(71) Applicant: Chewie Labs LLC, San Bruno, CA (US)

(72) Inventors: James Heath, San Francisco, CA (US); Kevin Peterson, San Francisco, CA (US); Matthew Lee Rogers, San Francisco, CA (US); Harry Tannenbaum, San Francisco, CA (US); Kai Ju Liu, San Bruno, CA (US); John Thompson, Daly City, CA (US); Kristen Rose Virdone, San Francisco, CA (US); Azita Sayadi, San Francisco, CA (US); Alyssa Noelle Pollack, Lone Tree, CO (US); Kelly Joan Veit, San Francisco, CA (US); Max Victor Ogryzko, San Francisco, CA (US); Maria Koevska, San Bruno, CA (US)

(73) Assignee: Chewie Labs LLC

( * ) Notice: Subject to any disclaimer, the term of this patent is extended or adjusted under 35 U.S.C. 154(b) by 207 days.

(21) Appl. No.: 18/405,393

(22) Filed: Jan. 5, 2024

(65) Prior Publication Data

US 2024/0231573 A1 Jul. 11, 2024

Related U.S. Application Data

(60) Provisional application No. 63/478,948, filed on Jan. 8, 2023.

(51) Int. Cl.
| | |
|---|---|
| *G06F 3/0484* | (2022.01) |
| *B65F 1/14* | (2006.01) |
| *G06F 3/0481* | (2022.01) |

(52) U.S. Cl.
CPC .............. *G06F 3/0484* (2013.01); *B65F 1/14* (2013.01); *G06F 3/0481* (2013.01); *B65F 2210/128* (2013.01); *B65F 2210/165* (2013.01)

(58) Field of Classification Search
None
See application file for complete search history.

(56) References Cited

U.S. PATENT DOCUMENTS

| | | |
|---|---|---|
| 5,340,536 A | 8/1994 | Datar et al. |
| 5,634,600 A | 6/1997 | Kubota et al. |

(Continued)

FOREIGN PATENT DOCUMENTS

| | | |
|---|---|---|
| CN | 104867024 | 8/2015 |
| EP | 0791568 | 8/1997 |

(Continued)

OTHER PUBLICATIONS

Jayalakshmi et al., "Waste to Wealth—A Novel Approach for Food Waste Management"; published in: 2017 IEEE International Conference on Electrical, Instrumentation and Communication Engineering (ICEICE); Date of Conference: Apr. 27-28, 2017.

(Continued)

*Primary Examiner* — Tuyetlien T Tran
(74) *Attorney, Agent, or Firm* — Van Court & Aldridge LLP

(57) ABSTRACT

Embodiments disclosed herein provide a user experience to interact with an organic matter processing apparatus (OMPA) that converts organic matter into a ground and dried shelf-stable product. The user experience can be accessed via an application that operates on a mobile device or a website. The application can be used to set an operational schedule of the OMPA, start or stop an OMPA processing cycle, observe a status of the OMPA, observe statistics related to the OMPA, request supplies, access a (Continued)

guide to assess whether certain organic matter can be safely added to the OMPA, and alert the user of potential issues with the OMPA.

24 Claims, 46 Drawing Sheets

(56) References Cited

U.S. PATENT DOCUMENTS

| | | | | |
|---|---|---|---|---|
| 6,150,939 | A | 11/2000 | Lin | |
| 7,240,865 | B2 | 7/2007 | Choi | |
| 7,415,375 | B2* | 8/2008 | Shakman | G01G 23/3735 |
| | | | | 715/764 |
| 9,308,535 | B2 | 4/2016 | Delgado et al. | |
| 9,597,620 | B2 | 3/2017 | Verdegan et al. | |
| 9,895,726 | B1 | 2/2018 | Atkinson et al. | |
| 10,065,196 | B1 | 9/2018 | Tran et al. | |
| 10,906,046 | B2 | 2/2021 | Crepeau et al. | |
| 10,955,284 | B2* | 3/2021 | Balachandran | G01G 17/00 |
| 11,238,220 | B1* | 2/2022 | Fletcher | G06F 16/88 |
| 11,241,694 | B2 | 2/2022 | Crepeau et al. | |
| 11,278,908 | B2 | 3/2022 | Crepeau et al. | |
| 11,389,804 | B2 | 7/2022 | Hayman et al. | |
| 11,541,397 | B2 | 1/2023 | Crepeau et al. | |
| 12,128,009 | B1* | 10/2024 | Lyons | G01F 1/22 |
| 12,251,705 | B2* | 3/2025 | Maxwell | B01D 46/4227 |
| 2003/0155228 | A1 | 8/2003 | Mills | |
| 2004/0175303 | A1 | 9/2004 | Lin | |
| 2004/0251339 | A1 | 12/2004 | Strutz | |
| 2004/0265197 | A1 | 12/2004 | Lin | |
| 2006/0015289 | A1* | 1/2006 | Shakman | G01G 23/3735 |
| | | | | 702/173 |
| 2007/0190212 | A1 | 8/2007 | Lee | |
| 2008/0067270 | A1 | 3/2008 | Strutz | |
| 2009/0113791 | A1 | 5/2009 | Bertin et al. | |
| 2009/0200180 | A1 | 8/2009 | Capote | |
| 2010/0140248 | A1 | 6/2010 | Yi et al. | |
| 2011/0020184 | A1 | 1/2011 | Sun | |
| 2011/0040660 | A1* | 2/2011 | Allison | G06Q 30/02 |
| | | | | 705/28 |
| 2011/0062259 | A1 | 3/2011 | Gregoire | |
| 2011/0151553 | A1 | 6/2011 | Cruson et al. | |
| 2012/0021504 | A1 | 1/2012 | Bradlee | |
| 2012/0034350 | A1 | 2/2012 | Gard et al. | |
| 2012/0298658 | A1 | 11/2012 | Bosetti et al. | |
| 2013/0217111 | A1 | 8/2013 | Chang | |
| 2013/0263786 | A1 | 10/2013 | Meisel, III et al. | |
| 2014/0117126 | A1 | 5/2014 | Ceru et al. | |
| 2014/0134299 | A1 | 5/2014 | Guidorzi | |
| 2015/0196920 | A1 | 7/2015 | Celli et al. | |
| 2015/0376882 | A1 | 12/2015 | Park | |
| 2016/0022112 | A1 | 1/2016 | Davenport | |
| 2016/0134431 | A1 | 5/2016 | Ebrom | |
| 2016/0207845 | A1 | 7/2016 | Delgado et al. | |
| 2016/0295906 | A1 | 10/2016 | Jacobsen et al. | |
| 2016/0316100 | A1* | 10/2016 | Hwang | G06F 3/1236 |
| 2016/0355446 | A1* | 12/2016 | Wilkinson | C05F 17/971 |
| 2017/0010149 | A1* | 1/2017 | Whitman | G06T 7/0002 |
| 2017/0011363 | A1* | 1/2017 | Whitman | G01G 19/083 |
| 2017/0054866 | A1* | 2/2017 | Cho | H04N 1/32448 |
| 2017/0155720 | A1* | 6/2017 | Song | H04B 1/3822 |
| 2017/0197857 | A1 | 7/2017 | Whitener et al. | |
| 2017/0220772 | A1* | 8/2017 | Vleugels | G16H 40/63 |
| 2017/0226466 | A1 | 8/2017 | Grillo et al. | |
| 2017/0260111 | A1 | 9/2017 | Maghas et al. | |
| 2017/0349501 | A1 | 12/2017 | Buzruk | |
| 2018/0093814 | A1 | 4/2018 | Espinosa | |
| 2018/0129360 | A1* | 5/2018 | Suh | H04M 1/72412 |
| 2018/0129379 | A1* | 5/2018 | Suh | C12C 13/00 |
| 2018/0148391 | A1 | 5/2018 | Ashbee et al. | |
| 2019/0030544 | A1* | 1/2019 | Kratzer, III | B02C 25/00 |
| 2019/0031436 | A1* | 1/2019 | Aggarwala | B65F 1/10 |
| 2019/0083989 | A1 | 3/2019 | Tran et al. | |
| 2019/0152698 | A1* | 5/2019 | Zhao | B65F 1/1638 |
| 2019/0311364 | A1* | 10/2019 | Dunjic | G06Q 20/4014 |
| 2020/0001389 | A1 | 1/2020 | Ryan et al. | |
| 2020/0082354 | A1* | 3/2020 | Kurani | G01K 1/026 |
| 2020/0108428 | A1* | 4/2020 | Cummings | G01G 23/3735 |
| 2020/0147617 | A1 | 5/2020 | Atkinson et al. | |
| 2020/0148604 | A1 | 5/2020 | Atkinson et al. | |
| 2020/0189844 | A1* | 6/2020 | Sridhar | H04W 4/80 |
| 2020/0215135 | A1* | 7/2020 | Wysocki | B01D 11/0288 |
| 2020/0353473 | A1 | 11/2020 | Hayman et al. | |
| 2020/0353474 | A1 | 11/2020 | Crepeau et al. | |
| 2021/0038041 | A1* | 2/2021 | Pruiett | A47L 11/4088 |
| 2021/0154676 | A1 | 5/2021 | Crepeau et al. | |
| 2021/0188541 | A1* | 6/2021 | Kurani | G06Q 10/08 |
| 2021/0217156 | A1* | 7/2021 | Balachandran | G06N 20/10 |
| 2021/0330555 | A1* | 10/2021 | Wysocki | A61J 3/00 |
| 2022/0001389 | A1* | 1/2022 | Maxwell | B02C 18/0092 |
| 2022/0139549 | A1* | 5/2022 | Emmons | G16H 40/67 |
| | | | | 340/573.1 |
| 2022/0242799 | A1 | 8/2022 | Ying et al. | |
| 2022/0270238 | A1* | 8/2022 | Mc Donnell | G06V 20/52 |
| 2022/0287531 | A1* | 9/2022 | Ng | A47L 9/2894 |
| 2022/0347693 | A1 | 11/2022 | Hayman et al. | |
| 2023/0046272 | A1* | 2/2023 | Tao | H04N 7/183 |
| 2023/0050156 | A1* | 2/2023 | Yu | G16C 20/80 |
| 2023/0084646 | A1* | 3/2023 | Rogers | F26B 3/04 |
| | | | | 95/10 |
| 2023/0106264 | A1* | 4/2023 | Fudge | H01M 8/16 |
| | | | | 210/615 |
| 2023/0142555 | A1 | 5/2023 | Hotte et al. | |
| 2023/0149939 | A1 | 5/2023 | Crepeau et al. | |
| 2023/0206266 | A1* | 6/2023 | Pearl | G06Q 30/0207 |
| | | | | 705/14.1 |
| 2023/0264924 | A1* | 8/2023 | Saito | B66B 1/14 |
| | | | | 187/384 |
| 2023/0363585 | A1* | 11/2023 | Sanandan | A47J 37/1285 |
| 2024/0019531 | A1* | 1/2024 | Johar | H04W 4/80 |
| 2024/0121336 | A1* | 4/2024 | Dotten | H04M 1/72406 |
| 2024/0189874 | A1* | 6/2024 | Satwicz | H04W 4/80 |
| 2024/0212815 | A1* | 6/2024 | Lafauci | G16H 20/10 |
| 2024/0265353 | A1* | 8/2024 | Sahara | G06Q 50/10 |

FOREIGN PATENT DOCUMENTS

| | | | |
|---|---|---|---|
| JP | 2002-001262 | | 1/2002 |
| JP | 2004-216253 | | 12/2004 |
| JP | 2006255592 | | 9/2006 |
| KR | 19980047631 | | 9/1998 |
| KR | 100692243 | | 3/2007 |
| KR | 100694645 | B1 | 3/2007 |
| KR | 100694646 | B1 | 3/2007 |
| KR | 20090123375 | | 12/2009 |
| KR | 101017615 | B1 | 2/2011 |
| KR | 101017616 | B1 | 2/2011 |
| KR | 101053035 | B1 | 8/2011 |
| KR | 101187381 | | 10/2012 |
| KR | 101332453 | | 11/2013 |
| KR | 101461608 | | 12/2014 |
| KR | 20150112689 | | 10/2015 |
| KR | 102474495 | B1 | 4/2016 |
| KR | 20160044110 | | 4/2016 |
| KR | 101866863 | | 6/2018 |
| KR | 300966490 | S | 7/2018 |
| KR | 101882829 | B1 | 8/2018 |
| KR | 101884662 | B1 | 8/2018 |
| KR | 101921624 | B1 | 11/2018 |
| KR | 101941620 | | 1/2019 |
| KR | 301095230 | S | 2/2021 |
| KR | 301109396 | S | 5/2021 |
| KR | 301109397 | S | 5/2021 |
| KR | 301109403 | S | 5/2021 |
| KR | 301109404 | S | 5/2021 |
| KR | 301154947 | S | 3/2022 |
| KR | 301140601 | S | 12/2022 |
| KR | 301202238 | S | 2/2023 |
| KR | 1020230060939 | A | 5/2023 |
| KR | 301223966 | S | 11/2023 |
| WO | WO2008030997 | | 3/2008 |
| WO | WO2009157744 | | 12/2009 |

(56) References Cited

FOREIGN PATENT DOCUMENTS

| | | |
|---|---|---|
| WO | WO2015182929 | 3/2015 |
| WO | WO2016060290 | 4/2016 |
| WO | WO2016102947 | 6/2016 |
| WO | WO2017083944 | 5/2017 |
| WO | WO2022055212 A1 | 3/2022 |

OTHER PUBLICATIONS

Zhu, "Food Waste Drum Sieve Design"; Mar. 26, 2015; Technology, Communication and Transport; Sovonia University of Applied Sciences.

* cited by examiner

700

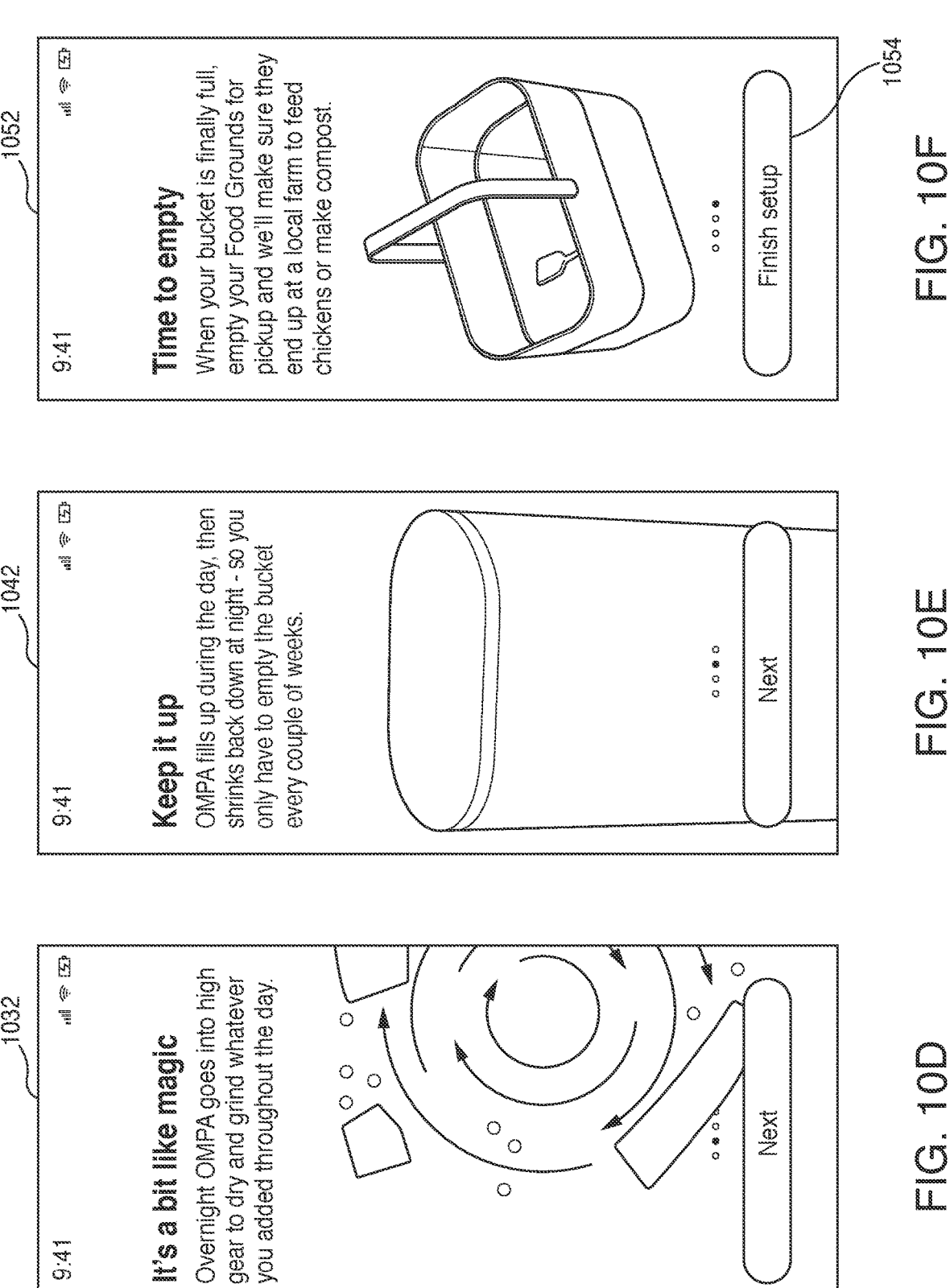

It's a bit like magic

Overnight OMPA goes into high gear to dry and grind whatever you added throughout the day.

Next

Keep it up

OMPA fills up during the day, then shrinks back down at night - so you only have to empty the bucket every couple of weeks.

Next

Time to empty

When your bucket is finally full, empty your Food Grounds for pickup and we'll make sure they end up at a local farm to feed chickens or make compost.

Finish setup

Plug in OMPA to get started

After a few minutes, the LED light should start pulsing blue.

Next

1124

1122

1113

9:41

Insert the charcoal odor filter

It's as easy as:
1. Push open the back cover
2. Remove the plastic seal on the top of the filter
3. Place the filter in its stand Next

1114

1112

1113

9:41

Time to set up your OMPA

Hello

Set up OMPA

1104

1102

1170

Great!

OMPA is connected
and ready to go.

Next

1174

1160

**Do you see the orange
lock icon?**

Make sure the icon below
matches the icon on your OMPA

Yes, they match

1164

I see a different colored light

1150

Looking for OMPA...

Can not find OMPA? Get help

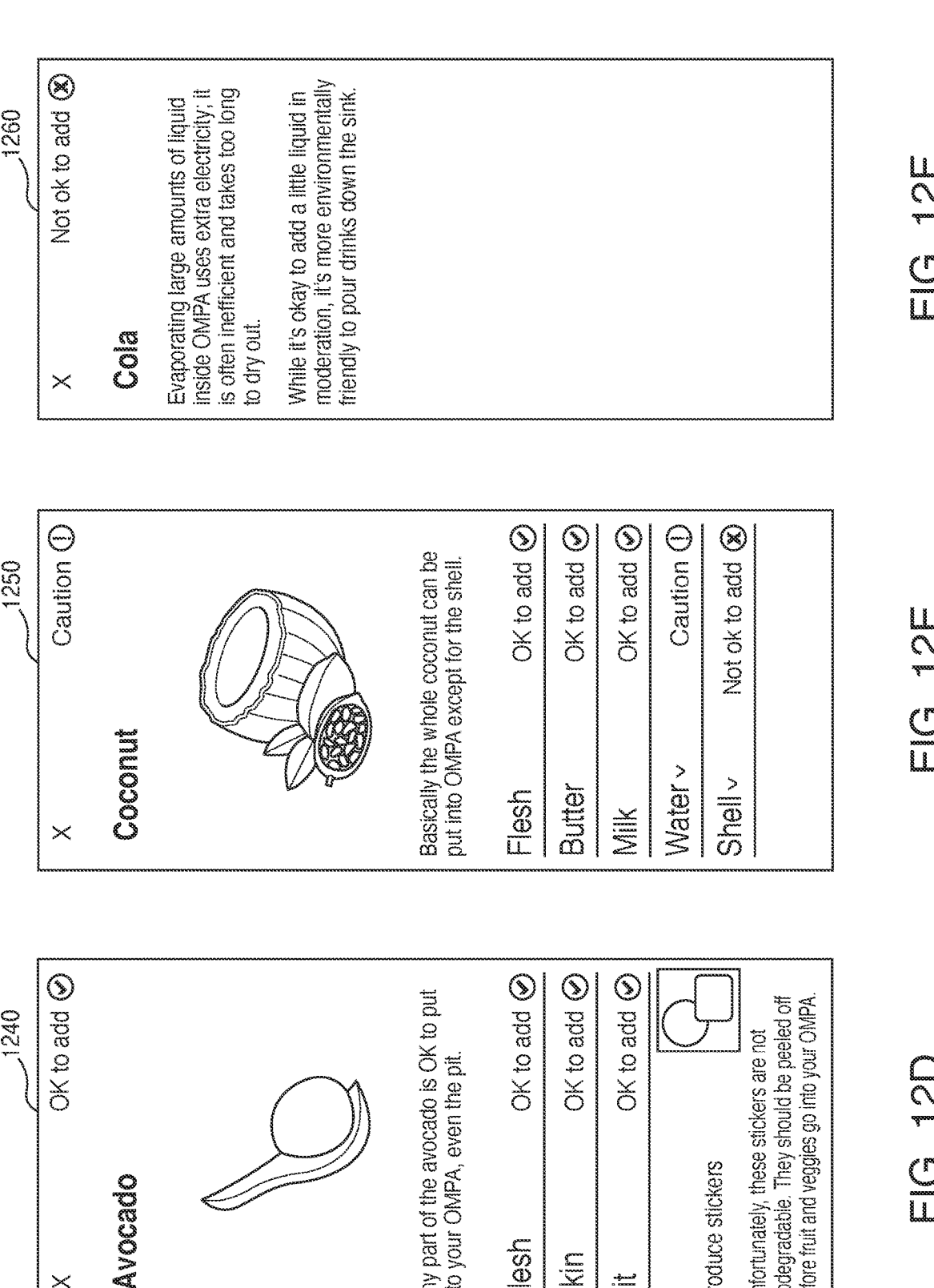

1240

X    Avocado    OK to add ⊘

Any part of the avocado is OK to put into your OMPA, even the pit.

| Flesh | OK to add ⊘ |
| Skin | OK to add ⊘ |
| Pit | OK to add ⊘ |

Produce stickers

Unfortunately, these stickers are not biodegradable. They should be peeled off before fruit and veggies go into your OMPA.

X    Coconut    Caution ⓘ

Basically the whole coconut can be put into OMPA except for the shell.

| Flesh | OK to add ⊘ |
| Butter | OK to add ⊘ |
| Milk | OK to add ⊘ |
| Water ⌄ | Caution ⓘ |
| Shell ⌄ | Not ok to add ⊗ |

X    Cola    Not ok to add ⊗

Evaporating large amounts of liquid inside OMPA uses extra electricity, it is often inefficient and takes too long to dry out.

While it's okay to add a little liquid in moderation, it's more environmentally friendly to pour drinks down the sink.

FIG. 12F

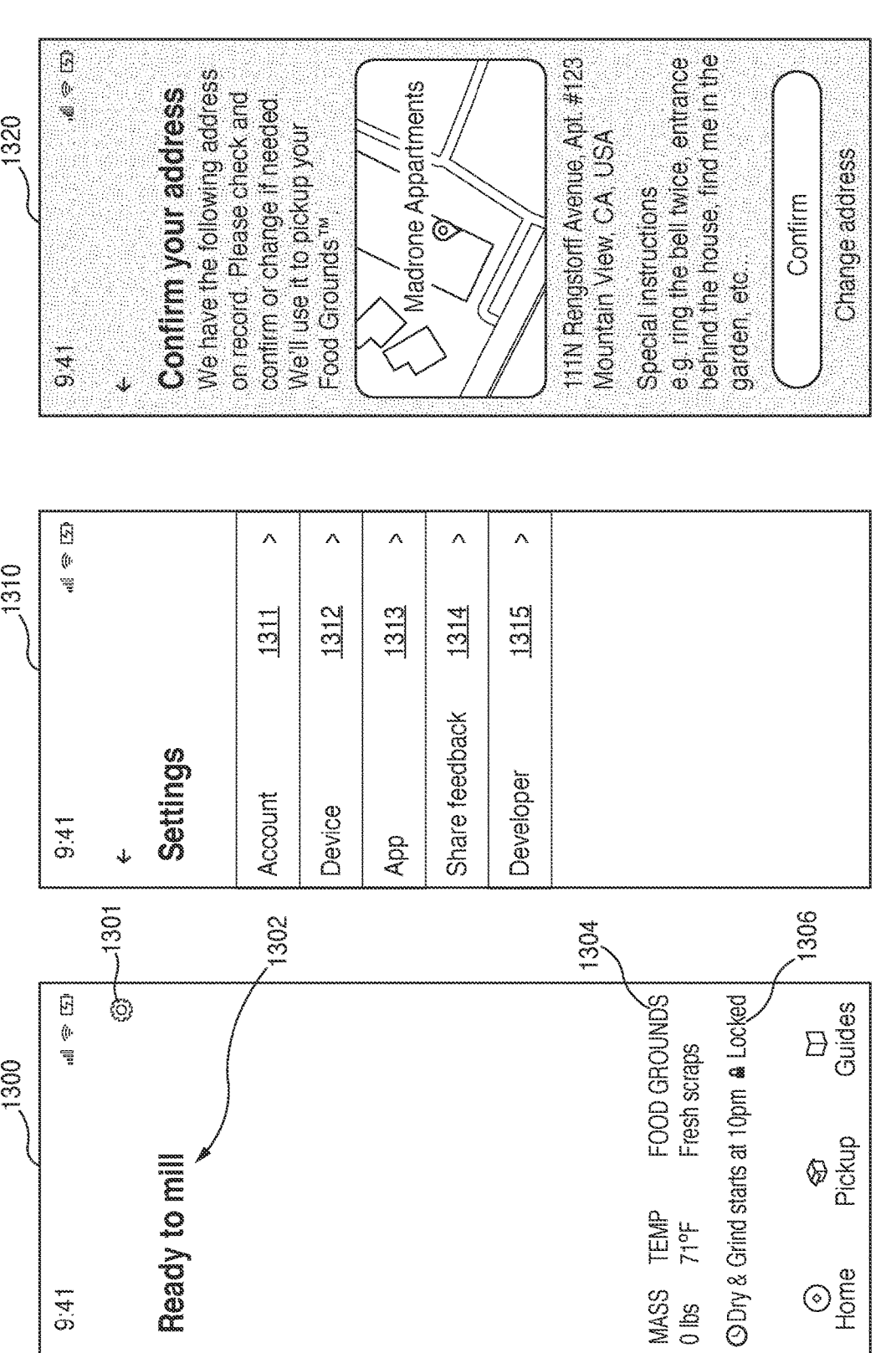

1300

1301

1302

9:41

Ready to mill

MASS    TEMP    FOOD GROUNDS
0 lbs    71°F    Fresh scraps

1304

⏱ Dry & Grind starts at 10pm  🔒 Locked    1306

Home    Pickup    Guides

Settings

Account    1311    ⌄

Device    1312    ⌄

App    1313    ⌄

Share feedback    1314    ⌄

Developer    1315    ⌄

Confirm your address

We have the following address
on record. Please check and
confirm or change if needed.
We'll use it to pickup your
Food Grounds™

Madrone Appartments

111N Rengstorff Avenue Apt. #123
Mountain View, CA  USA

Special instructions
e.g. ring the bell twice, entrance
behind the house, find me in the
garden, etc.

Confirm

Change address

Something's not right

Contact support

Dry & Grind
Scheduled for 10:15pm

Home    Pickup    Guides

1440

9:41

Checking if the jam
has been cleared...
This may take a few minutes.

Paused                    Cancel

Quick mix

Home    Pickup    Guides

1430

9:41

OMPA is jammed and
needs some help

Unjamming OMPA    1431
Troubleshooting steps for
when unit is jammed    1434

Paused                    Cancel    1433

Dry & Grind    Sanitize    Cool down

Home    Pickup    Guides 1434    1432

1830

9:41

← Pickup

Your recent Food Grounds™ return

Arrived at our local facility

Before turning your Food Grounds™ into chicken feed, we will check it's quality to make sure they're not contaminated Interesting for you See how your Food Grounds™ turn into chicken feed Schedule another pickup ∨

Order additional Shipping boxes ∨

FAQs ∨

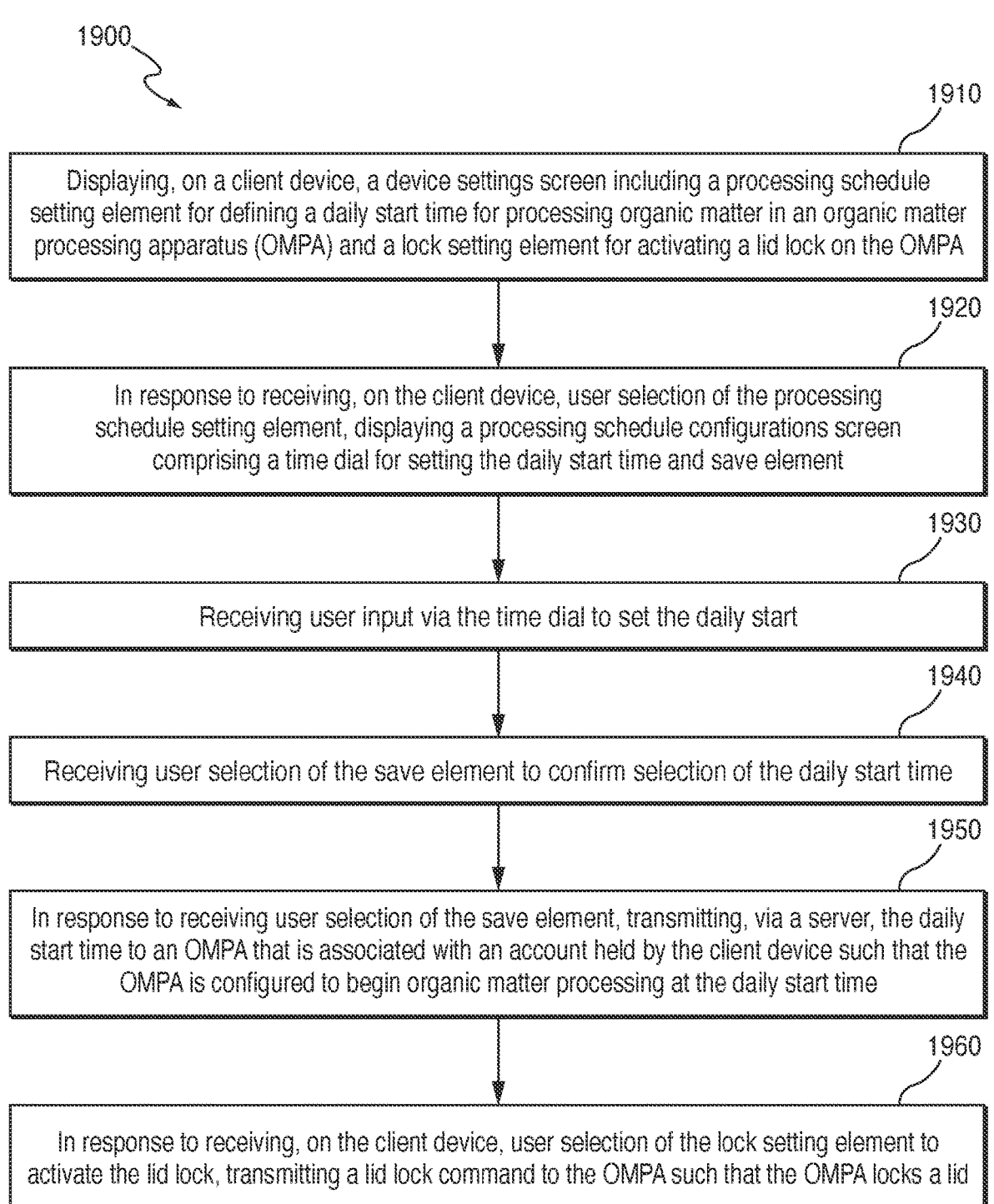

1900

1910

Displaying, on a client device, a device settings screen including a processing schedule setting element for defining a daily start time for processing organic matter in an organic matter processing apparatus (OMPA) and a lock setting element for activating a lid lock on the OMPA

1920

In response to receiving, on the client device, user selection of the processing schedule setting element, displaying a processing schedule configurations screen comprising a time dial for setting the daily start time and save element

1930

Receiving user input via the time dial to set the daily start

1940

Receiving user selection of the save element to confirm selection of the daily start time

1950

In response to receiving user selection of the save element, transmitting, via a server, the daily start time to an OMPA that is associated with an account held by the client device such that the OMPA is configured to begin organic matter processing at the daily start time

1960

In response to receiving, on the client device, user selection of the lock setting element to activate the lid lock, transmitting a lid lock command to the OMPA such that the OMPA locks a lid

FIG. 19

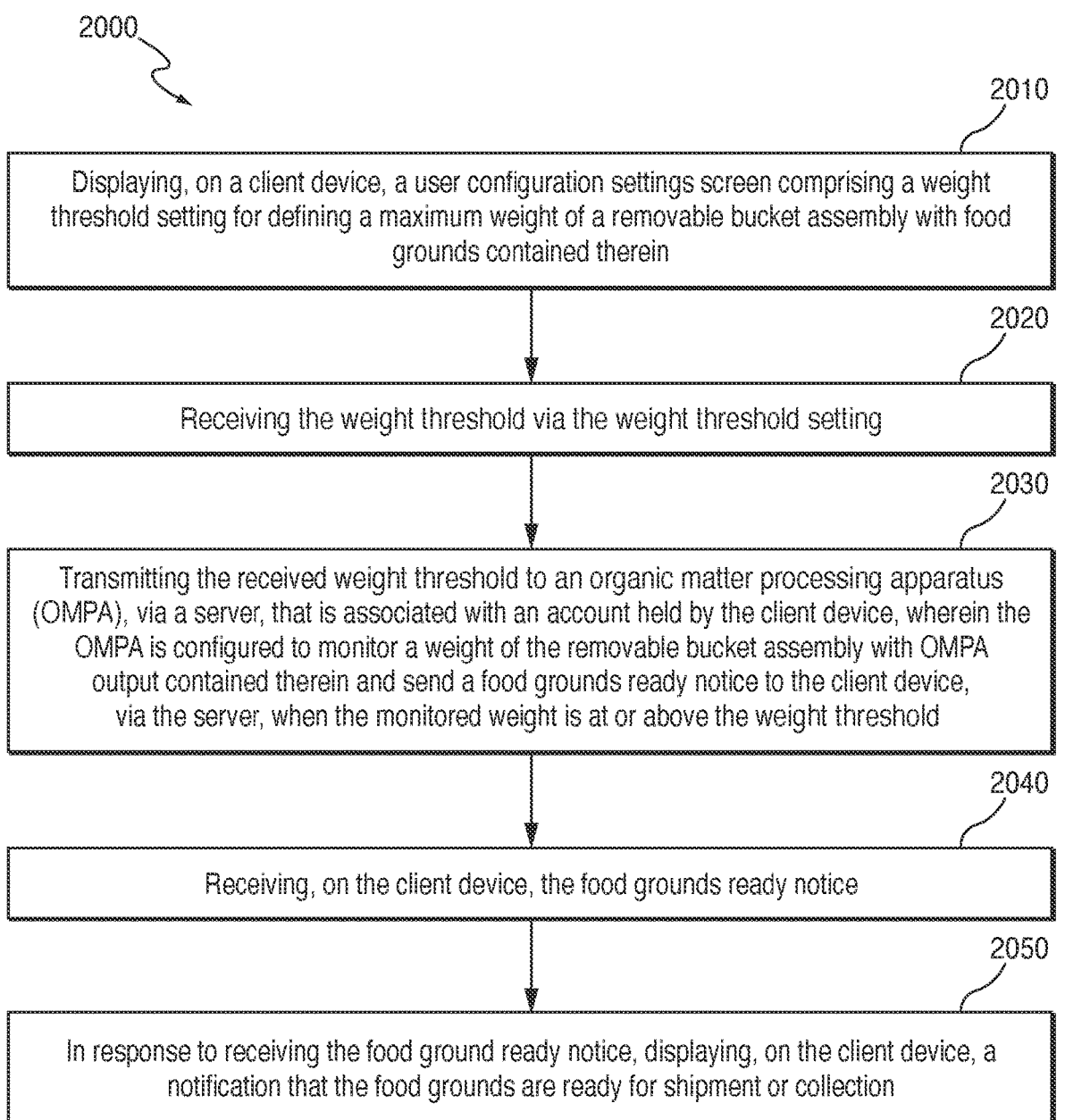

2000

2010

Displaying, on a client device, a user configuration settings screen comprising a weight threshold setting for defining a maximum weight of a removable bucket assembly with food grounds contained therein

2020

Receiving the weight threshold via the weight threshold setting

2030

Transmitting the received weight threshold to an organic matter processing apparatus (OMPA), via a server, that is associated with an account held by the client device, wherein the OMPA is configured to monitor a weight of the removable bucket assembly with OMPA output contained therein and send a food grounds ready notice to the client device, via the server, when the monitored weight is at or above the weight threshold

2040

Receiving, on the client device, the food grounds ready notice

2050

In response to receiving the food ground ready notice, displaying, on the client device, a notification that the food grounds are ready for shipment or collection

FIG. 20

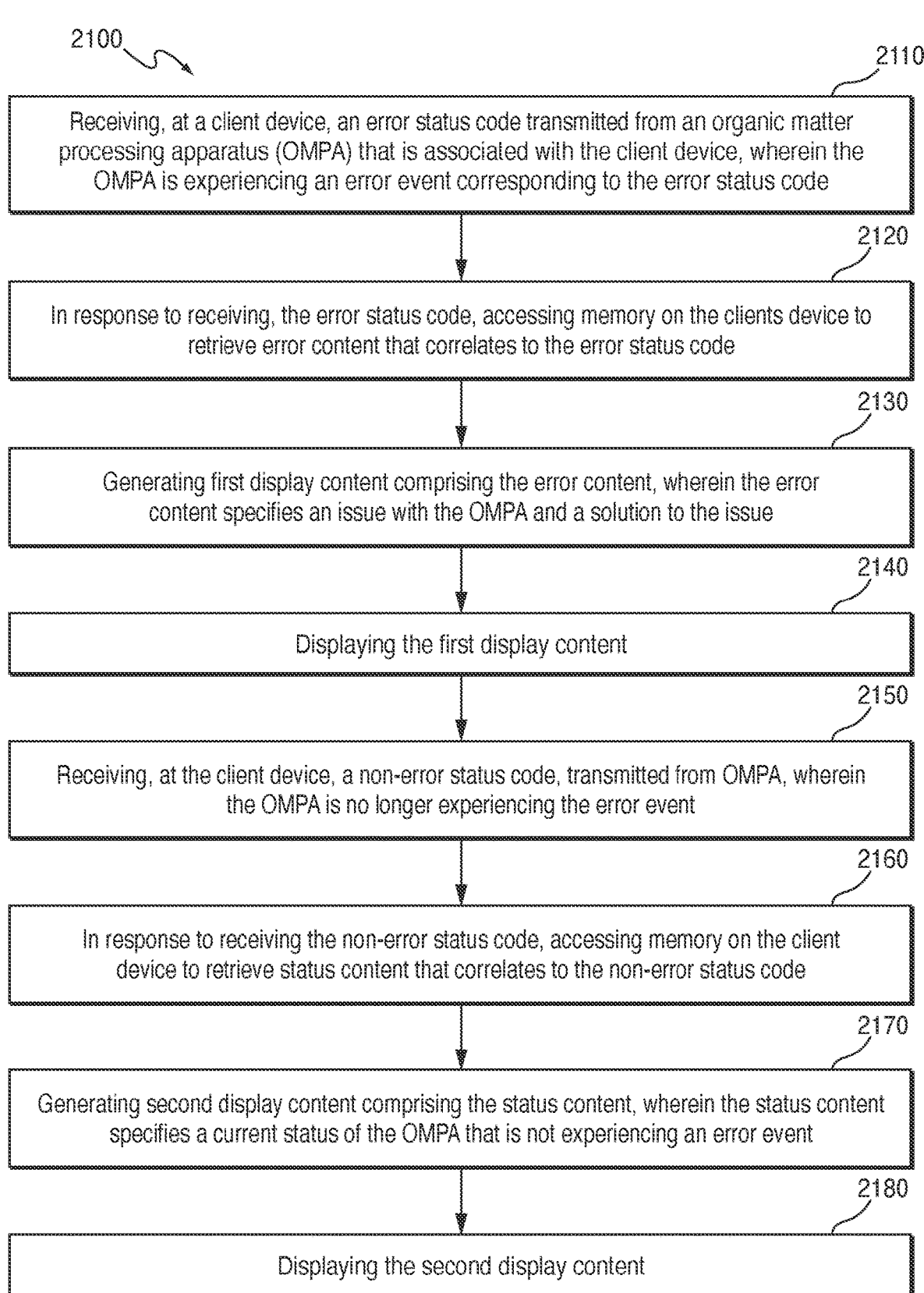

2100

2110

Receiving, at a client device, an error status code transmitted from an organic matter processing apparatus (OMPA) that is associated with the client device, wherein the OMPA is experiencing an error event corresponding to the error status code

2120

In response to receiving, the error status code, accessing memory on the clients device to retrieve error content that correlates to the error status code

2130

Generating first display content comprising the error content, wherein the error content specifies an issue with the OMPA and a solution to the issue

2140

Displaying the first display content

2150

Receiving, at the client device, a non-error status code, transmitted from OMPA, wherein the OMPA is no longer experiencing the error event

2160

In response to receiving the non-error status code, accessing memory on the client device to retrieve status content that correlates to the non-error status code

2170

Generating second display content comprising the status content, wherein the status content specifies a current status of the OMPA that is not experiencing an error event

2180

Displaying the second display content

FIG. 21

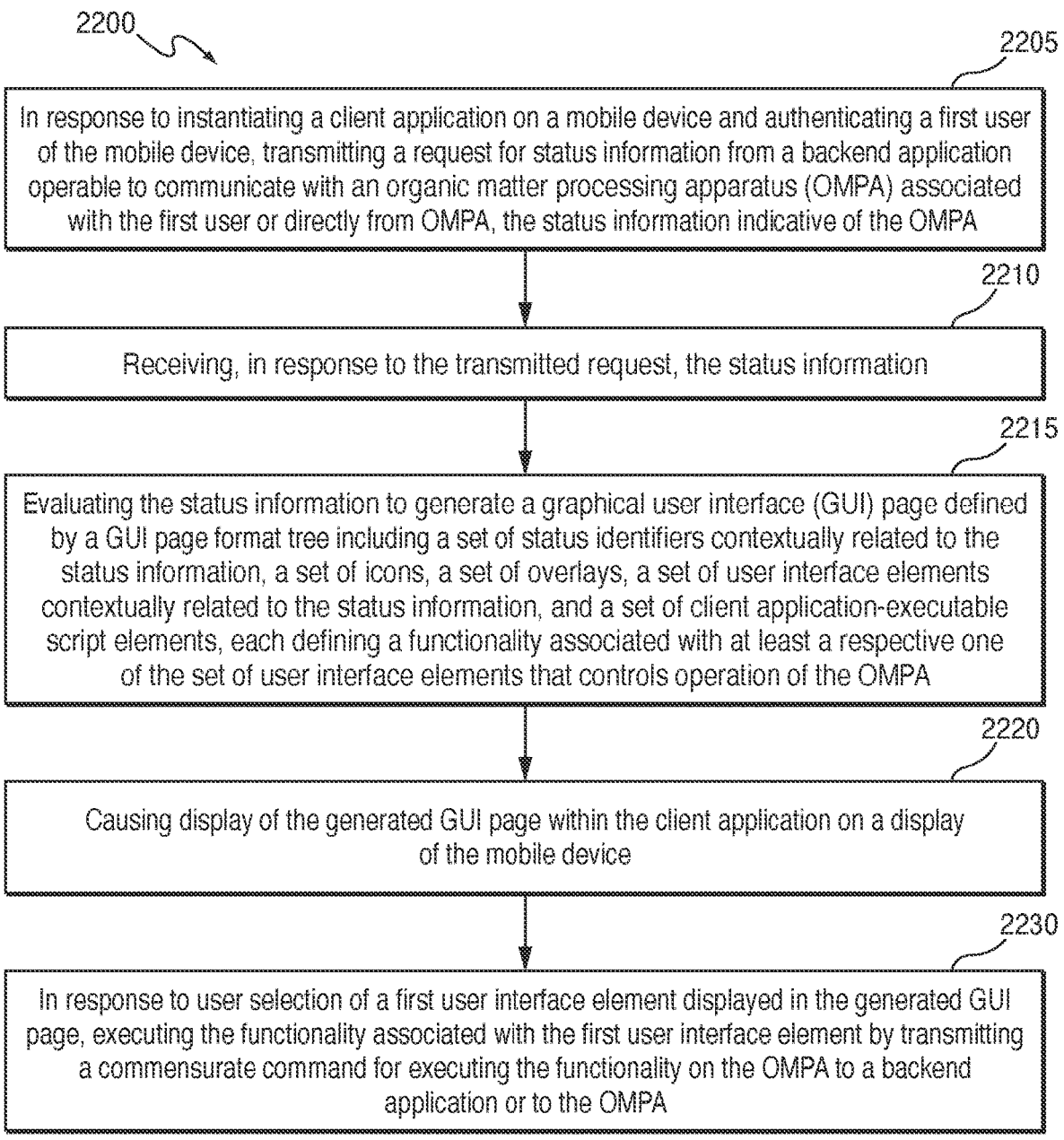

2200    2205

In response to instantiating a client application on a mobile device and authenticating a first user of the mobile device, transmitting a request for status information from a backend application operable to communicate with an organic matter processing apparatus (OMPA) associated with the first user or directly from OMPA, the status information indicative of the OMPA

2210

Receiving, in response to the transmitted request, the status information

2215

Evaluating the status information to generate a graphical user interface (GUI) page defined by a GUI page format tree including a set of status identifiers contextually related to the status information, a set of icons, a set of overlays, a set of user interface elements contextually related to the status information, and a set of client application-executable script elements, each defining a functionality associated with at least a respective one of the set of user interface elements that controls operation of the OMPA

2220

Causing display of the generated GUI page within the client application on a display of the mobile device

2230

In response to user selection of a first user interface element displayed in the generated GUI page, executing the functionality associated with the first user interface element by transmitting a commensurate command for executing the functionality on the OMPA to a backend application or to the OMPA

FIG. 22

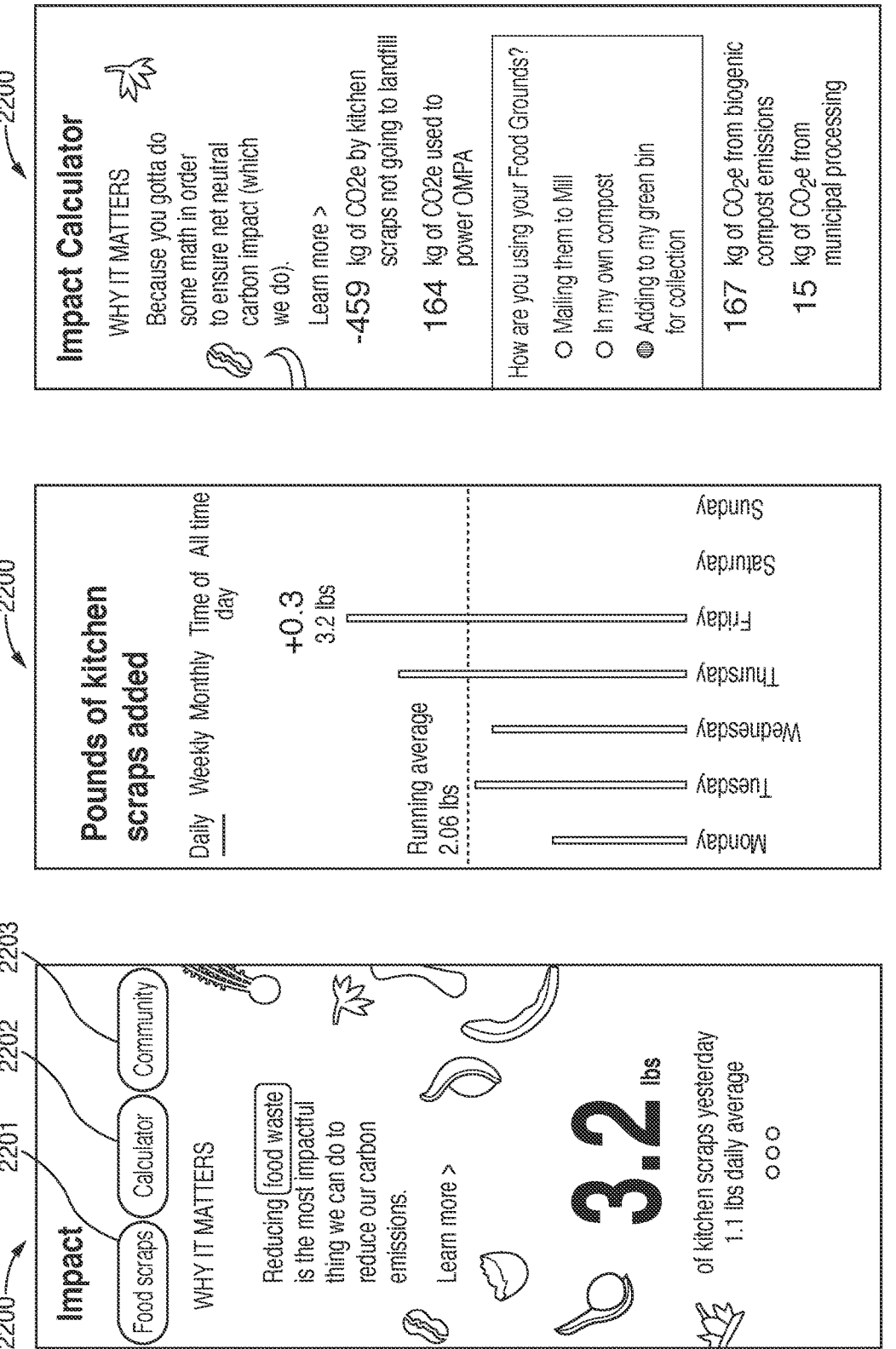

FIG. 22C

Impact Calculator   2200

WHY IT MATTERS
Because you gotta do some math in order to ensure net neutral carbon impact (which we do).

Learn more >

-459 kg of CO₂e by kitchen scraps not going to landfill

164 kg of CO₂e used to power OMPA

How are you using your Food Grounds?

○ Mailing them to Mill
○ In my own compost
◉ Adding to my green bin for collection

167 kg of CO₂e from biogenic compost emissions

15 kg of CO₂e from municipal processing

FIG. 22B

Pounds of kitchen scraps added   2200

Daily   Weekly   Monthly   Time of day   All time

+0.3
3.2 lbs

Running average 2.06 lbs

Monday   Tuesday   Wednesday   Thursday   Friday   Saturday   Sunday

Impact   Food scraps   Calculator   Community

WHY IT MATTERS

Reducing food waste is the most impactful thing we can do to reduce our carbon emissions.

Learn more >

3.2 lbs of kitchen scraps yesterday
1.1 lbs daily average

2200

Mill Community

THINK BIG. ACT SMALL

As a community, we've avoided over 273 kg of CO2e by recycling our Food Grounds.

Learn more >

9,264,175 lbs
of food scraps saved from the landfill

THATS EQUIVALENT TO...

12 basketball courts filled 10ft high with food scraps

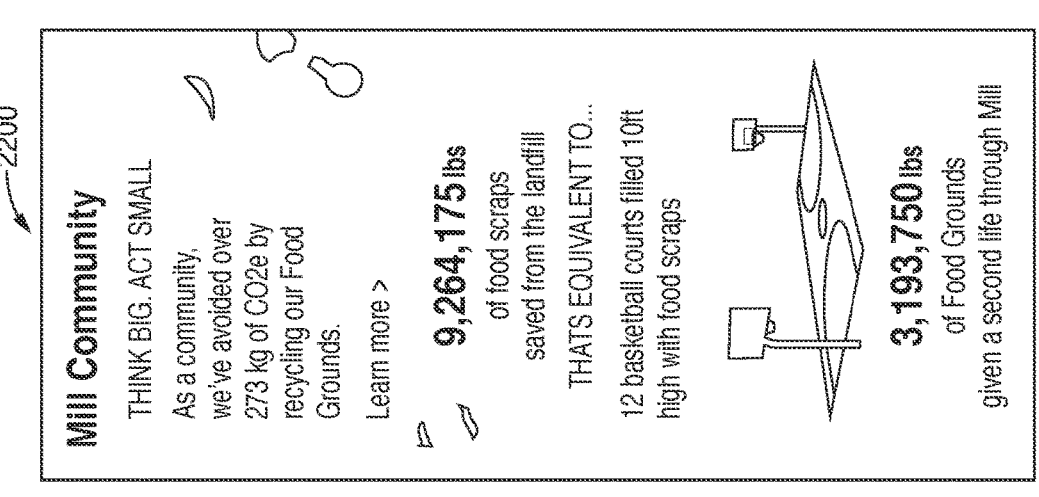

3,193,750 lbs
of Food Grounds given a second life through Mill

Your estimated carbon impact using OMPA is net negative

-334 of $CO_2e$ avoided

THAT'S EQUIVALENT TO...

Keeping an incandescent lightbulb on for 1,791 days

How we calculate carbon impact >

FIG. 22D

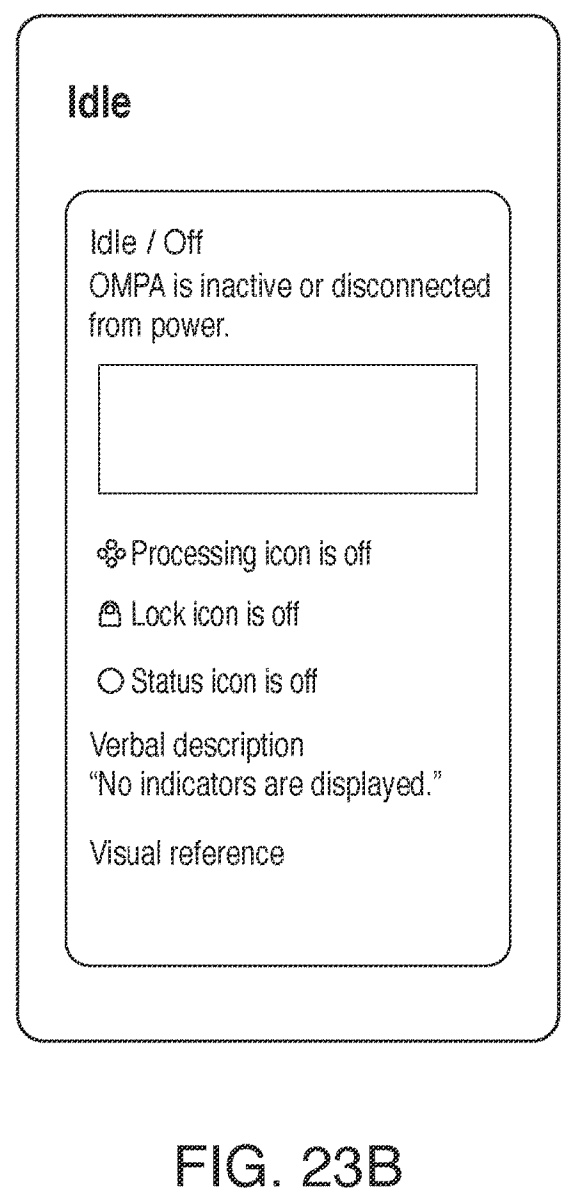

Idle

Idle / Off

OMPA is inactive or disconnected from power.

⚙ Processing icon is off

🔒 Lock icon is off

○ Status icon is off

Verbal description
"No indicators are displayed."

Visual reference

FIG. 23B

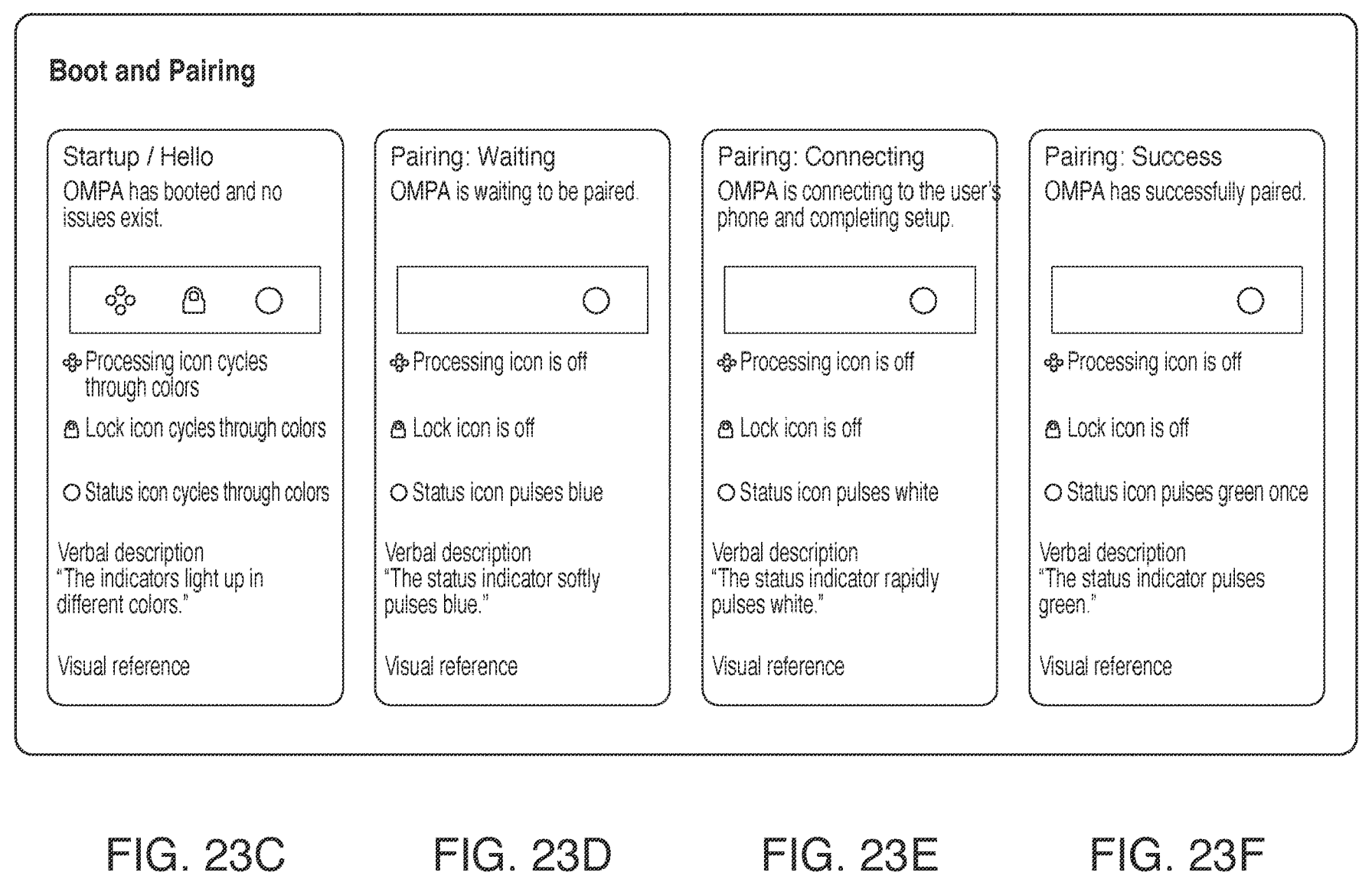

Boot and Pairing

Startup / Hello
OMPA has booted and no issues exist.

✤ Processing icon cycles through colors

🔒 Lock icon cycles through colors

◯ Status icon cycles through colors

Verbal description
"The indicators light up in different colors."

Visual reference

FIG. 23C

Pairing: Waiting
OMPA is waiting to be paired.

✤ Processing icon is off

🔒 Lock icon is off

◯ Status icon pulses blue

Verbal description
"The status indicator softly pulses blue."

Visual reference

FIG. 23D

Pairing: Connecting
OMPA is connecting to the user's phone and completing setup.

✤ Processing icon is off

🔒 Lock icon is off

◯ Status icon pulses white

Verbal description
"The status indicator rapidly pulses white."

Visual reference

FIG. 23E

Pairing: Success
OMPA has successfully paired.

✤ Processing icon is off

🔒 Lock icon is off

◯ Status icon pulses green once

Verbal description
"The status indicator pulses green."

Visual reference

FIG. 23F

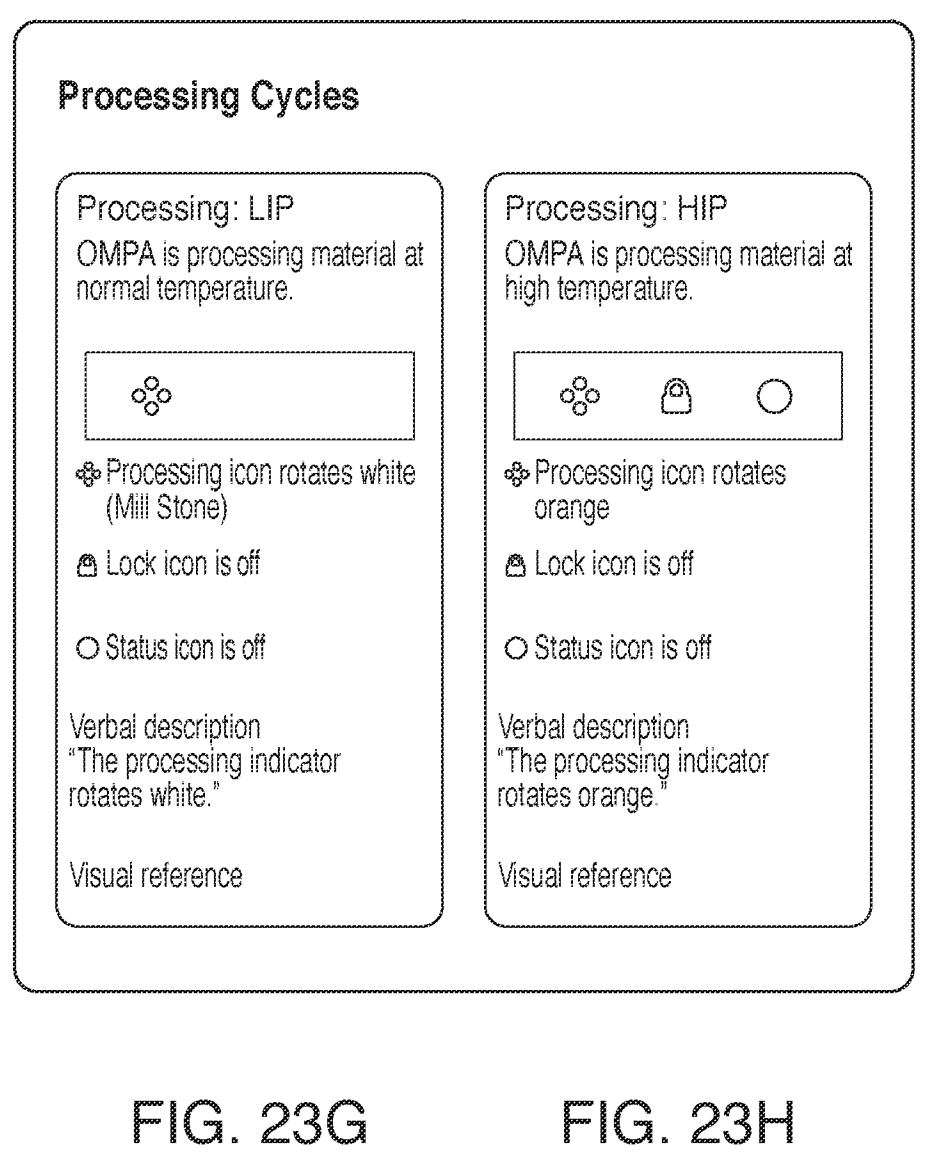

Processing Cycles

Processing: LIP
OMPA is processing material at normal temperature.

✧ Processing icon rotates white (Mill Stone)

🔒 Lock icon is off

◯ Status icon is off

Verbal description
"The processing indicator rotates white."

Visual reference

FIG. 23G

Processing: HIP
OMPA is processing material at high temperature.

✧ Processing icon rotates orange

🔒 Lock icon is off

◯ Status icon is off

Verbal description
"The processing indicator rotates orange."

Visual reference

FIG. 23H

Manual Cycle Controls

Manual HIP Start

OMPA indicates a HIP cycle is starting after the user has pressed the button twice.

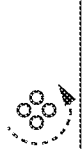

✤ Processing icon pulses white once

🔒 Lock icon is (user defined)

◯ Status icon is off

Verbal description
"The processing indicator pulses white once."

Visual reference

Manual HIP/LIP Cancel

OMPA will end an active HIP cycle if the user continues holding down the button.

✤ Processing icon "counts down" counterclockwise in white (Mill Stone)

🔒 Lock icon is (user defined)

◯ Status icon is off

Verbal description
"The processing indicator "counts down" in white."

Visual reference

FIG. 23I    FIG. 23J

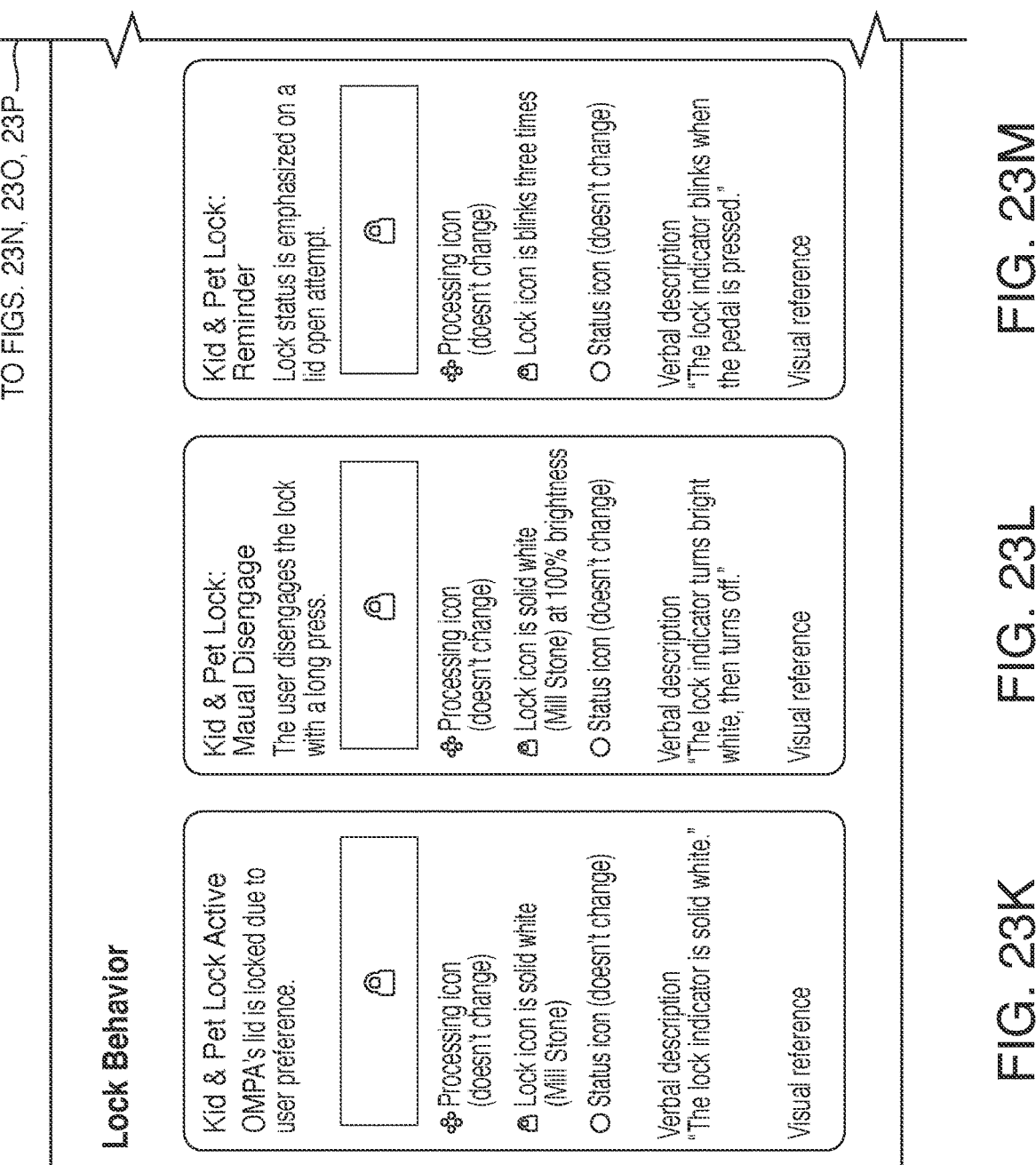

Lock Behavior

Kid & Pet Lock Active
OMPA's lid is locked due to user preference.

🔒

✿ Processing icon (doesn't change)

🔒 Lock icon is solid white (Mill Stone)

○ Status icon (doesn't change)

Verbal description
"The lock indicator is solid white."

Visual reference

FIG. 23K

Kid & Pet Lock: Maual Disengage
The user disengages the lock with a long press.

🔒

✿ Processing icon (doesn't change)

🔒 Lock icon is solid white (Mill Stone) at 100% brightness

○ Status icon (doesn't change)

Verbal description
"The lock indicator turns bright white, then turns off."

Visual reference

FIG. 23L

Kid & Pet Lock: Reminder
Lock status is emphasized on a lid open attempt.

🔒

✿ Processing icon (doesn't change)

🔒 Lock icon is blinks three times

○ Status icon (doesn't change)

Verbal description
"The lock indicator blinks when the pedal is pressed."

Visual reference

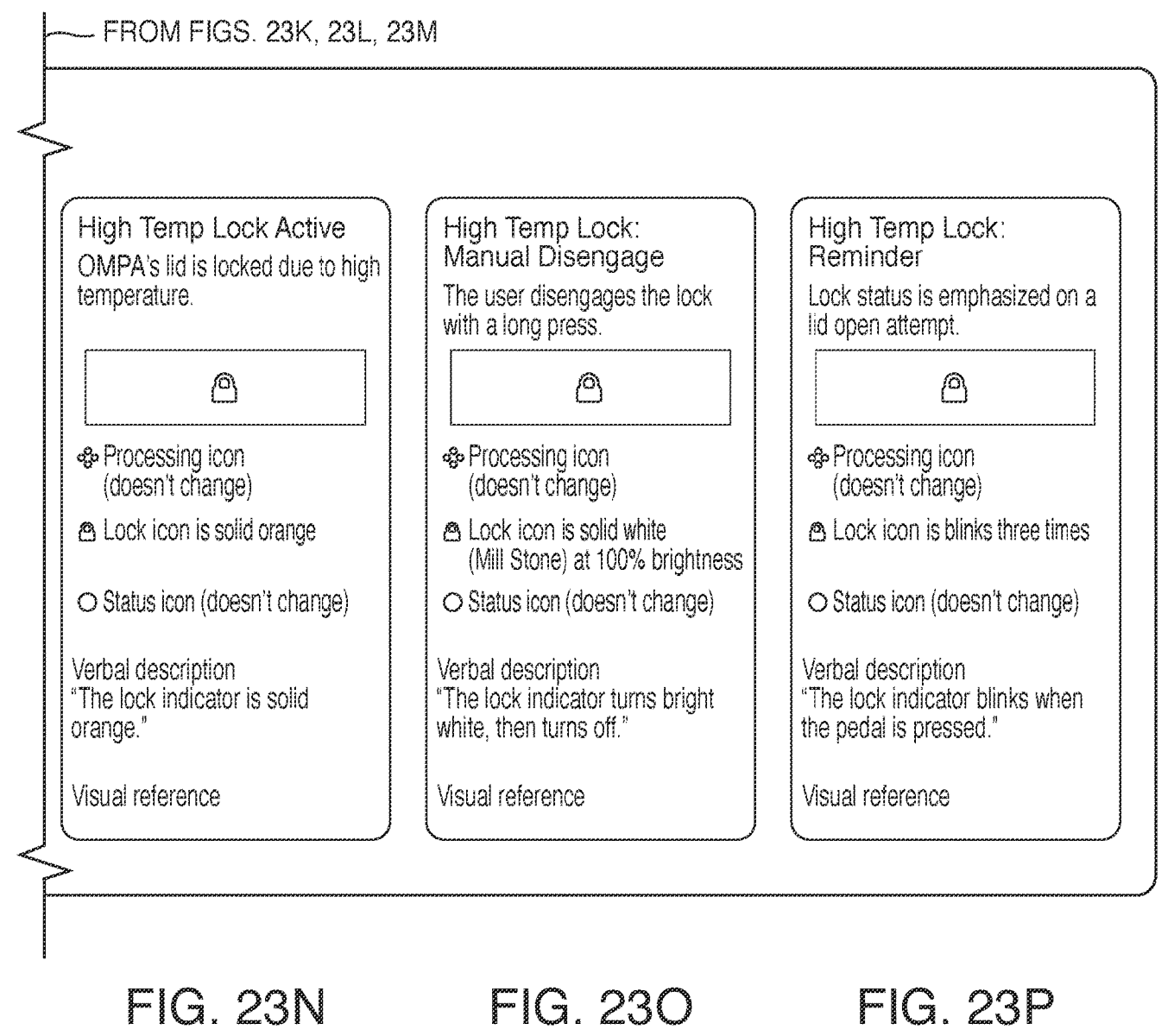

FROM FIGS. 23K, 23L, 23M

High Temp Lock Active

OMPA's lid is locked due to high temperature.

♻ Processing icon
(doesn't change)

🔒 Lock icon is solid orange

○ Status icon (doesn't change)

Verbal description
"The lock indicator is solid orange."

Visual reference

FIG. 23N

**High Temp Lock:
Manual Disengage**

The user disengages the lock with a long press.

♻ Processing icon
(doesn't change)

🔒 Lock icon is solid white
(Mill Stone) at 100% brightness

○ Status icon (doesn't change)

Verbal description
"The lock indicator turns bright white, then turns off."

Visual reference

FIG. 23O

**High Temp Lock:
Reminder**

Lock status is emphasized on a lid open attempt.

♻ Processing icon
(doesn't change)

🔒 Lock icon is blinks three times

○ Status icon (doesn't change)

Verbal description
"The lock indicator blinks when the pedal is pressed."

Visual reference

FIG. 23P

Material and Bucket

Material Added
OMPA has detected that material has been added and shows confirmation on lid close.

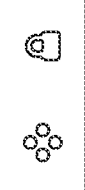

✤ Processing icon is off

🔒 Lock icon is off

○ Status Icon displays multicolored success animation

Verbal description
"The status indicator briefly shows a multicolored confirmation."

Visual reference

Empty Now
OMPA's bucket is full and ready to be emptied.

✤ Processing icon is off

🔒 Lock icon is off

○ Status Icon pulses green in 3 second intervals

Verbal description
"The status indicator pulses green."

Visual reference

Bucket Empty Success
OMPA confirms that the bucket has been emptied and replaced properly.

✤ Processing icon cycles through colors

🔒 Lock icon cycles through colors

○ Status icon cycles through colors

Verbal description
"The indicators light up in different colors."

Visual reference

FIG. 23Q       FIG. 23R       FIG. 23S

Figures 23T, 23U, 23V:
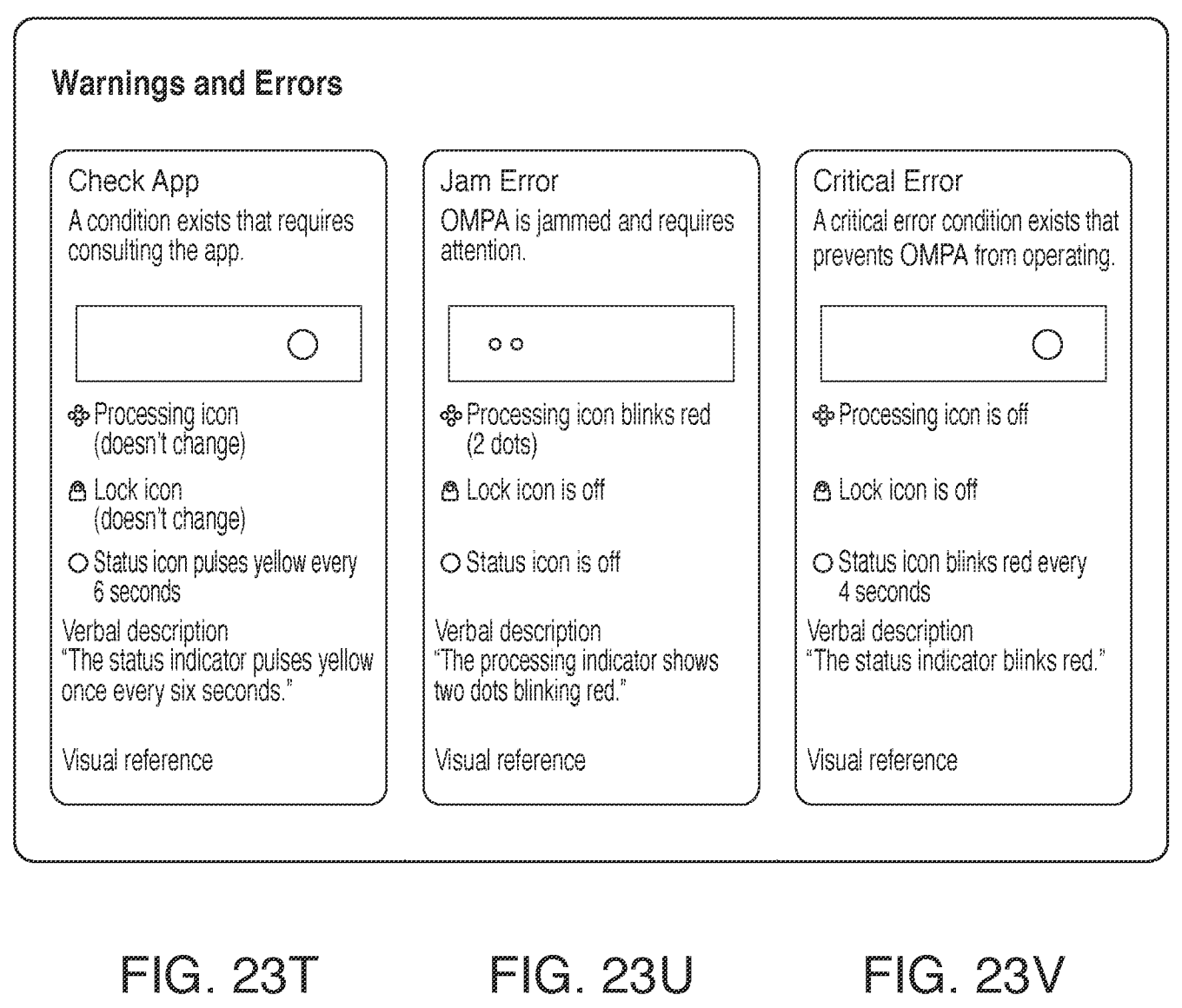

Warnings and Errors

Check App

A condition exists that requires consulting the app.

○

⚙ Processing icon
  (doesn't change)

🔒 Lock icon
  (doesn't change)

○ Status icon pulses yellow every 6 seconds

Verbal description
"The status indicator pulses yellow once every six seconds."

Visual reference

Jam Error

OMPA is jammed and requires attention.

○ ○

⚙ Processing icon blinks red
  (2 dots)

🔒 Lock icon is off

○ Status icon is off

Verbal description
"The processing indicator shows two dots blinking red."

Visual reference

Critical Error

A critical error condition exists that prevents OMPA from operating.

○

⚙ Processing icon is off

🔒 Lock icon is off

○ Status icon blinks red every 4 seconds

Verbal description
"The status indicator blinks red."

Visual reference

| OMPA IMPACT REPORT | 2410 |
|---|---|

| One Earth, use it wisely by limiting unnecessary additions to landfills | 2420 |

Your [MONTH] Summary 2430

40 LBs of organic matter put in your OMPA

32 kg

Of $CO_2$ emissions averted.*

That's the equivalent of XX miles of driving in a gas-powered car.

*Emissions averted calculation assumes you send you Food Grounds back to us and they don't have any contaminants, using the 20-year methane global warm potential factor, based on our preliminary assessment. Learn more.

OMPA Community [MONTH] Summary 2440

XX LBs of organic matter food put into OMPA devices

XX kg

Of $CO_2$ emissions averted.*

That's the equivalent of XX miles of driving in a gas-powered car.

*Emissions averted calculation assumes you send you Food Grounds back to us and they don't have any contaminants

| YOUR OMPA OUTPUT REPORT | 2510 |
|---|---|

| Your latest batch was<br>APPROVED!<br>Received: MM/DD/YYYY<br>Weight: X pounds | 2520 |
|---|---|

Notes regarding the MM/DD/YYYY batch     2530

• A few produce stickers were present

• A few hard shells were present

We were able to remove these, but please try to remove these items before placing them into the OMPA.

Lifetime Report     2540

| | Batches | Pounds (lbs) |
|---|---|---|
| Approved | 15 | 150 |
| Approved w/ acceptable contamination | 3 | 28 |
| Rejected | 1 | 6 |
| Totals | 19 | 184 |

2550

Check the Food Index Guide in the Application if you are not sure about whether an item should be added to the OMPA

FIG. 25

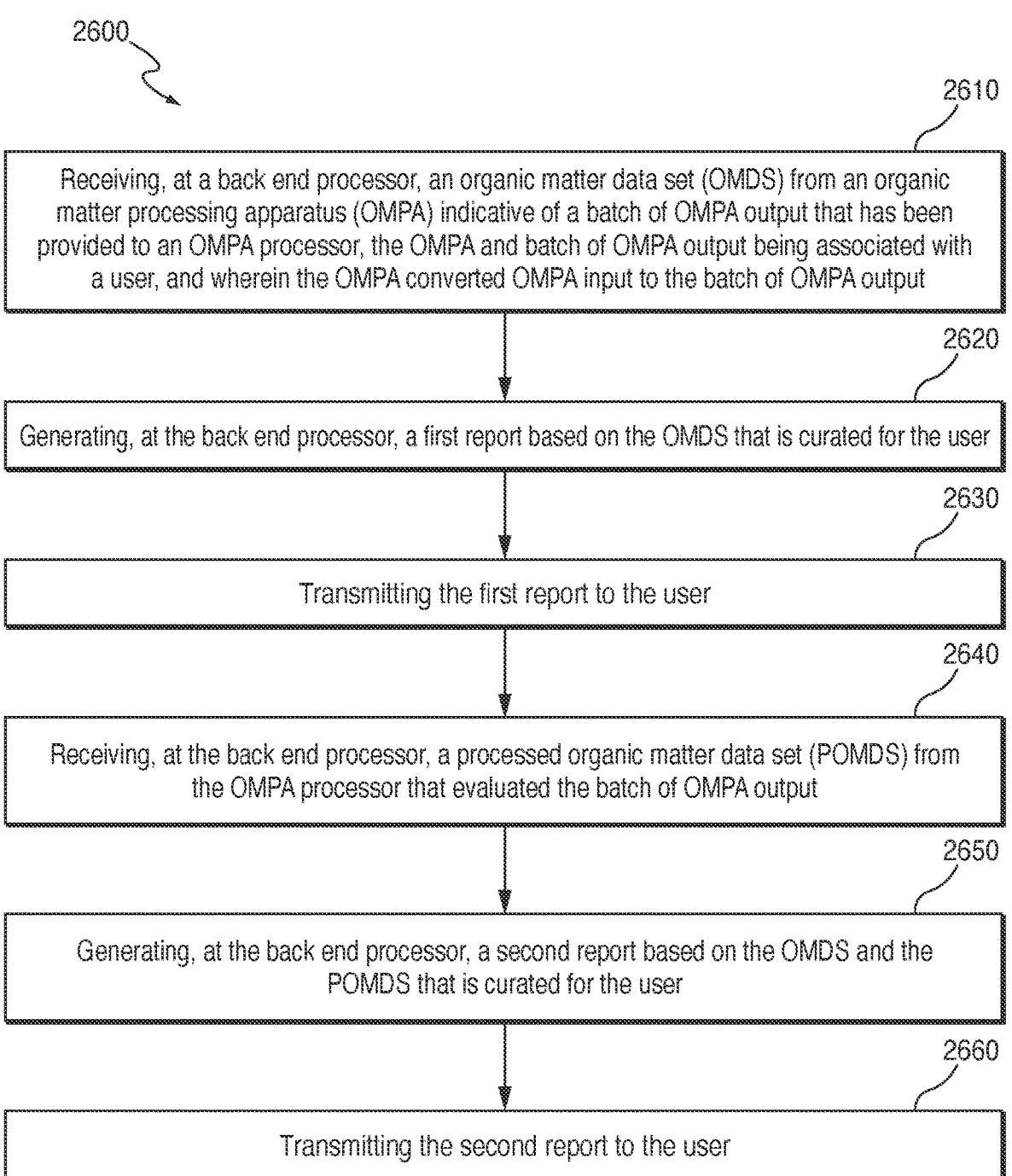

2600

2610

Receiving, at a back end processor, an organic matter data set (OMDS) from an organic matter processing apparatus (OMPA) indicative of a batch of OMPA output that has been provided to an OMPA processor, the OMPA and batch of OMPA output being associated with a user, and wherein the OMPA converted OMPA input to the batch of OMPA output

2620

Generating, at the back end processor, a first report based on the OMDS that is curated for the user

2630

Transmitting the first report to the user

2640

Receiving, at the back end processor, a processed organic matter data set (POMDS) from the OMPA processor that evaluated the batch of OMPA output

2650

Generating, at the back end processor, a second report based on the OMDS and the POMDS that is curated for the user

2660

Transmitting the second report to the user

FIG. 26

USER EXPERIENCE PLATFORM FOR INTERACTING WITH AN ORGANIC MATTER PROCESSING APPARATUS

CROSS-REFERENCE TO A RELATED APPLICATION

This patent application claims the benefit of U.S. Provisional Patent Application No. 63/478,948, filed Jan. 8, 2023, the disclosure of which is incorporated herein in its entirety.

TECHNICAL FIELD

This patent specification relates to software platforms for use with an organic matter processing apparatus, and more particularly to using the software platform to provide user experience touchpoints with the apparatus.

BACKGROUND

Organic matter can generate methane—a powerful greenhouse gas—without oxygen when deposited in landfills. These harmful emissions can be avoided by diverting the organic matter such as uneaten or spoiled food from landfills. It is therefore desirable to provide an easy to use solution that diverts food and other organic matter from landfills.

Conventional devices attempt to convert organic matter into compost by drying and grinding the organic matter. Many of these devices are simplistic in their operation and are not network connected. What is needed is a residential or consumer oriented organic matter processing apparatus that communicates with a software platform.

BRIEF SUMMARY

Embodiments disclosed herein provide user interface platform for interacting with an organic matter processing apparatus capable of converting organic matter into a ground and desiccated product. The user interface platform may enable many features related to operation of the processing apparatus, including, for example, scheduling run times, providing status information, arranging for collection or shipment of ground and desiccated product, notifying a user, setting up the processing device, providing impact analysis, and other features.

A further understanding of the nature and advantages of the embodiments discussed herein may be realized by reference to the remaining portions of the specification and the drawings.

BRIEF DESCRIPTION OF THE DRAWINGS

FIGS. 10A-10F show different GUI pages that can be presented during initial activation of a front end application according to an embodiment.

FIGS. 12A-12F show different GUI pages that may be presented on the front end in connection with a "guides" entity according to an embodiment.

FIGS. 13A-13F show different GUI pages that may be generated and displayed in connection with a setting entity according to an embodiment.

FIG. 19 shows an illustrative process for setting a daily start time for processing organic matter according to an embodiment.

FIG. 20 shows a process on how a user can set a maximum fill weight of the bucket according to an embodiment.

FIG. 21 shows a process on how a user can be alerted to OMPA operational issues according to an embodiment.

FIG. 22 shows a process on how status information indicative of an OMPA is displayed on a client device according to an embodiment.

FIGS. 22A-22E show an illustrative GUI page including an impact assessment according to an embodiment.

FIGS. 23B-23V show different status conditions and how displays are used to convey a particular status condition.

FIG. 24 shows an exemplary impact report according to an embodiment.

FIG. 25 shows an exemplary OMPA output report according to an embodiment.

FIG. 26 shows an illustrative process in which curated reports are generated for specific OMPA users according to an embodiment.

Figure 1:
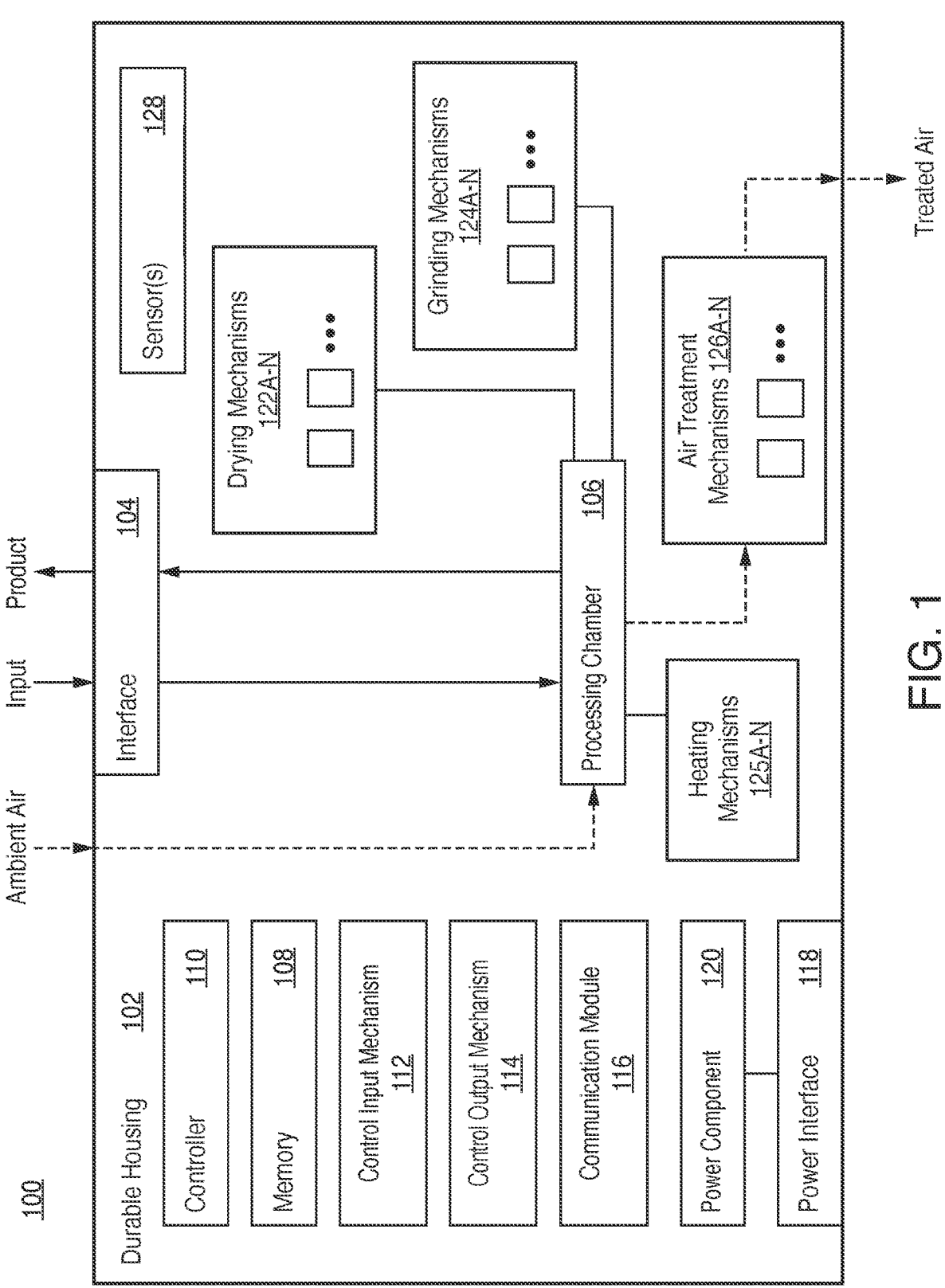
FIG. 1 includes a high-level illustration of an organic matter processing apparatus in accordance with various embodiments according to embodiment.

In the appended figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION

The ensuing description provides exemplary embodiments only, and is not intended to limit the scope, applicability or configuration of the disclosure. Rather, the ensuing description of the exemplary embodiments will provide those skilled in the art with an enabling description for implementing one or more exemplary embodiments. It being understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other elements in the invention may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but could have additional steps not discussed or included in a figure. Furthermore, not all operations in any particularly described process may occur in all embodiments. A process may correspond to a method, a function, a procedure, a subroutine, a subprogram, etc. When a process corresponds to a function, its termination corresponds to a return of the function to the calling function or the main function.

The term "machine-readable medium" includes, but is not limited to portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments of the invention may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

As defined herein, an organic matter processing apparatus (OMPA) is an aero-mechanical device operative to convert OMPA input into an OMPA output using judicious combinations of physical, aero, and thermal processes including grinding, paddling, electric heating, and airflow.

OMPA input is defined herein as predominantly organic matter that is intended for processing by the OMPA. OMPA input can include food matter and/or mixed organic matter. Food matter can include consumable food items such as fats, oils, sweets such as sugars and chocolates, dairy products such as milk, yogurt, cheese, proteins such as meat (and bones thereof), poultry (and bones thereof), fish (and bones thereof), beans, eggs, and nuts, vegetables, fruits, and starches such as bread, cereal, pasta, and rice. Food matter is sometimes referred to as foodstuffs. Mixed organic matter can include paper or other fiber materials (e.g., soiled napkins or paper towels), compostable resins, compostable plastics, cellulosic materials (e.g., compostable silverware), and other non-food organic materials. OMPA input can also include other types of biodegradable matter (e.g., compostable diapers).

For many implementations, OMPA input may include food matter and/or mixed organic matter that is post-consumer, post-commercial, or post-industrial in nature, matter that if not processed according to the present teachings could be considered as waste, garbage, refuse, leavings, remains, or scraps. By way of example, food that is leftover on a child's dinner plate, and not in suitable condition or quantity to be stored and served later as leftovers, can represent one example of OMPA input. As another example, items such as potato peels, apple cores, cantaloupe rinds, broccoli stumps, and so forth, and similar organic materials that are spun off from the food preparation process, can represent other examples of OMPA input.

OMPA output is defined herein as processed organics derived from transformation of organic matter processed by the OMPA to yield a ground and selectively desiccated product. The processed organics can be a substantially desiccated product having water content ranging between 0.1 and 30 percent of total weight, between 5 and 25 percent of total weight, between 5 and 20 percent of total weight, between 1 and 15 percent of total weight, between 5 and 15 percent of total weight, between 10 and 15 percent of total weight, between 10 and 20 percent of total weight, between 15-20 percent of total weight, or between 10 and 25 percent of total weight. Alternatively, the processed organics can be a substantially desiccated product having water content of less than 15 percent of total weight, less than 10 percent of total weight, or less than 5 percent of total weight. The processed organics can exist as granulated or ground media. One type of processed organics can be FOOD GROUNDS™.

As defined herein FOOD GROUNDS™ refers to an OMPA output characterized as having a minimum nutritional value. FOOD GROUNDS™ can be derived from OMPA input comprised of a minimum percentage of food matter such that the FOOD GROUNDS™ OMPA output has the minimum nutritional value. The minimum percentage of food matter can ensure that the FOOD GROUNDS™ OMPA output attains at least the minimum nutritional value. For example, a higher nutrient value OMPA output can be more readily obtained from food matter than from mixed organics such as fiber materials and cellulosic materials.

As defined herein, an OMPA output processor repurposes the OMPA output for a commercial purpose. For example, the OMPA output can be used as feed or feedstock for feed for animals or fish. In some embodiments, an OMPA output processor that receives FOOD GROUNDS™ may produce a derivative product having a higher intrinsic value (e.g., nutritional, monetary, or both nutritional and monetary) than a derivative product produced primarily from mixed organics.

As defined herein, non-processed matter refers to matter that is not intended for processing by an OMPA or an OMPA output processor. Non-processed matter is not an OMPA input or an OMPA output. An example of non-processed matter can include inorganic matter such as, for example, metals, plastics, glass, ceramics, rocks, minerals, or any other substance that is not linked to the chemistry of life. Another example of non-processed matter can be yard waste such as grass clippings, leaves, flowers, branches, or the like. In very general terms, non-processed matter can refer to the garbage or waste that a resident or business disposes in a conventional trash bin for transport to a landfill processor, a recycle bin for transport to recyclables processor, or a yard waste bin for transport to a yard waste processor.

In one embodiment, the OMPA is designed to be used primarily in a residential context (e.g., in single family homes, townhouses, condos, apartment buildings, etc.) to convert residential based OMPA input into residential sourced OMPA output. Converting residential generated OMPA input to OMPA output can have a net positive effect in the reduction of methane and space occupied by landfills or compost centers by redirecting the OMPA input and the OMPA output thereof away from traditional reception centers of such material. Moreover, because the OMPA is user friendly, aesthetically pleasing, energy efficient, clean, and substantially odor free, the OMPA provides an easy to use platform for the residential sector to handle OMPA input (e.g., food scraps, etc.), thereby making the decision on what to do with residential based OMPA input an easier one to handle. The OMPA can convert OMPA input into FOOD GROUNDS overnight, where the FOOD GROUNDS are substantially odorless, easily transportable, and shelf-stable. The FOOD GROUNDS can remain in the OMPA until it is full, at which point the FOOD GROUNDS are removed and transported to an OMPA processing facility, which may convert the FOOD GROUNDS into a higher value food product (e.g., animal feed). It should be understood that OMPAs can be used to serve entire communities, cities, and industries. Use of OMPAs in these other sectors, as well as the residential sector, can result in diversion from landfills and further serve a goal of preventing OMPA input from becoming waste in the first place by converting it into usable products that can be used to enable more resilient, sustainable food systems.

In one embodiment, a residential or consumer oriented OMPA is capable of efficiently and consistently rendering an end product that is curated according to specific properties to enable lightweight and lowcost shipping of the end product for use in a regulatory approved upcycling process.

Embodiments described herein relate to systems and methods for controlling operation of an OMPA, communicating operational status of the OMPA, coordinating collection of OMPA output, and reporting feedback on collected OMPA output. These systems and methods can be implemented in a software platform for storing and retrieving platform-level aggregate data objects (herein "entities") that may be created, modified, or updated. An entity may be updated, created, or modified by a user operating a frontend of a software platform, an administrator operating a frontend or a backend of the software platform, or by operation of the software platform itself (e.g., an automatic or scheduled update). These examples are not exhaustive; a person of skill in the art may appreciate that a platform-level data object may be created, modified, or updated in a number of suitable ways and/or in response to a number of inputs or events.

A software platform entity (or "entity") as described herein can be a meta object formed, built, structured, or otherwise based on a number of lower-level data objects which, in turn, may be stored in one or more data stores, databases, or tables of a software platform. In another non-limiting phrasing, an entity or "data entity" as described herein is (typically) a platform-level object or high-order object that links to, aggregates, combines, or is otherwise associated with or based on one or more lower-level data objects.

For example, the software platform can be an OMPA application having a frontend that operates on a mobile device and a backend that operates on a server. The frontend may be able to communicate directly with an OMPA via a wireless connection (e.g., Bluetooth or Wi-Fi) or indirectly with the OMPA via another wireless connection (e.g., Wi-Fi via a router).

The OMPA application can present, for example, a schedule entity that can be associated with text content, time content, user interface content, metadata, files, and so on each of which may be stored in different tables, databases, data stores, memory, and so on. In this example, the schedule entity may define when the OMPA is scheduled to run its daily processing cycle.

As another example, the OMPA application may present a status entity that can be associated with text content, status icons, user interface content, metadata, etc. each of which may be stored in different tables, databases, data stores, or memory. In this example, the status entity can show the current operational state of the OMPA. If, for example, the OMPA is currently within a processing cycle, the status entity can provide dynamic status updates of the OMPA's progress within the processing cycle.

As yet another example, the OMPA application may present a FOOD GROUNDS collection entity that can be associated with text content, status icons, user interface content, metadata, etc. each of which may be stored in different tables, databases, data stores, or memory. The FOOD GROUNDS collection entity can specify that the OMPA output is ready for shipment and can specify various statistics (e.g., sourced from one or more sensors located in the OMPA) related to the FOOD GROUNDS.

The OMPA application can present many different entities that are associated with a variety of text content, graphics, user interface elements, metadata, files, etc. that are stored as appropriate for fast retrieval or updates thereof. For example, other exemplary entities can include a warning entity, a food guide entity, and a setup entity, each of which are discussed in more detail below. Many of the entities presented by the OMPA application may utilize data obtained from one or more sensors located on the OMPA and present that data in context specific locations for a given entity. For example, the OMPA can determine how many pounds of FOOD GROUNDS exists within the bucket assembly and the status entity can present this statistic as part of its presentation. In furtherance to this example, because the quantity of FOOD GROUNDS already existing within the bucket assembly is known, the OMPA can infer how much more OMPA input it can accept before exceeding a weight threshold or quantity overage threshold and report this inference as part of an inclusion to the status entity. As yet another example, the OMPA can dynamically predict how long a processing cycle may take to complete based on (1) pre-existing OMPA output existing in the bucket assembly and (2) addition of newly added OMPA input and report this predicted processing cycle as part of the status entity.

One or more entities presented in the OMPA application may include functional frontend-executable script elements (e.g., JavaScript™ scripts, whether imported, inline, or tagged within script tags) that provide responsive functionality for one or more user interface elements. For example, when a user interacts with a user interface element tied to a frontend-executable script element, that script element can be executed, and data is communicated with the OMPA and/or backend. For example, a user can set the start time of a processing cycle by entering the time or rolling a multi-digit clock dial and then can press a "save" button or "confirm" button to lock in the new start time. After the "save" button is pressed, this may activate the underlying script element by causing the application to communicate the new processing cycle start time to the OMPA.

For simplicity of description and illustration, endpoints to which an entity may be served or otherwise provided by a software platform as described herein are referred to, collectively, as "data consumers" or "entity consumers" or more generally, "consumers" of entity data. In this manner, a software platform as described herein can be communicably coupled to one or more user-consumers of data and, additionally, to one or more non-user consumers of data. For simplicity of description, the examples that follow reference constructions in which a consumer is a non-user consumer, but it may be appreciated that this is merely one non-exhaustive example.

In addition, in some embodiments, a software platform may be configured to support guaranteed delivery of computed full states of entities to one or more consumers. As used herein, the term "full state" or "full computed state" refers to a structured data representation of a particular entity, incorporating information as appropriate from all associated data objects. For example, a full computed state of a status entity of an OMPA may be a single JSON object or HTML file that incorporates all inline multimedia, text, styles, scripts, and so on associated with that entity. In a broader phrasing, a full computed state of an OMPA can represent a snapshot of that OMPA, including content associated to that OMPA regardless of form, source, or format, at a particular time. In this manner, as soon as a single data object associated with an OMPA changes or is updated, an entity's full computed state becomes out of date.

In some constructions, a software platform may be configured to regularly recompute a full state of an OMPA each time any data object associated with that OMPA changes. Upon re-computation of the full state, the software platform may be configured to serve and/or otherwise provide the updated full OMPA state to one or more OMPA applications, and vice versa, where any state change in the application is updated and provided to the OMPA. Updates to these constructions can be based on predetermined intervals or in response to user inputs or status change events existing in the OMPA.

Overview of Organic Matter Processing Apparatus

Figure 2B:
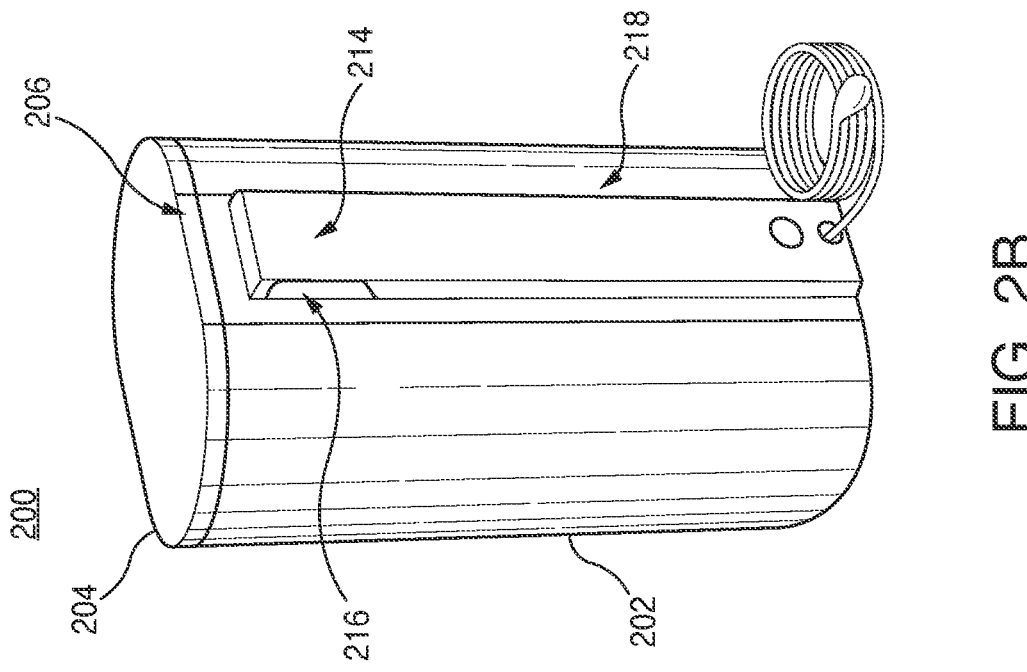
FIG. 2B includes another perspective view of the organic matter processing apparatus with the lid in an open position according to embodiment.
Figure 2A:
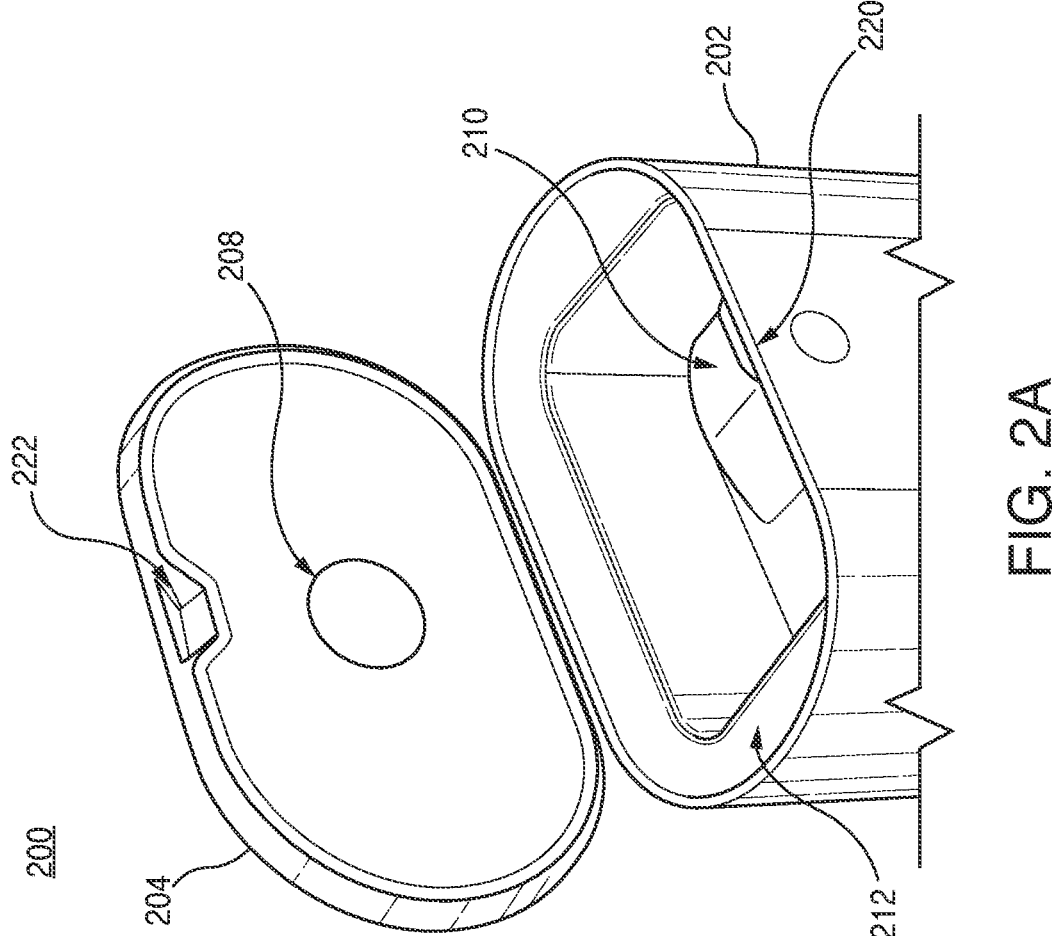
FIG. 2A includes a perspective view of an organic matter processing apparatus that includes a lid in a closed position according to embodiment.

FIG. 1 includes a high-level illustration of a OMPA 100 in accordance with various embodiments. As further discussed below, OMPA 100 may have a durable housing 102 with an interface 104 through which a processing chamber 106 can be accessed. The interface 104 may serve as the ingress interface through which OMPA input can be deposited into the processing chamber 106 and the egress interface through which the product can be retrieved from the processing chamber 106. As shown in FIGS. 2A-B, durable housing 102 may take the form of a roughly cylindrical container that has an aperture along its top end.

Instructions for operating OMPA 100 may be stored in a memory 108. Memory 108 may be comprised of any suitable type of storage medium, such as static random-access memory (SRAM), dynamic random-access memory (DRAM), electrically erasable programmable read-only memory (EEPROM), flash memory, or registers. In addition to storing instructions that can be executed by controller 110, memory 108 can also store data that is generated by OMPA 100. For example, values generated by one or more sensors 128 included in OMPA 100 may be stored in memory 108 in preparation for further analysis, as further discussed below. As further discussed below, these values may relate to characteristics (e.g., humidity or temperature) of the air traveling through OMPA 100, and insights into the OMPA input contained in the processing chamber 106 can be gained through analysis of these values. Note that memory 108 is merely an abstract representation of a storage environment. Memory 108 could be comprised of actual integrated circuits (also referred to as "chips"). When executed by a controller 110, the instructions may specify how to control the other components of OMPA 100 to produce OMPA output from OMPA input in the processing chamber 106. Controller 110 may include a general purpose processor or a customized chip (referred to as an "application-specific integrated circuit" or "ASIC") that is designed specifically for OMPA 100.

Generally, OMPA 100 is able to operate on its own. Assume, for example, that OMPA 100 determines that OMPA input has been deposited into processing chamber 106 based on measurements output by a weight sensor (also referred to as a "mass sensor"), as further discussed below. In response to such a determination, OMPA 100 may initiate processing of the OMPA input. Note, however, that the OMPA input need not necessarily be processed immediately. For example, OMPA 100 may not dry and then grind the OMPA input until a given criterion (e.g., time of day, weight of OMPA input, etc.) or combination(s) of various criteria is/are satisfied.

While OMPA 100 may be able to operate largely, if not entirely, on its own, there may be some situations where input from a user will be helpful or necessary. For example, the user may want to indicate when processing should be temporarily halted so that additional OMPA input can be added to the processing chamber 106. As another example, the user may request that an operation be initiated or halted. For instance, the user could opt to initiate a "drying cycle" if the ambient environment is expected to be vacant, or the user could opt to halt a "grinding cycle" if the ambient environment is expected to be occupied. The various cycles of OMPA 100 are discussed in greater detail below.

As shown in FIG. 1, OMPA 100 may include a control input mechanism 112 (also referred to as a "data input mechanism" or simply "input mechanism") with which the user can interact to provide input. Examples of input mechanisms include mechanical buttons and keypads for tactile input, microphones for audible input, scanners for visual input (e.g., of machine-readable codes, such as barcodes or Quick Response codes), and the like. OMPA 100 may also include a control output mechanism 114 (also referred to as a "data output mechanism" or simply "output mechanism") for presenting information to inform the user of its status. For example, the control output mechanism 114 may indicate the current cycle (e.g., whether OMPA input is being processed, or whether product is ready for retrieval), connectivity status (e.g., whether OMPA 100 is presently connected to another electronic device via a wireless communication channel), and the like. One example of an output mechanism is a display panel comprised of light-emitting diodes (LEDs), organic LEDs, liquid crystal elements, or electrophoretic elements. In embodiments where the display panel is touch sensitive, the display panel may serve as the control input mechanism 112 and control output mechanism 114. Another example of an output mechanism is a speaker that is operable to output audible notifications (e.g., in response to a determination that the product is ready for retrieval).

Some embodiments of OMPA 100 are able to communicate with other electronic devices via wireless communication channels. For example, a user may be able to interact with OMPA 100 through a control platform (not shown) that is embodied as a computer program executing on an electronic device. The control platform is discussed in greater detail below with reference to FIG. 7. In such embodiments, OMPA 100 may include a communication module 116 that is responsible for receiving data from, or transmitting data to, the electronic device on which the control platform resides. The communication module 116 may be wireless communication circuitry that is designed to establish wireless communication channels with other electronic devices. Examples of wireless communication circuitry include chips configured for Bluetooth®, Wi-Fi®, ZigBee®, LoRa®, Thread, Near Field Communication (NFC), and the like.

OMPA 100 may include a power interface 118 (also referred to as a "power port" or "power jack") that is able to provide main power for the drying and grinding functionality, as well as power for the other components of OMPA 100, as necessary. The power interface 118 may allow OMPA 100 to be physically connected to a power source (e.g., an electrical outlet) from which power can be obtained without limitation. Alternatively, the power interface 118 may be representative of a chip that is able to wirelessly receive power from the power source. The chip may be able to receive power transmitted in accordance with the Qi standard developed by the Wireless Power Consortium or some other wireless power standard. Regardless of its form, power interface 118 may allow power to be received from a source external to the durable housing 102. In addition to the power interface 118, OMPA 100 may include a power component 120 that can store power received at the power interface 118. Power component 118 could advantageously be useful to maintain some or all operations (e.g., the state of communications and functionality of electronic components) in the event of a power outage. Examples of power components include rechargeable lithium-ion (Li-Ion) batteries, rechargeable nickel-metal hydride (NiMH) batteries, rechargeable nickel-cadmium (NiCad) batteries, and the like.

In order to produce an OMPA output from OMPA input, OMPA 100 (and, more specifically, its controller 110) may control one or more drying mechanisms 122A-N, one or more grinding mechanisms 124A-N, and one or more heating mechanisms 125A-N. The drying mechanisms 122A-N can be responsible for desiccating the OMPA input. Desiccation may not only allow the OMPA input easier to process (e.g., grind), but also may prevent the formation of mold that thrives in humid conditions. Examples of drying mechanisms include fans that reduce moisture by introducing airflow. For example, a lid can include a fan to impart forced air into processing chamber 106. Another fan may be used to pull untreated air from processing chamber 106 for processing by air treatment mechanism 126. The grinding mechanisms are responsible for cutting, crushing, or otherwise separating the OMPA input into fragments. Examples of grinding mechanisms include paddles, mixers, impellers, and rotating blades (e.g., with two, three, or four prongs). Grinding mechanisms are normally comprised of a durable material, such as die cast aluminum, stainless steel, or another material that offers comparable strength and rigidity. Heating mechanism 125A-N may impart heat directly to processing chamber 106 to assist in drying out any OMPA input contained therein. Examples of the heating mechanism can include one or more flexible heating elements that are integrated within processing chamber 106 or one or more heating elements that are thermally coupled to processing chamber 106. As another example, a heater may exist in the lid and can heat the air being forced into processing chamber 106 by one of drying mechanisms 122. By working in concert, the drying, grinding, and heating mechanisms 122A-N, 124A-N, and 125A-N can convert OMPA input into a substantially shelf stable product.

Moreover, air may be drawn from the ambient environment into the durable housing 102 and then expelled into the processing chamber 106 to help desiccate the OMPA input contained therein. As shown in FIG. 1, air that is drawn from the processing chamber may be treated using one or more air treatment mechanisms 126A-N (also referred to as "air management mechanisms" or "air discharge mechanisms") before being released back into the ambient environment. Air treatment mechanisms 126A-N may convert untreated air emanating from processing chamber 106 to treated air, which is released from OMPA 100. Air treatment mechanisms 126A-N can include a media filter (e.g., activated carbon filter), a photovoltaic filter (e.g., a UV light filter), or a combination thereof.

Other components may also be included in OMPA 100. For example, sensor(s) 128 may be arranged in various locations throughout OMPA 100 (e.g., along the path that the air travels through OMPA 100). Sensor(s) 128 can include temperature sensors, humidity sensors, volatile organic compound sensors, and mass sensors. The sensor(s) 128 may include a proximity sensor that is able to detect the presence of nearby individuals without any physical contact. The proximity sensor may include, for example, an emitter that is able to emit infrared (IR) light and a detector that is able to detect reflected IR light that is returned toward the proximity sensor. These types of proximity sensors are sometimes called laser imaging, detection, and ranging (LiDAR) scanners. Alternatively, the presence of an individual may be inferred based (i) whether sounds indicative of the user are detectable (e.g., by a passive microphone or an active sonar system) or (ii) whether an electronic device associated with the user is detectable (e.g., by the communication module 116). As yet another example, sensor(s) 128 can include a charge coupling device (CCD) or camera that can monitor contents contained with processing chamber 106 and can monitor active processing of the contents contained therein (e.g., by observing operation of grinding mechanism(s) 122). The video or images captured by the CCD or camera can be wirelessly transmitted to a user mobile device for viewing or can be displayed on a screen residing on the OMPA.

OMPA 100 may adjust its behavior based on whether any individuals are nearby. For instance, OMPA 100 may change its operating state (or simply "state") responsive to a determination that an individual is nearby. As an example, OMPA 100 may stop driving the grinding mechanisms upon determining that someone is located nearby. Thus, OMPA 100 could intelligently react to changes in the ambient environment. Over time, outputs produced by the proximity sensor (plus other components of OMPA 100) could be used to better understand the normal schedule of individuals who frequent the physical space in which OMPA is situated.

In some embodiments, OMPA 100 includes an ambient light sensor whose output can be used to control different components. The ambient light sensor may be representative of a photodetector that is able to sense the amount of ambient light and generate, as output, values that are indicative of the sensed amount of ambient light. In embodiments where the control output mechanism 114 is a display panel, the values output by the ambient light sensor may be used by the controller 110 to adjust the brightness of the display panel.

In some embodiments, OMPA 100 can operate with two separate processors. One processor (e.g., a control processor) may be dedicated to controlling OMPA functions such as drying mechanism 122A-N, grinding mechanism 124A-N, heating mechanism 125A-N, air treatment system 126A-N, sensors 128, lid lock (e.g., a solenoid that can lock the lid), interface 104, etc. Another processor (e.g., a communications processor) can be used to control communications with a cloud service (e.g., either a backend server or an application running on a mobile device or a laptop computer). Embodiments discussed herein may balance operation of various features between the two processors to satisfy safety protocols and to minimize perceived latency in communications among the OMPA, backend server, and application. For example, the communications processor may wait for confirmation from the control processor that an action (included in a first class of actions) has been completed before communicating with the cloud service, whereas for a second class of actions, the communications processor may pre-emptively communicate with the cloud service before the control processor confirms the second class action has been completed. The first class of actions may include functions that require control processor confirmation before implementation of that action can be reported. Examples of first class actions include safety features (e.g., lid lock) or OMPA operational features (e.g., starting an OMPA processing cycle or ending an OMPA processing cycle). As a specific example, if a user, using an application, selects to lock the lid, this command is communicated to the OMPA via the cloud service. When the OMPA receives the command, the communications processor can relay the command to the control processor, which then engages in locking the lid. After the lid is locked, the control processor can report back to the communications processor that the lid is locked. After receiving confirmation that the lid is locked, the communications processor can communicate with the application via the cloud service, and then the application, upon receiving the communication, can confirm that the lid is locked. The second class of actions may include functions that do not require control processor confirmation to report that said action has been completed. This can reduce latency in reporting completion or confirmation that the second class actions have been completed or initiated. Examples of second class actions include scheduling OMPA start times, setting clock features such as a time zone, or any other features that can be processed as successfully completed even though it is not confirmed by the control processor. As a specific example, if a user uses an application to set a start time for OMPA operation, the application can immediately confirm that the new start time has been accepted even though the control processor has not confirmed that the new start time has been received and programmed. In this way, latency is reduced by immediately confirming the action is accepted while the command is communicated to and eventually executed by the OMPA.

Desiccating OMPA Input Through Airflow Generation

One core aspect of OMPA is its ability to desiccate OMPA input that is deposited into the processing chamber. By removing moisture from the OMPA input through a judicious application of heating, grinding, mixing, and airflow according to the teachings herein, the OMPA can substantially halt decomposition of the OMPA input and produce a stable mass of dried-and-grinded OMPA input (hereinafter "OMPA output" or "end product" or simply "product"). This can be accomplished by directing an airflow through the processing chamber that causes the OMPA input to become increasingly dry in a predictable manner.

FIG. 2A includes a front-side perspective view of OMPA 200 that includes a lid 204 in a closed position. FIG. 2B, meanwhile, includes a rear-side perspective view of OMPA 200 with the lid 204 in an open position. As further discussed below, the lid 204 may be pivotably connected to a durable housing 202, so as to allow a user to easily expose and then cover a processing chamber 210 located inside the durable housing 202. As described further herein, OMPA 200 can be advantageously designed and configured such that it can be placed flush up against a wall or other barrier in a space-saving manner, in that it does not require gapped separation from the wall, while at the same time maintaining the ability for good airflow in and out of OMPA 200.

As shown in FIG. 2A, the lid 204 may have one or more air ingress openings 206 (or simply "openings") through which air can be drawn from the ambient environment by a first fan (also referred to as a "turbulent fan") installed therein. Here, for example, a single opening 206 is located along a periphery of the lid 204 near a rear side of the OMPA 200. Generally, the opening(s) 206 are located near where the lid 204 is pivotably connected to the durable housing 202. Advantageously, there may be a built-in offset between a plane of the opening 206 and a backmost plane of the overall durable housing 202, whereby airflow into OMPA 200 will not be impeded even while the backmost plane is flush against a wall. However, the opening(s) 206 could be located, additionally or alternatively, elsewhere along the exterior surface of the lid 204. For example, multiple openings may be spaced along a periphery of the lid 204 to further ensure that sufficient air can be drawn into the lid 204 by the first fan even if OMPA 200 is positioned proximate to an obstacle (e.g., a wall).

As shown in FIG. 2B, this air can then be expelled toward the OMPA input through one or more openings 208 along the interior surface of the lid 204. This will create a downward airflow that causes turbulence inside processing chamber 210, thereby increasing the rate at which the OMPA input is dried. The speed of the first fan may be roughly proportional to the speed of the downward airflow (and thus, the amount of turbulence). OMPA 200 may increase the speed of the first fan if quicker drying is desired.

Accordingly, the first fan may draw air through the opening(s) 206 in the exterior surface of the lid 204 and then blow the air downward toward the OMPA input to create a turbulent airflow (also referred to as a "turbulent airstream"). This turbulent airflow may create small vortices inside processing chamber 210 that ensure the air continues to move across the surface of the OMPA input.

In the embodiment shown in FIG. 2B, the opening(s) 208 are centrally located along the interior surface of the lid 204. However, the opening(s) 208 could be located elsewhere along the interior surface of lid 204. For example, the opening(s) 208 may be located along one edge of the lid 204 if the intake vent through which air is removed from the processing chamber 210 is located near an opposing edge of the lid 204.

When in operation, air can be removed from the processing chamber 210 through a used-air intake vent (not shown) in an exhaust hood that is located beneath a bezel 212. The bezel 212 may extend around a periphery of durable housing 202 to "frame" the aperture through which OMPA input can be deposited in processing chamber 210. The exhaust hood may be partially or fully obstructed when bezel 212 is installed within durable housing 202. Here, for example, the exhaust hood is fully obstructed by the bezel 212, and therefore cannot be easily viewed while the bezel 212 is installed within the durable housing 202.

Structural feature 220 may accommodate a locking mechanism 222 that extends downward from the lid 204 into the durable housing 202. After the locking mechanism 222 extends into the durable housing 202, a latch (e.g., driven by a solenoid) may secure the locking mechanism 222 in place. This may be helpful to restrict access when, for example, the OMPA 200 is operating at high intensity and contents of processing chamber 210 are hot.

The treated air may be expelled through one or more air egress openings (or simply "openings") located along an interior surface of a mechanical feature 214. The interior surface of mechanical feature 214 may define a space 216 into which treated air can be expelled. As shown in FIG. 2B, the space may not be fully enclosed. Here, for example, the mechanical feature 214 is roughly in the form of an open cylinder, and thus may also serve as a handle along the exterior surface of the durable housing 202. Additionally or alternatively, opening(s) may be located along the rear surface of durable housing 202 but oriented such that the treated air is expelled outward at an angle. For example, opening(s) may be located along one or both sides of a vertical pillar 218 (also referred to as a "spine") that runs along the rear side of OMPA 200, so that the treated air is expelled toward the sides of OMPA 200. These designs allow treated air—which may be moister than ambient air—to exit OMPA 200 without being expelled directly onto a nearby obstacle (e.g., a wall). Another benefit of these designs is that "recycling" of air is minimized by ensuring that the treated air is not expelled toward the opening 206 in the lid 204 through which air is drawn into OMPA 200. Advantageously, vertical pillar 218 can serve multiple functions. The vertical pillar 218 may not only serve as a mechanical offset that allows OMPA 200 to be placed adjacent to obstacles without obstructing incoming and outgoing airflow, but may also function as a plenum by providing a pathway along which air can travel while inside the durable housing 202. Moreover, the vertical pillar can act as an anti-tipping mechanism by providing stability.

Practical Processing Chamber

Figure 3:
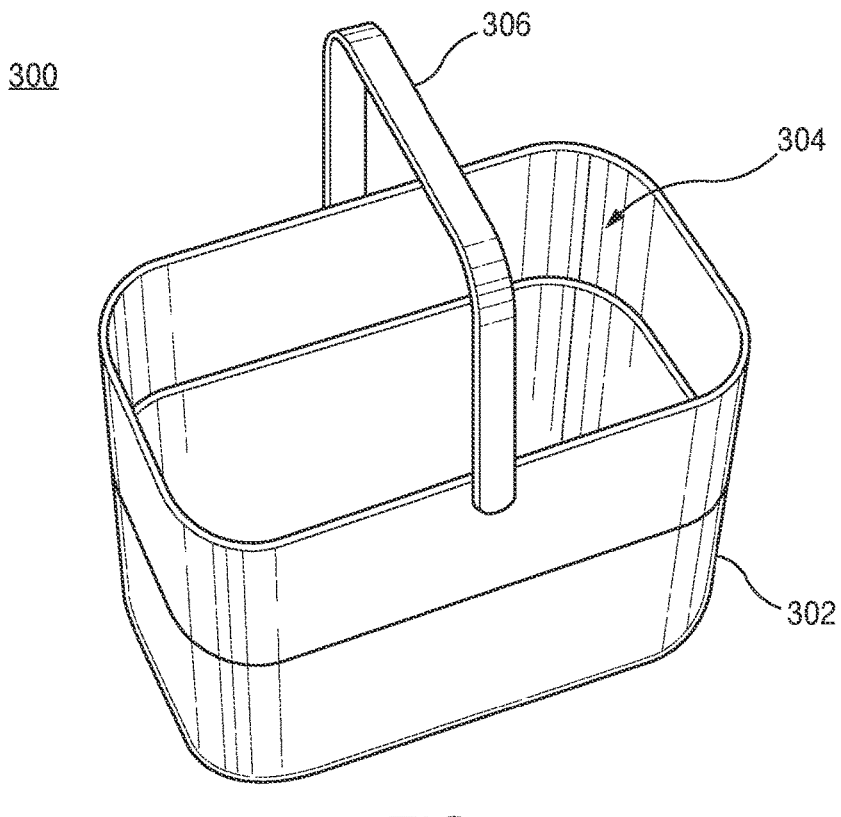
FIG. 3 includes a perspective view of a processing chamber that comprises a receptacle (also referred to as a "bucket") designed to fit securely within the durable housing of an organic matter processing apparatus according to embodiment.

Another core aspect of the OMPA is providing a processing chamber that not only allows OMPA input to be processed in a consistent, predictable manner, but is also easy to use by various individuals. FIG. 3 includes a perspective view of a processing chamber 300 that comprises a receptacle 302 (also referred to as a "bucket") designed to fit securely within the durable housing of an OMPA. The bucket 302 is preferably user-removable from the durable housing, so as to allow for easier integration into existing workflows. For example, bucket 302 may be placed on the counter during food preparation and then reinstalled in the durable housing afterwards. As another example, bucket 302 may be removed from the durable housing after production of the product is complete to allow for easier handling (e.g., disposal, storage, or use) of the product.

Generally, the bucket 302 is designed so that, when installed in the durable housing, OMPA input can be easily deposited by simply opening the lid of the OMPA. Normally, bucket 302 includes an aperture 304 along its top end that is sized to allow for various forms of OMPA input. In some embodiments, the aperture 304 has a rectangular form that is 200-500 millimeters (mm) (7.87-19.68 inches) in length and 150-300 mm (5.90-11.81) in width. For example, the aperture 304 may have a length of roughly 350 mm (13.78 inches) and a width of roughly 200 mm (7.87 inches). Meanwhile, the bucket 302 may have a roughly prismatic form with a length of 250-500 mm (9.84-19.68 inches), a width of 100-300 mm (3.94-11.81 inches), and a height of 150-350 mm (5.90-13.78 inches). For example, the bucket 302 may have a length of roughly 320 mm (12.60 inches), a width of roughly 195 mm (7.68 inches), and a height of roughly 250 mm (9.84 inches).

Moreover, the bucket 302 may be designed to be easily washable (e.g., in a dishwasher). Thus, bucket 302 may be comprised of one or more durable materials that can withstand prolonged exposure to OMPA input in various states (e.g., moist and dry), as well as repeated washings. Examples of durable materials include plastics, ceramics, metals, and biocomposites. The term "biocomposite," as used herein, may refer to a composite material formed by a matrix (e.g., of resin) and a reinforcement of natural fibers. Biocomposites may be well suited because the matrix can be formed with polymers derived from renewable resources. For example, fibers may be derived from crops (e.g., cotton, flax, or hemp), wood, paper, and the like. This makes biocomposites an attractive option since the benefits (e.g., a focus on renewability and recyclability) align with those offered by the OMPA.

As shown in FIG. 3, a handle 306 may be pivotably connected to opposing sides of the bucket 302. Such a design allows the handle 306 to be pivoted downward when the bucket 302 is installed in the structural body of the OMPA. This can be seen in FIG. 2A, where the handle is folded downward to accommodate a bezel. Thus, handle 306 may be designed so as to not impede the deposition of OMPA input into bucket 302. The handle 306 may be designed to allow a user to easily carry the entire processing chamber 300, with either one or two hands. To ensure that the processing chamber 300 can be transported without issue, bucket 302 may be designed so that, when loaded with product, the weight does not exceed a threshold. The threshold may depend on the size of the bucket 302 and/or the material(s) from which the bucket 302 is made, though it may be desirable to limit the weight to no more than 10-25 pounds (and preferably 15-20 pounds).

Figure 4:
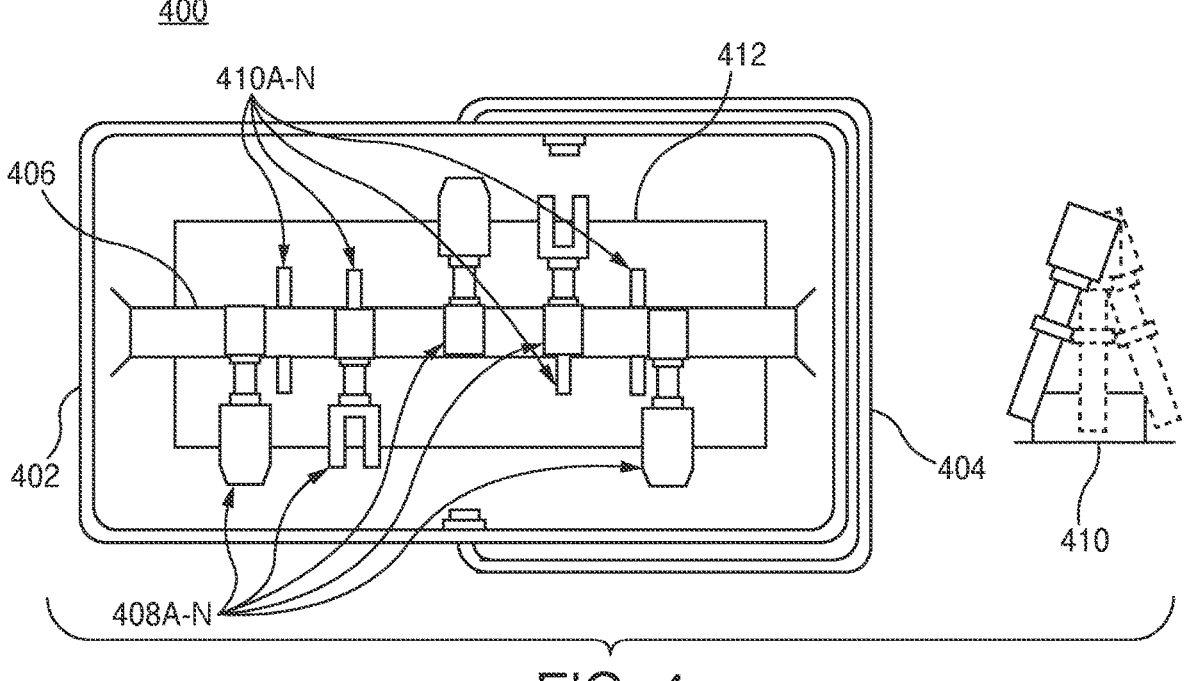
FIG. 4 includes a top view of a processing chamber that includes a bucket with a handle pivotably connected thereto according to embodiment.

FIG. 4 includes a top view of a processing chamber 400 that includes a bucket 402 with a handle 404 pivotably connected thereto. As mentioned above, an OMPA may include one or more grinding mechanisms 408A-N that are responsible for cutting, crushing, or otherwise separating OMPA input deposited into the bucket 402 into fragments.

The grinding mechanisms 408A-N may be part of the processing chamber 400 as shown in FIG. 4. Here, for example, five grinding mechanisms are fixedly attached to a central rod 406 that arranged horizontally across the width of the bucket 402 and is driven by gears (not shown), which are in turn driven by a motor (not shown). The motor may be located in the durable housing, while the gears may be located in or externally to bucket 402.

The grinding mechanisms 408A-N can be driven in such a manner that an appropriate amount of grinding occurs. In some embodiments, the appropriate amount of grinding is predetermined (e.g., programmed in memory of the OMPA). In other embodiments, the appropriate amount of grinding is determined dynamically based on a characteristic of OMPA input in bucket 402. For example, the appropriate amount of grinding may be based on the amount of OMPA input (e.g., as determined based on measurements output by a mass sensor) contained in bucket 402. As another example, the appropriate amount of grinding may be based on the amount of resistance that is experienced by the grinding mechanisms 408A-N. Generally, dried OMPA input that has been at least partially ground will offer less resistance than wet OMPA input or dried OMPA input that has not been ground.

As the central rod 406 rotates, the grinding mechanisms 408A-N may also rotate. Generally, the grinding mechanisms rotate at a rate of 1-10 rotations per minute (RPM), at a rate of 1-2 RPMs, or 1.6 RPMS. This rotating action may cause OMPA input located near the bottom of bucket 402 to be brought toward the top of the bucket 402, such that all OMPA input contained in the bucket 402 is occasionally exposed to the downward airflow emitted from the lid.

The grinding mechanisms 408A-N may not provide sufficient shear on their own to break apart more solid OMPA input. Examples of solid OMPA input include bones, raw produce, and the like. To address this issue, the bucket 402 may include one or more stationary blades 410A-N that can work in concert with some or all of the grinding mechanisms 408A-N. Assume, for example, that the processing chamber 400 includes at least one paddle and at least one two-prong rotating blade. In FIG. 4, the processing chamber 400 can include three paddles and two two-prong rotating blades that are alternately arranged along the length of the central rod 406. In such an embodiment, the stationary blades 410A-N may be positioned so that as each two-prong rotating blade rotates, a corresponding stationary blade will pass through its two prongs to create cutting action. A side view of this scenario is shown in FIG. 4. Paddles may also create some cutting action. However, paddles may create less cutting action than the two-prong rotating blades since (i) the paddles are generally oriented at an angle to promote upward and sideward movement of OMPA input and (ii) the paddles generally pass alongside the stationary blades 410, thereby providing less shear.

Generally, more than one type of grinding mechanism is included in the processing chamber 400. For example, paddles and rotating blades could be arranged in an alternating pattern across the width of the bucket 402 so provide different functionalities. While the paddles may have limited usefulness in terms of grinding OMPA input, the paddles may be useful in churning OMPA input so that wetter material rises toward the top of the bucket 602. Accordingly, some "grinding mechanisms" may be primarily responsible for cutting OMPA input into smaller fragments while other "grinding mechanisms" may be primarily responsible for mixing the OMPA input to promote desiccation.

In FIG. 4, the paddles and rotating blades are shown to be coplanar—though extending from opposing sides of the central rod 406—for the purpose of illustration. The grinding mechanisms 408A-N could be radially arranged about the periphery of the central rod 406 in different ways. For example, the three paddles shown in FIG. 4 could be equally spaced about the circumference of the central rod 406 to ensure that OMPA input contained in the bucket 402 is constantly, or nearly constantly, jostled. Generally, the two-prong rotating blades are offset to minimize the torque that is needed to cut through OMPA input at any given point in time. Said another way, the two-prong rotating blades may be offset so that only one is actively cutting OMPA input in conjunction with its corresponding stationary blade 410 at a time. Here, for example, the two two-prong rotating blades are offset by 180 degrees, though the blades could be offset by more or less than 180 degrees.

Grinding mechanisms (and the power available to those grinding mechanisms) may govern the types of OMPA input that can be handled by a given OMPA. Generally, stronger grinding mechanisms in combination with more power will allow heavier duty OMPA input (e.g., bones) to be handled without issue. Accordingly, different embodiments of OMPA could be designed for residential environments (e.g., with less power and weaker grinding mechanisms) and commercial environments (e.g., with more power and stronger grinding mechanisms).

In some embodiments, the bucket 402 can include a thermally conductive base portion 412 that is responsible for conveying heat to the OMPA input. Normally, the thermally conductive base portion 412 may extend up the longitudinal sidewalls of bucket 402 that are parallel to the central rod 406. In embodiments where the thermally conductive base portion 412 is responsible for heating the OMPA input, the thermally conductive base portion 412 may extend up the longitudinal sidewalls roughly 40-70 percent of their height. In embodiments where the thermally conductive base portion 412 is responsible for heating the OMPA input and air in the "headspace" of the processing chamber 600, the thermally conductive base portion 412 may extend up the longitudinal sidewalls roughly 70-90 percent of their height.

When the bucket 402 is installed within the durable housing, the thermally conductive base portion 412 may be electrically connected to a heating element (e.g., a resistive heating element in the form of a coil) that is located in the durable housing. The heating element may be part of bucket 402. In some embodiments, the heating element can be located external to bucket 402. In such embodiments, the thermally conductive base portion 412 of bucket 402 may be heated through contact with the heating element. Accordingly, the thermally conductive base portion 412 may be heated through thermo-mechanical conductive heating or on-bucket electrical heating instead of convective heating.

A mass sensing system may be incorporated into the OMPA so that mass measurements can be made throughout an organic matter processing cycle or anytime the bucket is present within the OMPA. The mass sensing system may include one or more mass sensors such as, for example, piezoelectric mass sensors. Alternatively, the mass sensing system may include a strain gauge mass sensor.

One or more mass sensors can be located along the bottom of the OMPA (e.g., on each "foot" where the OMPA terminates along a substantially planar level). These mass sensor(s) can be used to measure the weight of the OMPA (and thus, the weight of contents of the processing chamber). However, because bucket 402 can be removable installed within the durable housing, mass sensors could additionally or alternatively be located along the bottom of the bucket 402. As an example, a mass sensor may be located on each "foot" of bucket 602. In yet another embodiment, the mass sensor can be integrated into bucket 602. Regardless of location, the mass sensor(s) included in the OMPA may continually or periodically output measurements that can be used to calculate, infer, or otherwise establish the total weight of the bucket 402 (including any OMPA input stored therein). These measurements can be communicated to a controller (e.g., controller 110 of FIG. 1). The controller may determine how to control other components of the OMPA (e.g., its drying and grinding mechanisms) based on these measurements. For example, the controller may determine how long to perform high intensity processing based on the rate at which the weight lessens due to loss of moisture. Mass sensing may play an important role in ensuring that the OMPA can dynamically react to changes in the state of the OMPA input.

Practical Lid

An important aspect of increasing adoption is that the OMPA should be easily deployable and operable. The component with which many users will interact most frequently is the lid (e.g., lid 204 of FIG. 2A). Accordingly, it is important that the lid be easy to use but also offer some functionality.

Figure 5:
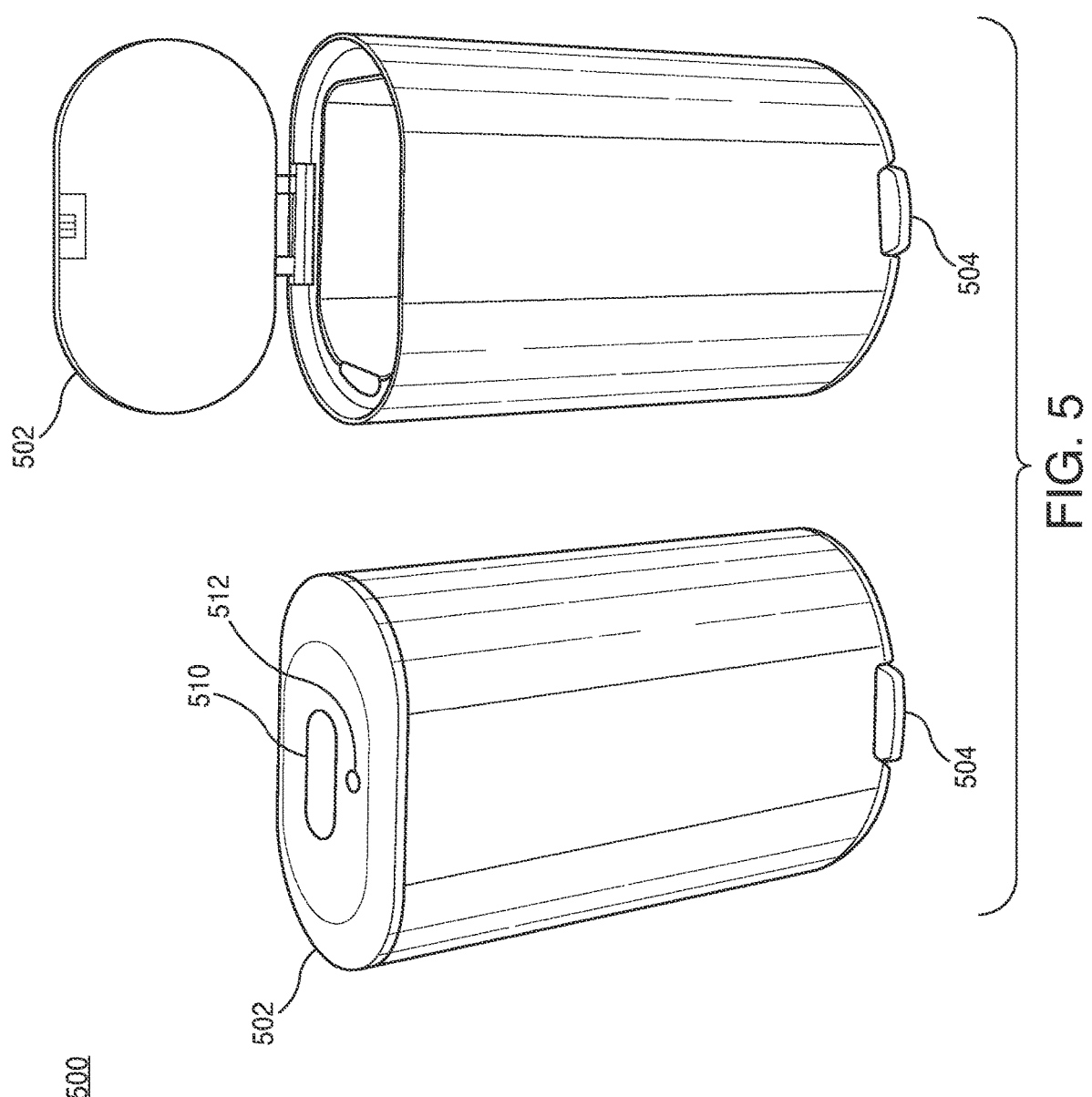
FIG. 5 includes front perspective views of an organic matter processing apparatus with the lid in a closed position and an open position according to embodiment.

As an example, a user may not only be able to open the lid with her hands, but also by interacting with an electro-mechanical pedal switch that is accessible along the front side of the OMPA. FIG. 5 includes front perspective views of OMPA 500 with the lid 502 in a closed position and an open position. In one embodiment pedal 504 may be an electro-mechanical pedal switch may be located along the front side of OMPA 500. When a user applies pressure to the pedal switch 504 (e.g., with her foot), the lid 502 may be electro-mechanically actuated to the open position. As further discussed below, the open position may be one of multiple open positions to which the lid 502 can be actuated. When the user stops applying pressure to the pedal switch 504, the lid 502 may automatically close. The lid 502 may not close immediately, however. Instead, the lid 502 may be electro-mechanically actuated to the closed position a short interval of time (e.g., several seconds). Thus, the pedal switch 504 may allow the lid 502 of the OMPA 500 to be partially, if not entirely, operated in a hands-free manner.

As another example, the lid may be controllably lockable, for example, via a damped mechanism with a smooth spring-loaded retraction. Assume, for example, that the OMPA is performing high intensity processing where the processing chamber is heated. In such a situation, the lid may remain locked so long as the temperature of the processing chamber (or its contents) remains above a threshold (e.g., programmed in memory). This locking action may serve as a safety mechanism by ensuring that a user cannot easily access the interior of the OMPA under unsafe conditions. Note, however, that the user may still be able to override this locking action (e.g., by interacting with an input mechanism accessible along the exterior of the OMPA).

In another embodiment, pedal 504 may be a mechanically linked to lid 502 such that depression of pedal 504 causes a mechanical linkage to open lid 502, and that the release of pedal 504 enables the mechanical linkage to return to a steady state, resulting in closure of lid 502. In yet another embodiment, pedal 504 may be omitted and lid can be opened manually, for example, or lid 502 may be connected to a motor that opens and closes lid 502 when a sensor (e.g., IR sensor) detects presence of a hand waving near lid 502.

Air may be "sucked" downward whenever the lid is opened, thereby preventing odors from escaping into the ambient environment. This action may be particularly helpful in preventing odors from escaping the OMPA when the lid is opened mid-cycle (i.e., while the OMPA input is being dried or ground). This action can be initiated by a controller based on one or more outputs produced by a sensor that is located proximate to where the lid contacts the durable housing when in the closed position. For example, a sensor could be located along the periphery of the lid, and its output may be indicative of whether the lid is adjacent to the durable housing (i.e., in the closed position). As another example, a sensor could be located along the periphery of the durable housing, and its output may be indicative of whether the lid is adjacent to the durable housing (i.e., in the closed position).

Lid 502 may include display 510 and user interface 512. Display 510 may provide status information indicative of one or more states of the OMPA. For example, display may include one or more LEDs (e.g., dead-fronted LEDs) or a display screen that shows status information, pictures, or video. User interface 512 can include one or more buttons or touch screen. In some embodiments, display 510 and user interface 512 may be the same. A user may interact with user interface 512, for example, to start an OMPA processing cycle.

Overview of Operating States

Figures 10A, 10B, 10C:
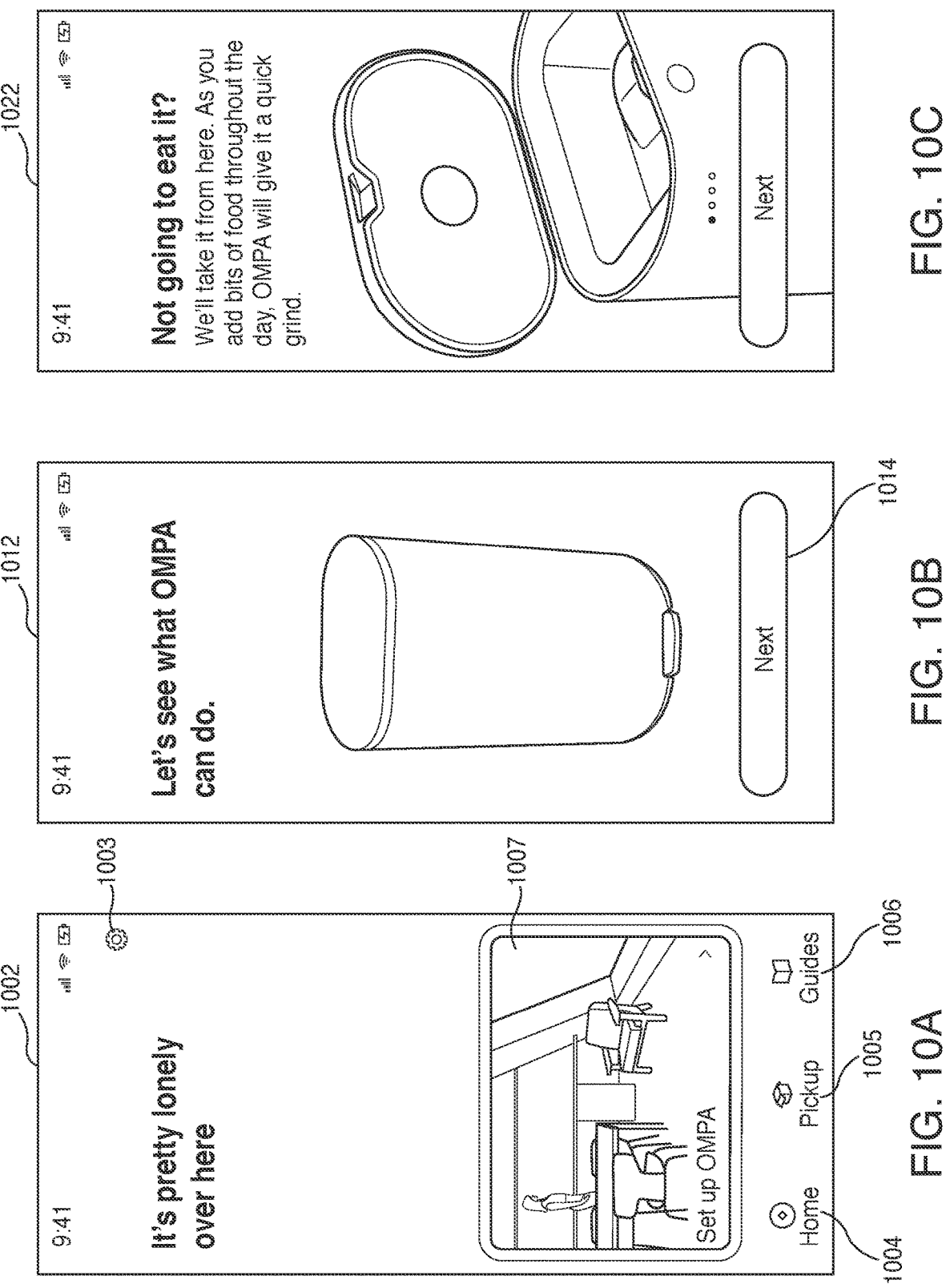

Over time, the OMPA may cycle between various states to process OMPA input. As mentioned above, the OMPA may be able to convert OMPA input into a relatively stable product (e.g., food grounds) by drying and grinding the OMPA input. The control parameters for drying or grinding the OMPA input may be dynamically computed (e.g., by the controller 110 of FIG. 1) as a function of the outputs produced by sensors tasked with monitoring characteristics of the air traveling through the OMPA, as well as the mass or weight of the OMPA input in the processing chamber. For example, the control parameters could be dynamically computed as a function of (i) humidity of the air traveling through the OMPA, (ii) temperature of the air traveling through the OMPA, and (iii) weight of OMPA input contained in the OMPA. FIG. 10 includes an example of an operating diagram that illustrates how control parameters can be dynamically computed in accordance with an intelligent time recipe in order to process the contents of an OMPA.

As mentioned above, the OMPA may be able to intelligently cycle between different states to process OMPA input. Six different states are described in Table I. Those skilled in the art will recognize, however, that embodiments of the OMPA may be able to cycle between any number of these states. For example, some OMPAs may only be able to cycle between two, three, or four of these states, while other OMPAs may be able to cycle between all six states.

The OMPA may rely on a single target criterion or multiple target criteria to determine when to cycle between these states. The target criteria could be programmed into the memory of the OMPA, or the target criteria could be specified by a user (e.g., through an interface generated by a control platform). Examples of target criteria include moisture level, temperature, and weight. Using moisture level as an example, there may be multiple preset moisture levels (e.g., 10, 20, 30, and 40 percent) from which the target criterion could be selected (e.g., based on the nature of the OMPA input). The OMPA may not measure moisture of the OMPA input, but can instead predict or infer the moisture based on, for example, the humidity of air traveling through the OMPA and the weight of OMPA input. The OMPA could also rely on the average times for completion of these states.

Assume, for example, that the OMPA receives input indicative of a request to process OMPA input deposited into the processing chamber. In such a situation, the OMPA may determine when to schedule the various states based on (i) how long those states have historically taken to complete and (ii) the weight of the OMPA input, among other factors. For example, the OMPA may attempt to schedule high intensity processing to be completed overnight as the grinding mechanisms may operate at a noise that might disturb nearby individuals.

TABLE I

| Descriptions of states for processing OMPA input. | |
| --- | --- |
| State Identifier (ID) | State Description |
| High Intensity Processing (HIP) | Goal: Achieve the target moisture level at a given temperature. Details: Temperature, airflow, and/or grinding mechanisms can be set to high settings. HIP normally takes at least several hours to complete, so the OMPA may attempt to schedule overnight. HIP may be triggered manually (e.g., via an interaction with an input mechanism, or via an instruction provided through the control platform) or automatically (e.g., based on a determination that the weight of the OMPA input exceeds a threshold). |
| Sanitize | Goal: Kill at least a predetermined number (e.g., greater than 99 percent) of pathogens. Details: Settings are similar to HIP, though the temperature is higher. By default, sanitization may be performed before, during, or after HIP. Thus, sanitization may be considered part of HIP in some instances. |
| Low Intensity Processing (LIP) | Goal: Advance drying in a non-intrusive manner while individuals are more likely to be nearby (e.g., during daylight hours). Details: Temperature, airflow, and/or grinding mechanisms can be set to low settings. While LIP may be similar to HIP in operation, LIP may be more suitable if individuals may be nearby. For example, the noise generated by the grinding mechanisms will typically be more tolerable at low settings than at high settings. |
| Burst Grind | Goal: Incorporate wet (e.g., unprocessed) OMPA input into dry (e.g., processed or semi-processed) OMPA input to make drying easier. Details: Temperature and airflow may be maintained at the same settings as the prior state (e.g., HIP or LIP), but the grinding mechanisms can be set to a higher state to grind the wet OMPA input that has been newly added. Burst grind may be performed when new OMPA input is added to the processing chamber while HIP or LIP is being performed. |
| Standby | Goal: Conserve power once the target criteria have been reached. Details: Temperatures, airflow, and/or grinding mechanisms can be off, unless necessary to meet some other criterion. For example, airflow and/or grinding mechanisms may be occasionally triggered to maintain an odor criterion. |
| Cooldown | Goal: Allow the user to handle the processing chamber. Details: Settings are similar to standby, though airflow may be higher if necessary to cool the processing chamber or the product stored therein. |

As mentioned above, the durations of these states can be dynamically determined based on, for example, analysis of outputs generated by sensors housed in the OMPA. However, the durations of these states are predefined—at least initially—in some embodiments. For example, high intensity processing may be programmed to occur for a certain amount of time (e.g., 4, 6, or 8 hours), and burst grind may be programmed to occur for a certain amount of time (e.g., 30 seconds, 5 minutes, 30 minutes) whenever new OMPA input is added. Those skilled in the art will also recognize that the duration of some states could be dynamically determined, while the duration of other states could be predefined. As an example, the OMPA may continue performing high intensity processing until the target criteria are achieved. However, whenever new OMPA input is added, the OMPA may cycle to burst grind for a certain amount of time (e.g., 30 seconds, 5 minutes, 30 minutes) before reverting back to its previous state.

It should be understood that the foregoing discussion of the OMPA is merely illustrative and that many different OMPA configurations can exist, each of which can operate in connection with the software platform discussed herein. For example, the grinding mechanism, the heating mechanism, or the control scheme for converting OMPA input to OMPA output may be different than that described herein. Other examples of OMPAs, control systems thereof, safety systems thereof, and uses thereof can be found, for example, in commonly owned U.S. patent application Ser. Nos. 17/897,428, 17/897,457, 17/897,499, 17/897,505, 17/897,507, 17/897,515, and 17/897,518, all filed Aug. 29, 2022, and wherein disclosures of each of these patent applications are incorporated herein in their entireties.

Overview of Control Platform

In some situations, it may be desirable to remotely interface with an OMPA. For example, a user may want to initiate high intensity processing if she is not at home and does not expect to return home for an extended duration (e.g., several hours). This could be done through a control platform that is communicatively connected to the OMPA. Thus, the user may be able to interact with the OMPA through the control platform. Through the control platform, the user may also be able to view information regarding the OMPA (e.g., its current state, average duration of each state, how much OMPA input has been processed over a given interval of time, current weight of the bucket and its contents) through interfaces that are generated by the control platform.

Figure 6:
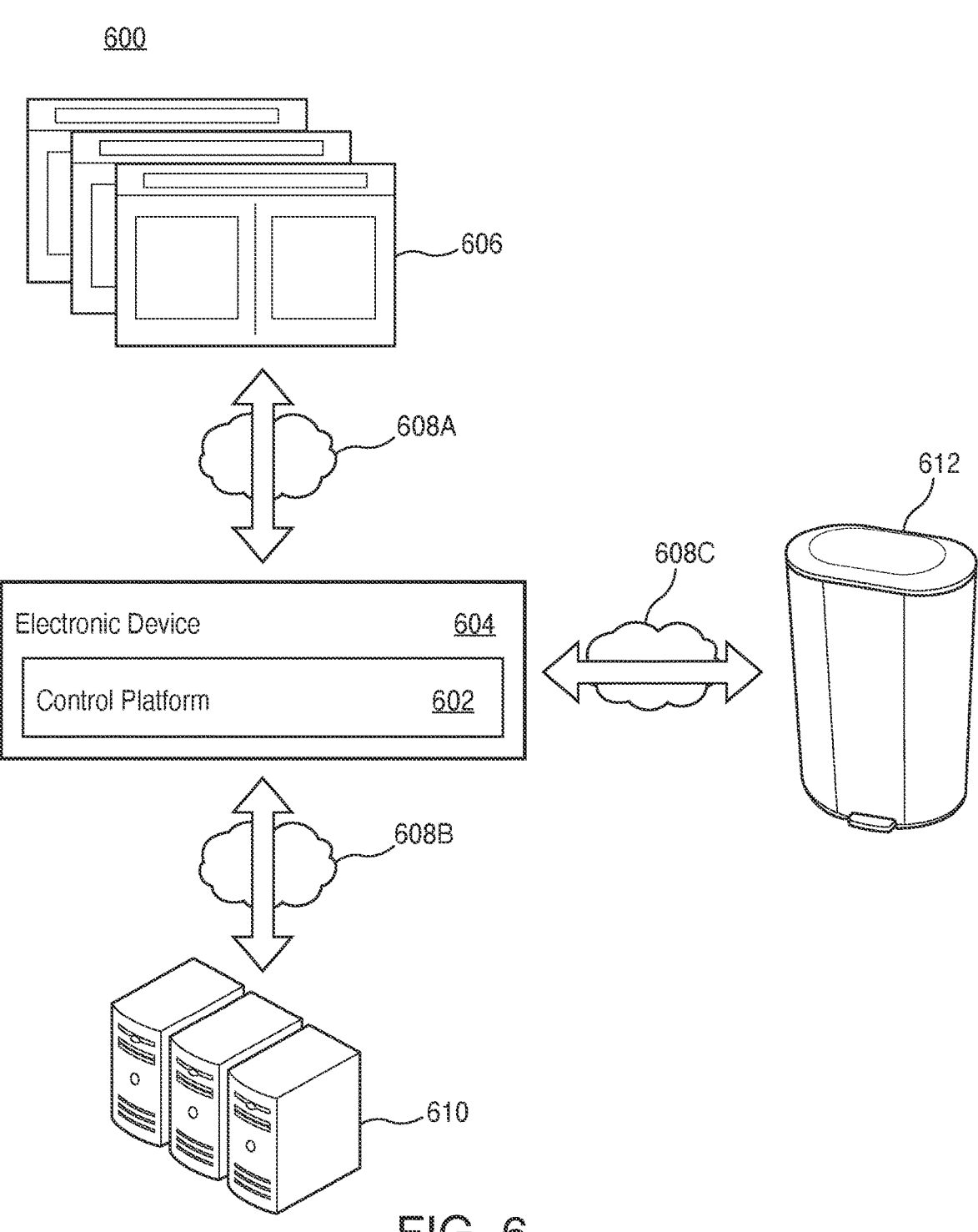
FIG. 6 illustrates a network environment that includes a control platform according to embodiment.

FIG. 6 illustrates a network environment 600 that includes a control platform 602. For the purpose of illustration, the control platform 602 may be described as a computer program that is executing on an electronic device 604 accessible to a user of OMPA 612. As discussed above with reference to FIG. 1, OMPA 612 may include a communication module that is responsible for receiving data from, or transmitting data to, the electronic device 604 on which the control platform 602 resides.

Users may be able to interface with the control platform 602 via interfaces 606. For example, a user may be able to access an interface through which information regarding OMPA 612 can be viewed. This information may include historical information related to past performance (e.g., total pounds of OMPA input that has been processed), or this information may include state information related to current activity (e.g., the current state of OMPA 612, an indication of whether OMPA 612 is presently connected to the electronic device 604, an indication of whether OMPA 612 is presently locked). Thus, a user may be able to educate herself on the OMPA and its contents by reviewing content posted to interfaces generated by the control platform 602.

Moreover, a user may be able to access an interface through which instructions can be provided to OMPA 612. Said another way, the user may be able to specify, through the control platform 602, when or how OMPA 612 should process OMPA input stored therein. As an example, the OMPA 612 may initially be configured to perform high intensity processing between 10 PM and 8 AM under the assumption that its ambient environment will generally be devoid of individuals during that timeframe. However, the user may be able to adjust aspects of setup or operation of OMPA 612 through the control platform 602. For instance, the user could specify that high intensity processing should not begin until 2 AM, or the user could specify that high intensity processing should not end after 6 AM.

A user could also program, through the control platform 602, a preference regarding the weight at which to empty the processing chamber of OMPA 612. On its own, the processing chamber may weigh 8-10 pounds. The total weight of the processing chamber (including its contents) can quickly become unwieldy for some users, such as elderly individuals and juvenile individuals. Accordingly, the control platform 602 may permit users to define a weight at which to generate notifications (also referred to as "alarms"). Assume, for example, that a user indicates that the total weight of the processing chamber (including its contents) should not exceed 15 pounds through an interface generated by the control platform 602. In such a scenario, the control platform 602 may monitor mass measurements received from OMPA 612 and then generate a notification in response to determining that the total weight of the processing chamber (including its contents) is within a certain amount of 15 pounds. The certain amount may be a fixed value (e.g., 1 pound or 2 pounds), or the certain amount may be a dynamically determined value (e.g., 5 percent or 10 percent of the weight specified by the user).

The notification could be presented in various ways. In embodiments where the control platform 602 is implemented as a computer program executing on an electronic device 604 as shown in FIG. 6, the notification may be generated by the computer program (e.g., in the form of a push notification). Additionally or alternatively, the control platform 602 may transmit an instruction to OMPA 612 to generate the notification. Accordingly, the notification could be a visual, audible, or tactile notification that is generated by the electronic device 604 or OMPA 612.

As shown in FIG. 6, the control platform 602 may reside in a network environment 600. Thus, the electronic device 604 on which the control platform 602 is implemented may be connected to one or more networks 608A-C. These networks 608A-C may be personal area networks (PANs), local area networks (LANs), wide area networks (WANs), metropolitan area networks (MANs), cellular networks, or the Internet. Additionally or alternatively, the electronic device 604 could be communicatively connected to other electronic devices—including OMPA 612—over a short-range wireless connectivity technology, such as Bluetooth, NFC, Wi-Fi Direct (also referred to as "Wi-Fi P2P"), and the like.

In some embodiments, at least some components of the control platform 602 are hosted locally. That is, part of the control platform 602 may reside on the electronic device 604 that is used to access interface 606 as shown in FIG. 6. For example, the control platform 602 may be embodied as a mobile application that is executable by a mobile phone. Note, however, that the mobile application may be communicatively connected to (i) OMPA 612 and/or (ii) a server system 610 on which other components of the control platform 602 are hosted.

In other embodiments, the control platform 602 is executed entirely by a cloud computing service operated by, for example, Amazon Web Services®, Google Cloud Platform™, or Microsoft Azure®. In such embodiments, the control platform 602 may reside on a server system 610 that is comprised of one or more computer servers. These computer servers can include different types of data (e.g., regarding batches of product that have been produced by OMPAs associated with different users), algorithms for implementing the routine described above (e.g., based on knowledge regarding ambient temperatures, humidity, etc.), algorithms for tailoring or training the routine described above (e.g., based on knowledge gained from nearby OMPAs or comparable OMPAs), and other assets (e.g., user credentials). Those skilled in the art will recognize that this information could also be distributed amongst the server system 610 and one or more other electronic devices. For example, some data that is generated by a given OMPA may be stored on, and processed by, that OMPA or an electronic device that is "paired" with that OMPA. Thus, not all data generated by OMPAs—or even the control platform—may be transmitted to the server system 610 for security or privacy purposes.

One benefit of having a network-connected OMPA is that it enables connectivity with other electronic devices, and thus integration into related systems.

Assume, for example, that a user purchases and then deploys a OMPA in a home. This OMPA may include a set of instructions (also referred to as the "intelligent time recipe") that, when executed, indicate how its components are to be controlled. These instructions may involve the execution of heuristics, algorithms, or computer-implemented models. Rather than learn best practices "from scratch," the OMPA (or a control platform to which it is communicatively connected) may be able to learn from the experiences of other OMPAs. These OMPAs may be located nearby, and therefore may experience comparable ambient conditions such as humidity, temperature, and the like. Alternatively, these OMPAs may be comparable, for example, in terms of amount of actual or expected OMPA input, type of actual or expected OMPA input, number of users (e.g., a single individual versus a family of four individuals), etc. Thus, knowledge may be shared among OMPAs as part of a networked machine learning scheme. Referring again to the above-mentioned example, the OMPA may initiate a connection with a control platform after being deployed in the home. In such a scenario, the control platform may provide another set of instructions that is learned based on knowledge gained by the control platform from analysis of the activities of other OMPAs. Accordingly, the control platform may further develop instruction sets based on machine learning. Learning may be performed continually (e.g., as OMPAs perform activities and generate data), and insights gained through learning may be provided continually or periodically. For instance, the control platform may communicate instructions to a OMPA whenever a new set is available, or the control platform may communicate a new set of instructions to an OMPA only upon receiving input (e.g., from the corresponding user) indicating that the OMPA is not operating as expected.

As another example, assume that a municipality is interested in collecting the products produced by various OMPAs for further processing (e.g., composting). In such a scenario, the municipality may be interested in information such as the weight and water content of product that is available for collection. Each OMPA may not only have the sensors needed to measure these characteristics as discussed above but may also have a communication module that is able to transmit measurements elsewhere. In some embodiments, these OMPA directly transmit the measurements to the municipality (e.g., by uploading to a network-accessible data interface, such as an application programming interface). In other embodiments, these OMPAs indirectly transmit the measurements to the municipality (e.g., by forwarding to respective control platforms, which then transmit the measurements—or analyses of the measurements—onward to the municipality). With these measurements, the municipality may be able to retrieve, transport, and handle the products produced by these OMPAs in a more intelligent manner. For example, the municipality may have a better understanding of when retrieval needs to occur, and how much storage space is needed for the products, if the weight is shared.

Users may also be able to communicate with one another, directly or indirectly, through OMPA. Assume, for example, that a first OMPA has finished processing its OMPA input into a product. Although processing is complete, a corresponding first user may not be ready to offload the product. In such a situation, a second user who is located nearby (e.g., as determined based on information generated by the respective OMPA, information input by the respective users, etc.) may offer to handle the product. For instance, the second user may retrieve the product from the first user and then handle it, add it to her own product, etc. Users may be able to communicate through the interfaces 606 generated by the control platform 602, or users may be able to communicate directly through their respective OMPAs.

Computing System

Figure 7:
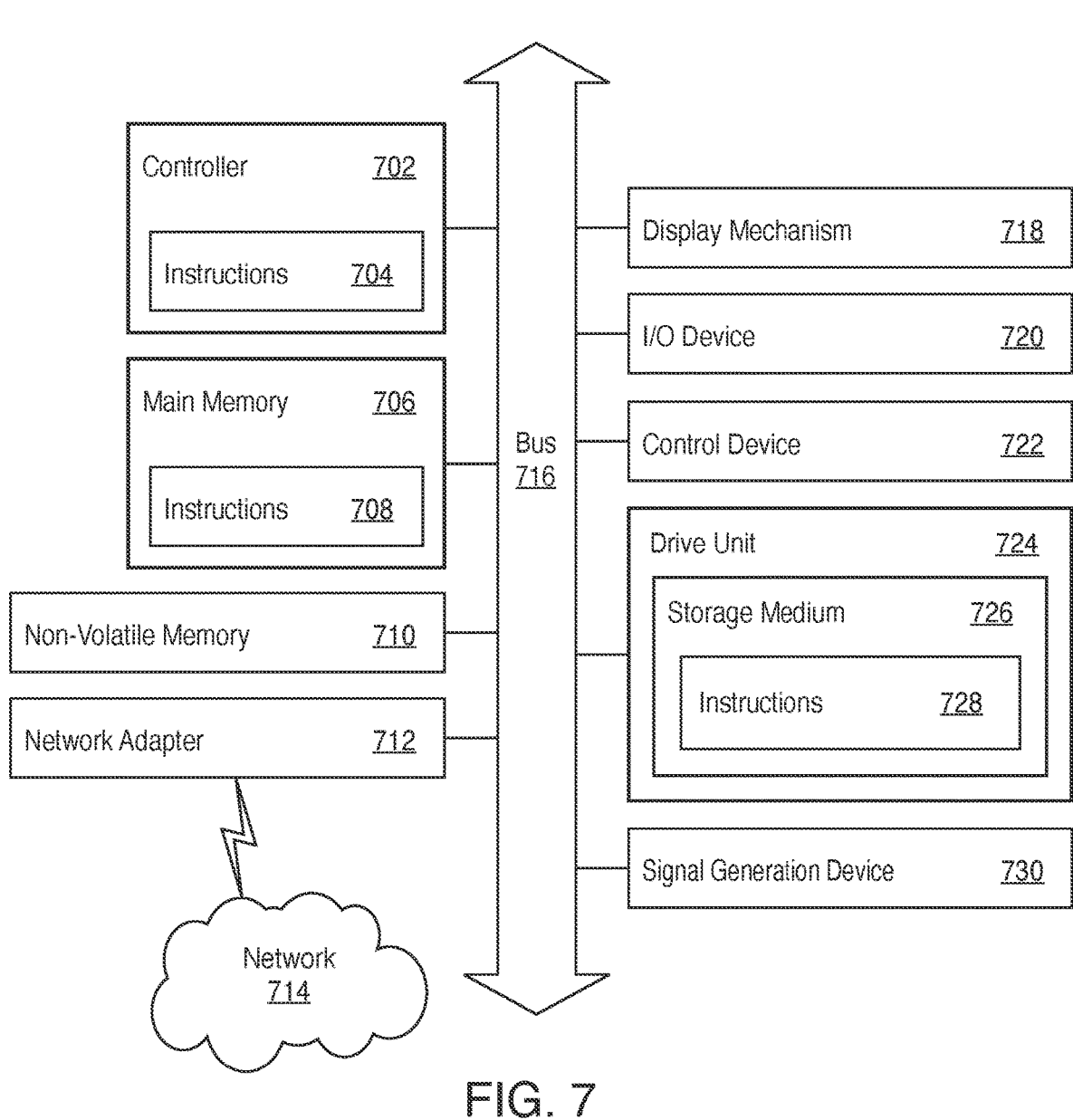
FIG. 7 is a block diagram illustrating an example of a computing system in which at least some operations described herein can be implemented according to embodiment.

FIG. 7 is a block diagram illustrating an example of a computing system 700 in which at least some operations described herein can be implemented. For example, components of the computing system 700 may be hosted on an OMPA that is tasked with converting OMPA input into a more stable product. As another example, components of the computing system 700 may be hosted on an electronic device that is communicatively connected to an OMPA.

The computing system 700 may include a controller 702, main memory 706, non-volatile memory 710, network adapter 712, display mechanism 718, input/output (I/O) device 720, control device 722, drive unit 724 including a storage medium 726, and signal generation device 730 that are communicatively connected to a bus 716. The bus 716 is illustrated as an abstraction that represents one or more physical buses or point-to-point connections that are connected by appropriate bridges, adapters, or controllers. The bus 716, therefore, can include a system bus, a Peripheral Component Interconnect (PCI) bus or PCI-Express bus, a HyperTransport or industry standard architecture (ISA) bus, a small computer system interface (SCSI) bus, a universal serial bus (USB), inter-integrated circuit (I2C) bus, or an Institute of Electrical and Electronics Engineers (IEEE) standard 1394 bus (also referred to as "Firewire").

While the main memory 706, non-volatile memory 710, and storage medium 726 are shown to be a single medium, the terms "machine-readable medium" and "storage medium" should be taken to include a single medium or multiple media (e.g., a database distributed across more than one computer server) that store instructions 728. The terms "machine-readable medium" and "storage medium" shall also be taken to include any medium that is capable of storing, encoding, or carrying instructions for execution by the computing system 700.

In general, the routines executed to implement the embodiments of the present disclosure may be implemented as part of an operating system or a specific computer program. Computer programs typically comprise instructions (e.g., instructions 704, 708, 728) that are set at various times in various memory and storage devices in an electronic device. When read and executed by the controller 702, the instructions cause the computing system 700 to perform operations to execute various aspects of the present disclosure.

The network adapter 712 enables the computing system 700 to mediate data in a network 714 with an entity that is external to the computing system 700 through any communication protocol that is supported by the computing system 700 and the external entity. The network adapter 712 can include a network adaptor card, wireless network interface card, router, access point, wireless router, switch, protocol converter, gateway, bridge, hub, digital media receiver, repeater, or any combination thereof.

Figure 8:
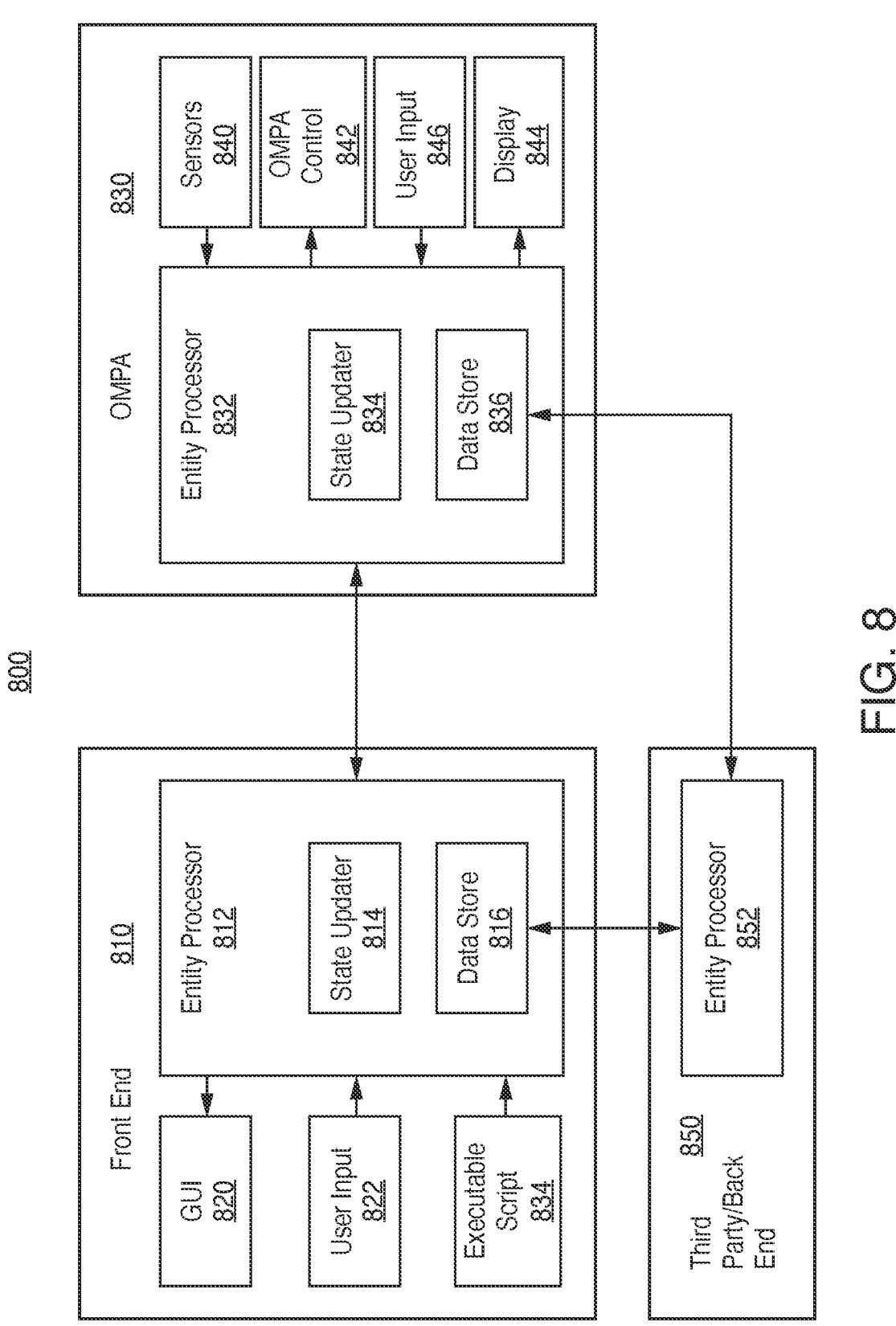
FIG. 8 shows illustrative block diagram of software platform according to an embodiment.

FIG. 8 shows illustrative block diagram of software platform 800 that leverages entity processors, as described herein, to ensure coordinated display of GUI pages with appropriate overlays, icons, and status information reflective of a state of an OMPA and executing client application-executable script elements to control the OMPA on a front end client application, in addition to coordinating exchange of information with a back end client application according to an embodiment. As shown, software platform 800 can include front end 810, OMPA 830, and third party/back end 850. Front end 810 can represent the front end of an application running on device such as, for example, a mobile smartphone, tablet, or computer. OMPA 830 can represent various software and hardware components of an OMPA. Back end 850 can represent a backend server that communicates with the front end or the OMPA. Each of front end 810, OMPA 830, and back end 850 can implement a respective entity processor 812, 832, and 852 for coordinating operation of the front end, OMPA, and back end. Entity processor 812, 832, and 852 may be responsible for transferring information such as status information among front end 810, OMPA 830, and back end 850 such that the appropriate entity processor can implement the necessary changes, if needed, in the software and/or hardware settings. In OMPA 830, OMPA control 842 may serve as a first processor (e.g., control processor) that controls functions of the OMPA and entity processor 822 can serve a second processor (e.g., communications processor) responsible for communicating instructions to OMPA control 842 and to front end 810 or third party/back end 850. For certain actions (e.g., first class actions), notification of completion or initiation of the action is not provided until OMPA control 842 provides confirmation that the action has been completed or initiated (thereby adhering to safety protocols), whereas for other actions (e.g., second class actions), notification can be provided immediately and before OMPA control 842 is able to provide confirmation (thereby reducing latency in communications).

Entity Processor 812 can include state updater 814 and data store 816. State updater 814 can be operative to ensure that any state of the OMPA is updated and maintained at the front end. For example, state updater 814 may receive state information from entity processor 832, and based on that received state information, can generate a GUI page defined by a GUI page format tree for display on the front end as GUI 820. The GUI page format tree may be specific to a particular GUI entity being shown and components of the page format tree may be retrieved from data store 816. For example, components of the GUI page format tree can include status identifier(s), icon(s), overlay(s), user interface element(s), and client application-executable scripts, many or all of which may be stored in data store 816. Many different examples of entity specific GUI pages are described in more detail below. Front end 810 can process user input 822, which in response thereto, entity processor 812 can update GUI 820. If user input 822 is received in connection with executable script 824, entity processor 812 may relay the instruction associated with executable script 824 to entity processor 832 of OMPA 830 or entity processor 852 of back end 850.

Referring now to OMPA 830, entity processor 832 can include state updater 834 and data store 836. State updater 834 can be operative to ensure that any state change implemented on the front end (or the back end) is updated and relayed to the OMPA via OMPA control 843 and/or display 844. For example, if a user initiates an OMPA processing cycle via the front end (e.g., by pressing a start cycle user interface button), this change in OMPA status is received by state updater 834, which can cause the OMPA to begin the processing cycle. Data store 836 can store data related to the operation of the OMPA, including, for example, a schedule, sensor data, and GUI pages for a display screen. In one example, a user may change the OMPA processing cycle using the front end and in response to the user saving the new schedule, the new schedule is provided to entity processor 832, which stores the new schedule in data store 836.

OMPA 830 may include sensors 840 (e.g., mass, humidity, temperature, VOC sensor) that provide data to entity processor 832. This data can be used to change a state of the OMPA. The 17/897,499 application provides examples of several sensors and other sources of data that can be provided to entity processor 832. Some of this data or analyzed version thereof may be provided to front end 810 for display as part of a GUI page. Moreover, the data from sensors 840 can provide status information, including error events, that need to be presented on GUI page. OMPA control 842 may refer to control signals issued by entity processor 832 to control operation of the OMPA. For example, OMPA control can include operation of a grinding mechanism, a drying mechanism, a heating mechanism, sensors, etc. Entity processor 832 can send OMPA control signals in response to executable scripts initiated on the front end. User input 846 can process user inputs processed directed on the OMPA (e.g., such as detecting press of a button on the lid). In some embodiments, depression of the button can be used as part of a setup process or to commence an OMPA processing cycle. Entity processor 832 can interpret the button press event, execute the appropriate action, and report the action to front end 810. For example, if the user presses the button as part of a setup process, this button press can be relayed to the front end, which then may update the GUI page with the next page in a setup cycle being displayed on the front end. Display 846 may display information indicative of the status of the OMPA. For example, if the OMPA is in a setup process, display 846 may indicate that the OMPA is undergoing the setup process. If the OMPA is hot (e.g., because it is currently engaged in a high intensity processing cycle), display 846 may indicate it as such. If OMPA output is ready for collection, display 846 may indicate it as such.

Third party/Back end 850 may include entity processor 852 to coordinate updates and changes among front end 810 and OMPA 830. For example, in one embodiment, OMPA

830 may inform the front end that OMPA output is ready to be removed from the OMPA. The user may acknowledge this action item and confirm that the OMPA output will be removed by pressing the appropriate user interface element on the GUI. The OMPA may confirm removal by checking whether the processing chamber has been removed and when reinserted, has a mass indicative that the OMPA output has been removed. This confirmation can be sent to the front end, which can display an appropriate GUI page, and to the back end, which can collect data for reporting purposes (e.g., to a municipality or city) or for arranging to send pre-paid, pre-addresses mailing packages to the location housing the OMPA.

Figure 9:
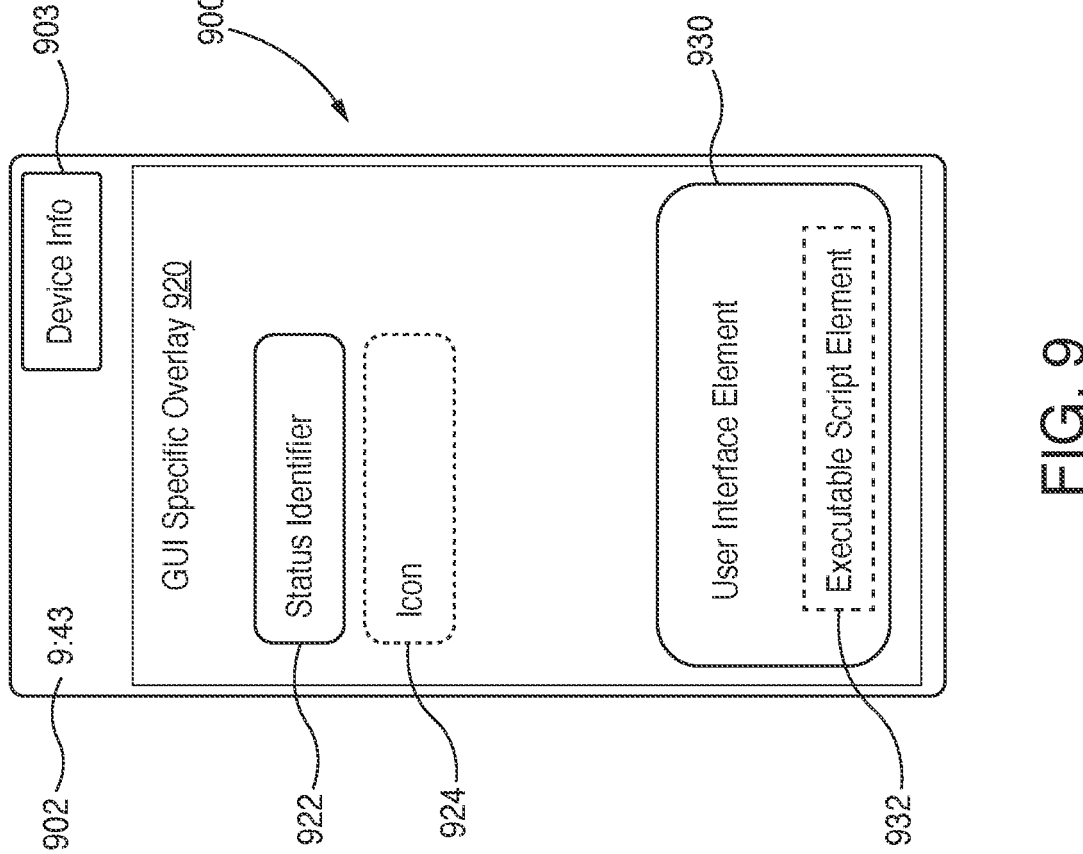
FIG. 9 shows an illustrative screen shot of a front end application being implemented on a portable device according to an embodiment.

FIG. 9 shows an illustrative screen shot of a front end application being implemented on a portable device 900 according to an embodiment. Screen 901 shows time 902, device information 903 (e.g., battery remaining, Wi-Fi strength, etc.), and GUI specific overlay 920. GUI specific overlay 920 may be specific to the entity being presented on the front end of the software platform. Overlay 920 may include graphics and text that are contextually related to the entity page being displayed. Overlay 920 may include status identifier 922, optional icon 924, user interface element 930 and optional executable script element 932. Status identifier 922 may succinctly identify a state of the OMPA (e.g., ready to mill, error notification, processing, etc.). Icon 924 may be a symbol that indicates information related to status identifier 922. For example, a lock icon can specify whether the lid is locked or not. More particularly, a first type of lock icon (e.g. a hot lock) may appear when the OMPA is processing OMPA input, and a second type of lock icon (e.g., a child lock) may appear when the OMPA is in a ready state but is not processing anything. User interface element 930 may be a user selectable element that can cause the GUI page to change in response to user interaction therewith. For example, in one embodiment, selection of user interface element may cause the GUI page to transition to a new GUI page. In some embodiments, an executable script element 932 may be associated with a user interface element. This way, when a user interacts with the user interface element, the interaction can trigger execution of the script element associated with that user interface element.

The content of the GUI page presented on screen 901 is based on the GUI page tree as discussed above, and the entity processor (e.g., entity processor 812) may be responsible for rendering the GUI page according to the GUI page tree for the specific entity being presented. Several examples of these entities are now discussed in connection with FIGS. 10-18.

FIGS. 10A-10F show different GUI pages that can be presented during initial activation of a front end application according to an embodiment. Starting with FIG. 10A, GUI page 1002, with user interface elements 1003-1007. GUI page 1002 can be an illustrative home page, element 1003 can be settings button (selection of which may transition to a settings GUI page shown in FIG. 13B), element 1004 can be a home button (selection of which may transition to a home GUI page), element 1005 can be a pickup button (selection of which may transition to an OMPA output pickup GUI page), and element 1006 can be a guides button (selection of which may transition to a Guides GUI). Element 1007 can be a user interactive introduction button that can introduce the OMPA to the user. Assuming the user selects element 1007, GUI page 1012 may be displayed in FIG. 10B. GUI page 1012 (and GUI pages 1022, 1032, 1042, and 1052) may include informational overlays. GUI page 1012 can include user selectable element 1014 (and GUI pages 1022, 1032, 1042, and 1052 can include respective user selectable elements) that can be selected to advance to the next GUI page. The GUI pages of FIGS. 10B-10F are self-explanatory, however, selection of element 1054 may transition the front end to GUI page 1102 of FIG. 11A.

FIGS. 11A-11K show different GUI pages that can be presented during a setup process according to an embodiment. A front end setup entity may be used in connection with FIGS. 11A-11L to work with an OMPA setup entity according to embodiments discussed herein. Starting with FIG. 11A, an initial OMPA setup screen is displayed as GUI page 1102, with user interface element J04. In response to selection of user interface element 1104, GUI page 1112 of FIG. 11B may be shown. GUI page 1112 may include instructions for the user to install an air treatment chamber (e.g., activated carbon filter) into the OMPA. GUI page 1112 may include progress indicator 1113, and user interface element 1114, which when selected, can cause GUI page 1122 to be displayed in FIG. 11C. GUI page 1122 may include an instruction for the user to plug in the OMPA, after which a display on the OMPA can activate (e.g., a LED light can start blinking blue). Assuming the user plugs in the OMPA, an exchange of data between the front end entity processor and OMPA entity processor can occur to inform the OMPA that the user is currently engaged in a setup process. The OMPA entity processor can cause the display to activate (e.g., start blinking blue) and inform the front end entity processor. When the OMPA is ready to pair with the front end, the user may be permitted to select user interface element 1124. GUI page 1122 can also include progress indicator 1123.

Figures 11A, 11B, 11C:
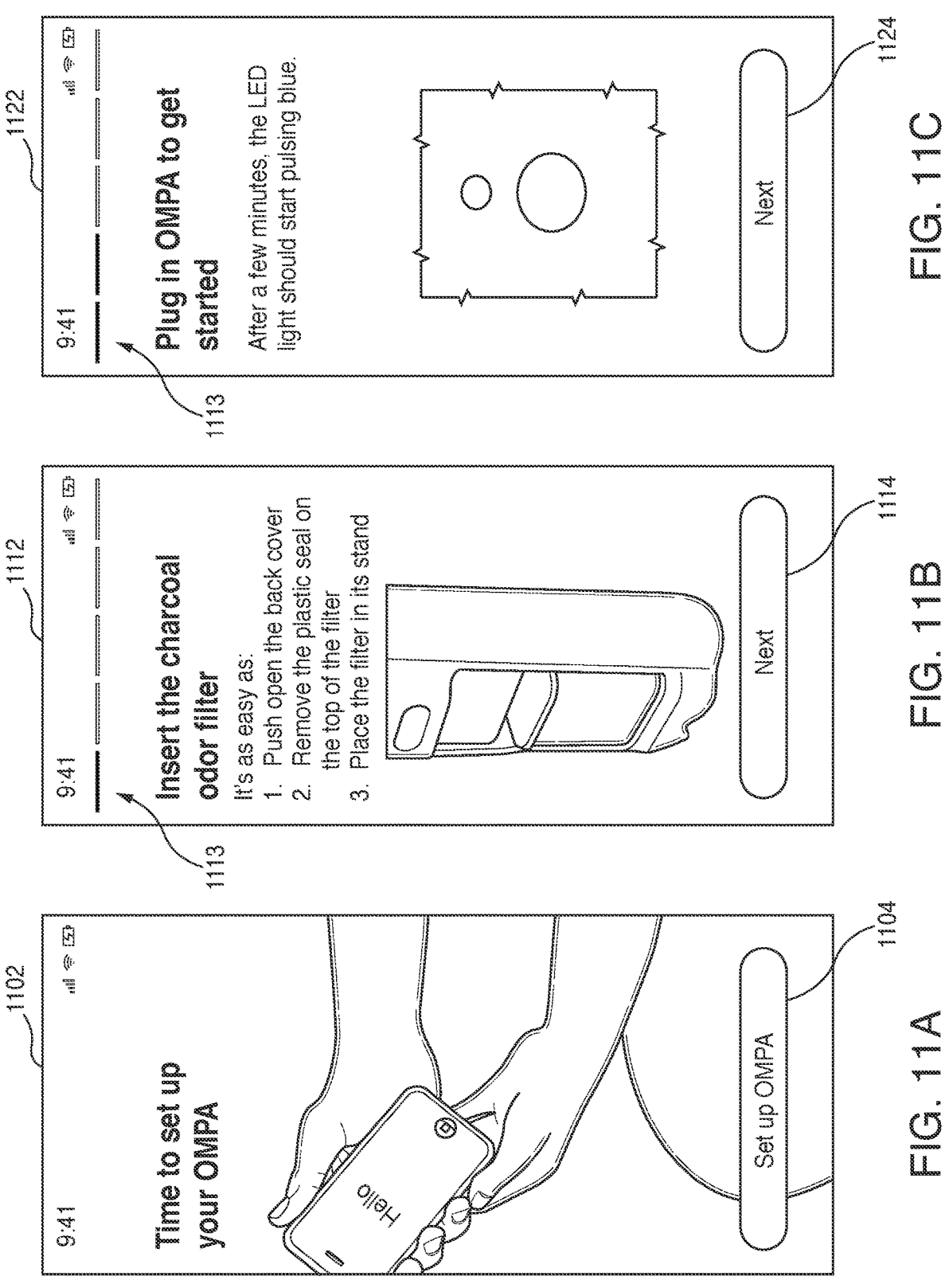
FIGS. 11A-11K show different GUI pages that can be presented during a setup process according to an embodiment.
Figures 11D, 11E, 11F:
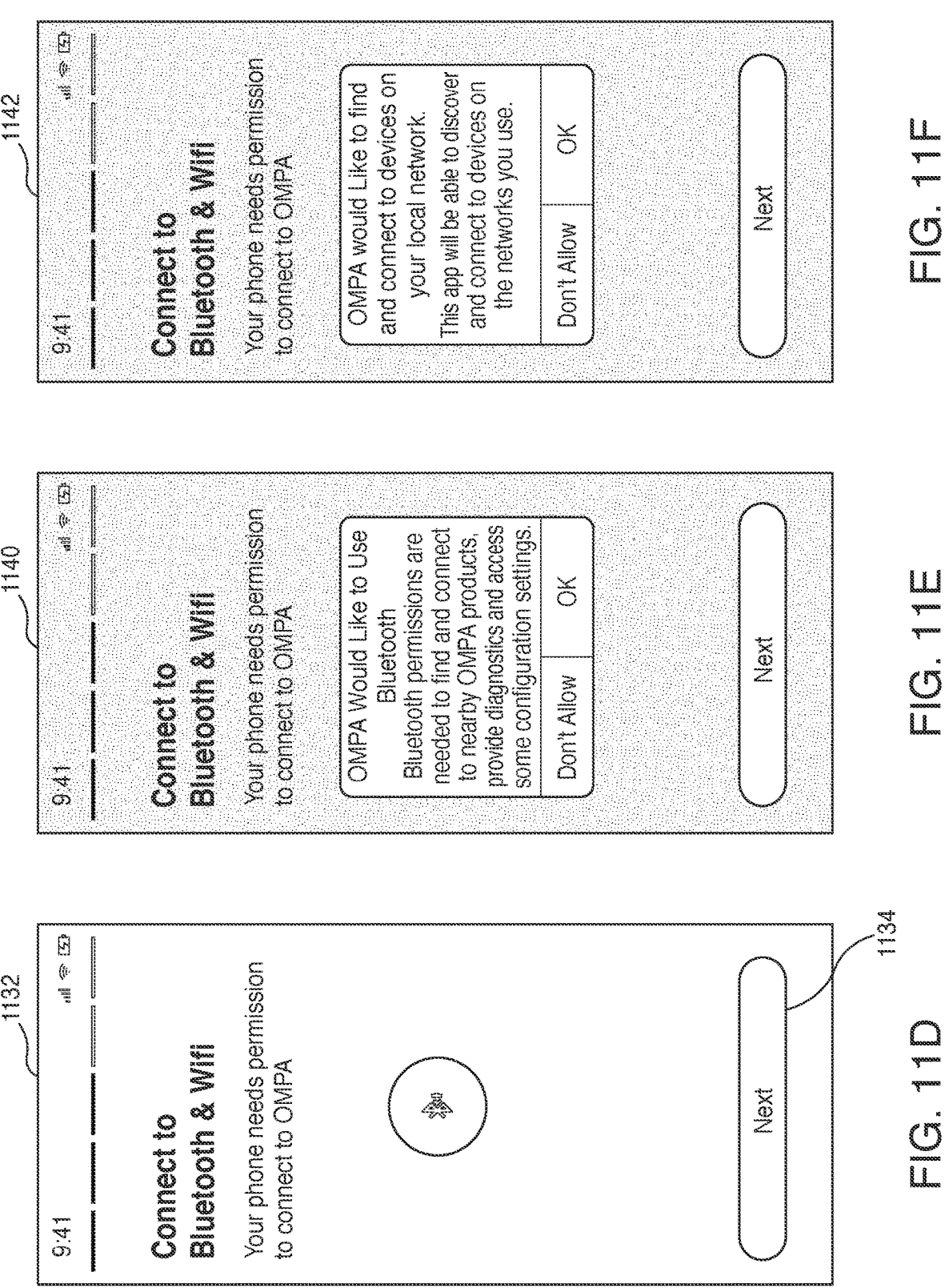
Figures 11G, 11H, 11I:
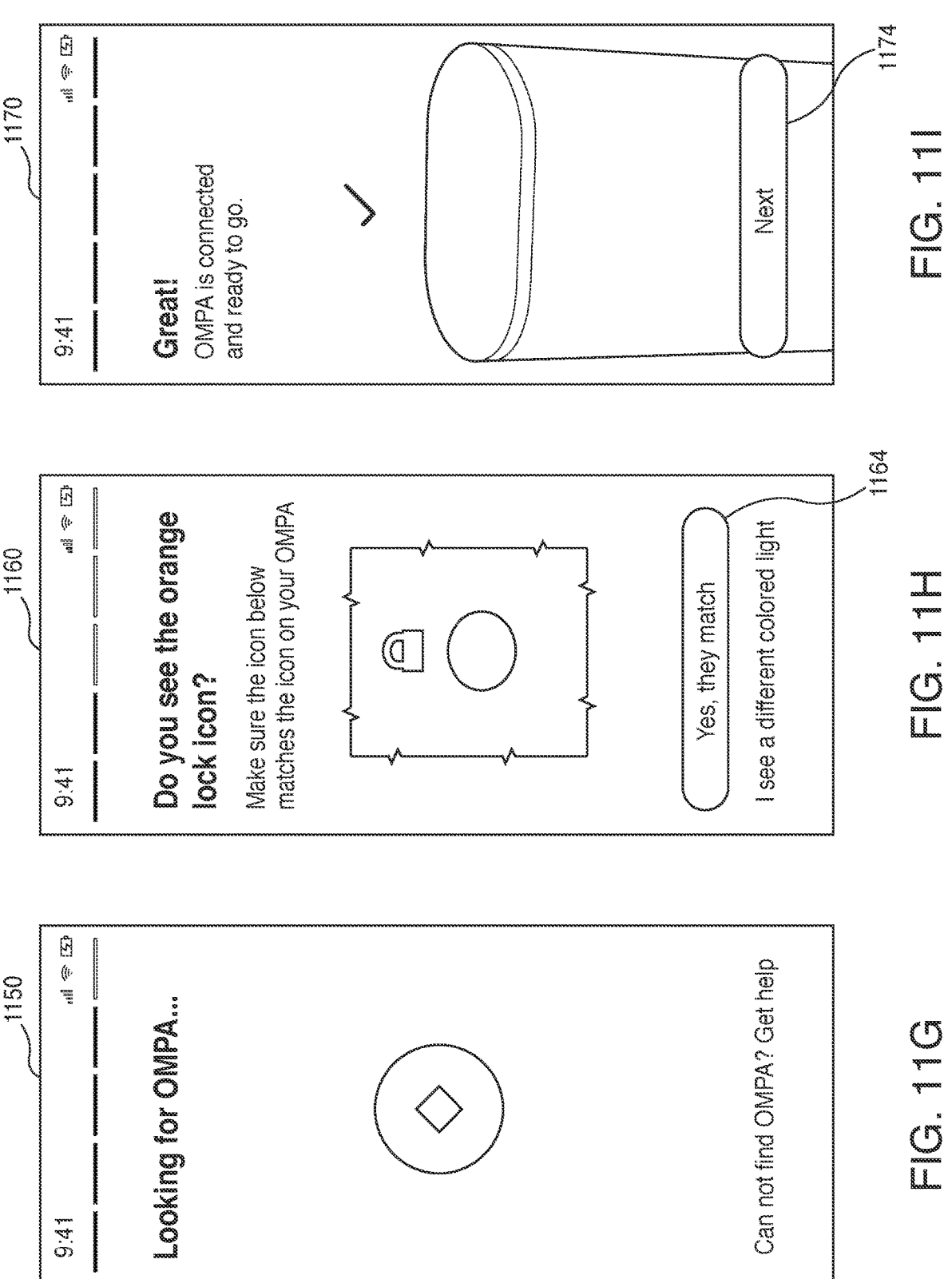
Figures 11J, 11K:
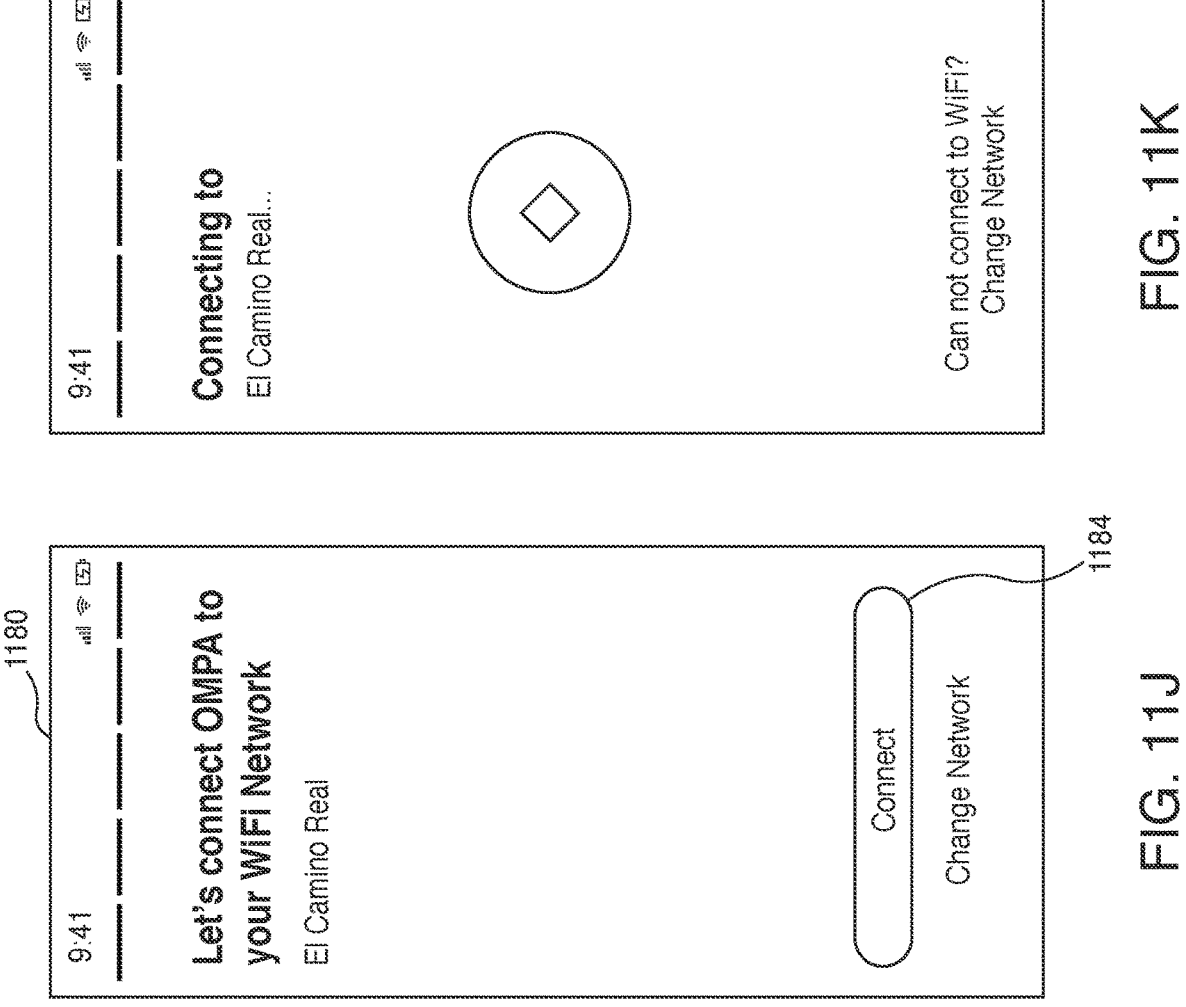

In response to selection of user interface element 1124, GUI page 1132 may be displayed in FIG. 11D. GUI page 1132 may indicate the user's device needs permission to connect to the OMPA. The user may select user interface element 1134 to begin connection via Bluetooth and/or Wi-Fi. Device permission notifications 1140 and 1142 may be presented in FIGS. 11E and 11F, respectively, so that the user can provide the necessary permissions. After permissions are granted, GUI page 1150 of FIG. 11G may be displayed, and after the OMPA is located, GUI page 1160 of FIG. 11H can be displayed. GUI page 1160 may ask the user to confirm that the display on the OMPA matches an icon as shown in GUI page 1160. If the icons match, the user can select user interface element 1164 to confirm that the icons match. After selection of element 1164, GUI page 1170 may be shown in FIG. 11I. GUI page 1170 may confirm that the OMPA is connected and ready to go. The user can select user interface element 1174 to transition to GUI page 1180 of FIG. 11J, which prompts the user to connect the OMPA to the user's WiFi network. The user can connect the OMPA to the WiFi network by selecting user interface element 1184. FIG. 11K shows that the OMPA is connecting to the WiFi network. After the OMPA is connected to the user's local network, the front end application may revert to a home GUI page.

Figures 12A, 12B, 12C:
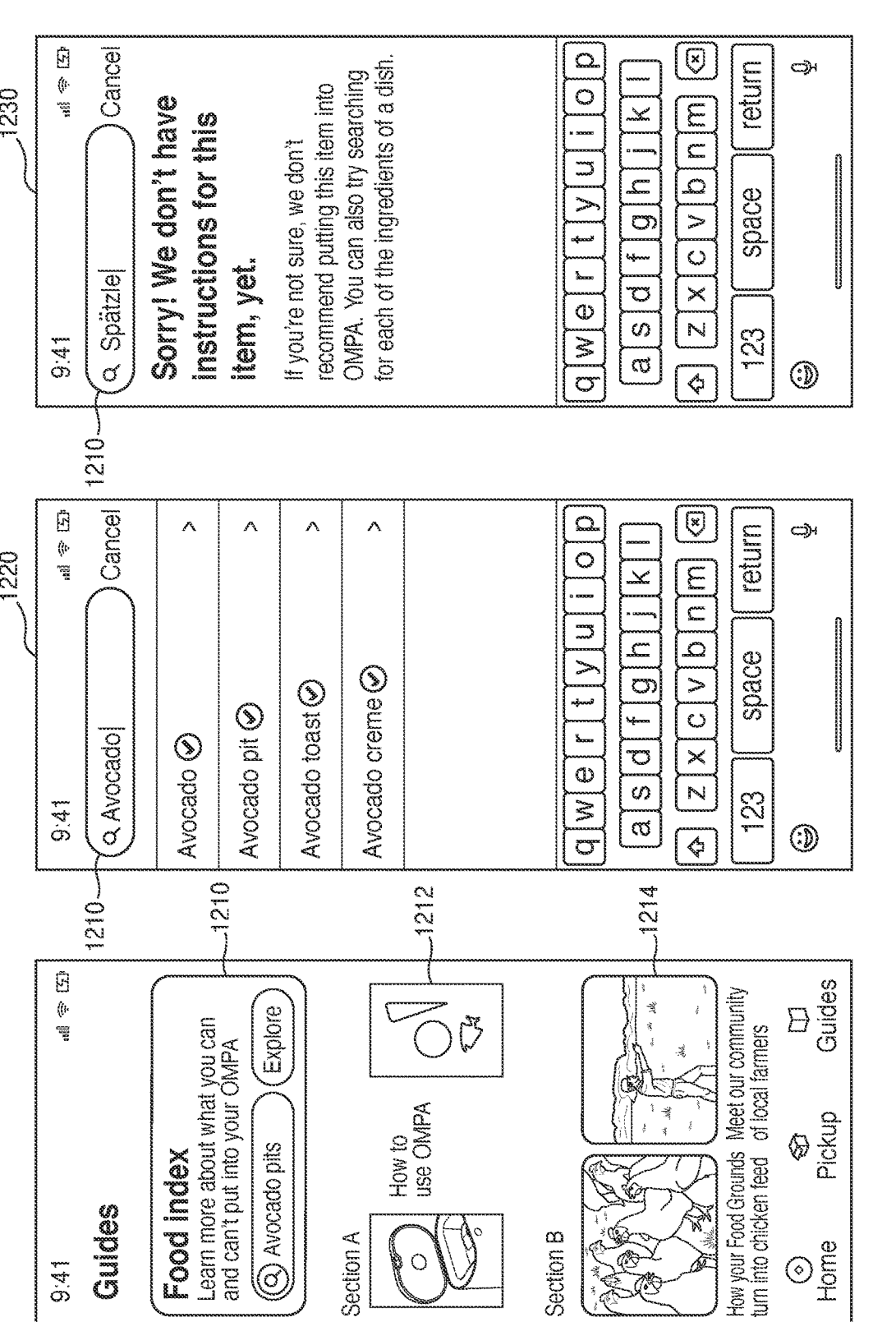

FIGS. 12A-12F show different GUI pages that may be presented on the front end in connection with a "guides" entity according to an embodiment. The "guides" entity may provide different overlays related to various education sessions (e.g., how to use the OMPA, what food is suitable for OMPA input, how OMPA output is further processed, and information on farmers use the OMPA output, etc.) and an index that helps users identify matter that is suitable and not suitable for insertion into the OMPA as OMPA input. In FIG. 12A, a user can enter a food item in user interface element 1210, read up on OMPA specific educational topics in horizontally scrollable user interface element 1212, or read up on OMPA output educational topics in horizontally scrollable user interface element 1214. For elements 1212 and 1214, the user can scroll left to right or right to left to view educational topics to further explore. Additional topics may be available if the user scrolls down further with GUI page of FIG. 12A.

Assuming the user types in "avocado" in element 1210, GUI page 1220 may be provided as shown in FIG. 12B. In response to entry of "avocado" the entity processor may provide several selectable options as part of GUI page 1220 that are related to "avocado." If the user types in an item that is not yet part of a database in element 1210, GUI page 1230 of FIG. 12C may be displayed. In one embodiment, the entity processor may relay the unknown item to the back end entity processor as an action item that can be backfilled by an employee or bot. After the item is classified and a GUI page is created for it, that GUI page may be transmitted back to the front end processor for storage in its datastore.

FIG. 12D shows GUI page 1240 with specific information on a material (e.g., shown here as an avocado) that is classified as okay to add to the OMPA. Some materials can consist of multiple components, some of which may or may not be suitable for adding to the OMPA as OMPA input. GUI page 1240 can specify each component and indicate whether that component can be added to the OMPA. Some materials such as fruit (e.g., banana or avocado) are known to have stickers attached. GUI page 1240 may warn that such stickers should not be inserted into the OMPA.

FIG. 12E shows GUI page 1250 with specific information on another material (e.g., shown here as a coconut) that is classified with cautions as something that can be added to the OMPA. A with-caution material can include some components that can be added and others that cannot. For example, the flesh, butter, and milk derived from a coconut are okay to be added. The water from the coconut warrants caution because too much water affects the operation of the OMPA. The shell of the coconut may not be okay to add because it may be too hard for the OMPA to grind and crush.

FIG. 12F shows GUI page 1260 with specific denial of adding a particular material (e.g., cola, soda, or pop) to the OMPA. In this particular example, cola is primarily a liquid that will require the OMPA to expend too much energy evaporating the water content. The GUI page can inform the user that it is best to pour the cola down the drain.

Figures 13D, 13E, 13F:
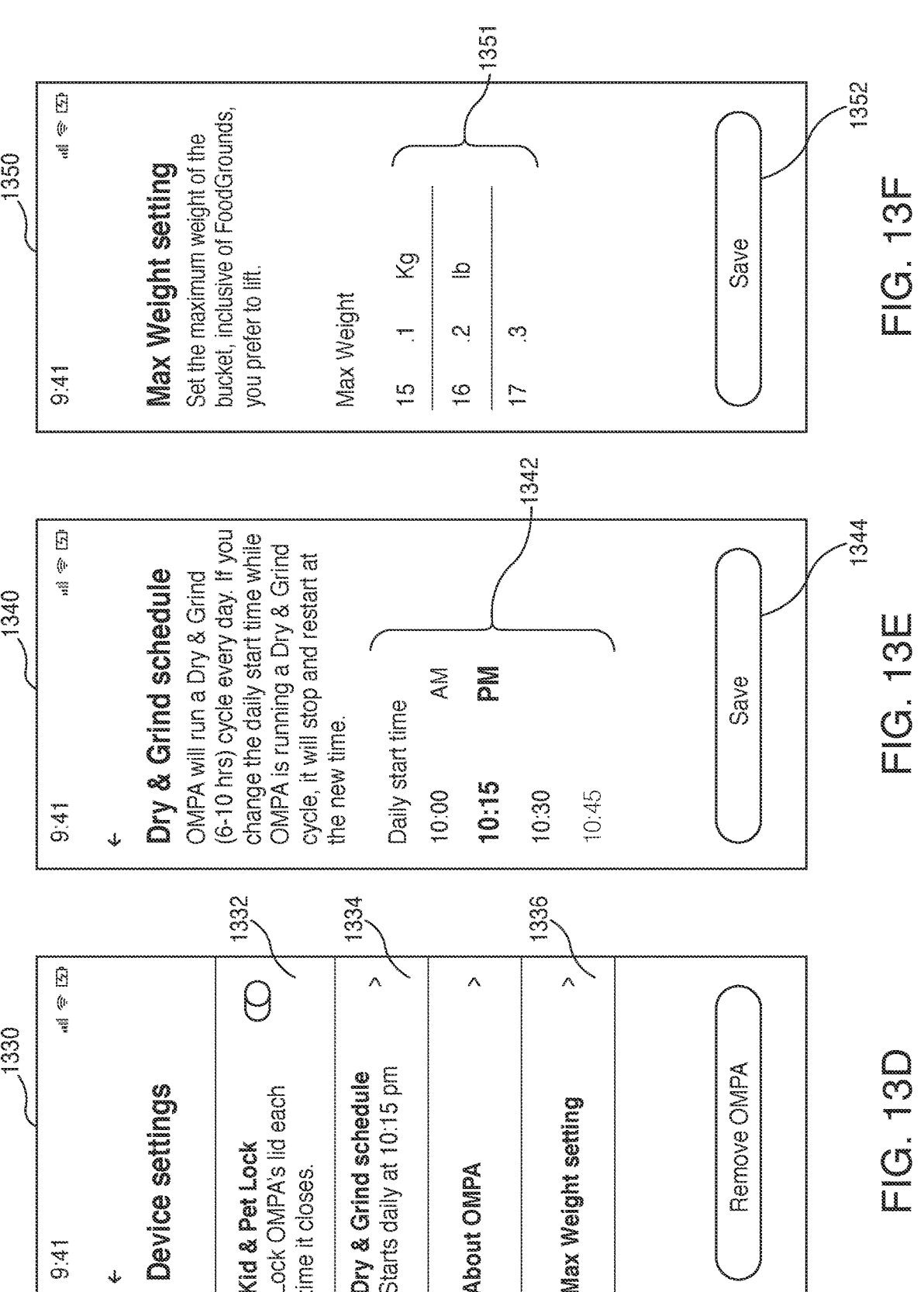

FIGS. 13A-13F show different GUI pages that may be generated and displayed in connection with a setting entity according to an embodiment. Starting with FIG. 13A, illustrative home GUI page 1300 is displayed. GUI page 1300 includes status 1302 that indicates a general status of the OMPA. GUI page 1300 may include user interface element 1304 that provides additional information on the OMPA, including for example, the mass contained in the OMPA, the temperature of the OMPA, and a dry and grind start time. Element 1304 may also include icon 1306 that indicates whether the lid is locked or in a kid lock mode. A user can select settings icon 1301 to access settings GUI page 1310 of FIG. 13B.

In FIG. 13B, the user can access various setting categories such as user account 1311, device settings 1312, application settings 1313, feedback 1314, and developer information 1314. If the user selects user account 1311, the user may be presented a GUI page that enables the user to update account information such as an email address, a physical address at which the OMPA resides, and other suitable information. GUI page 1320 of FIG. 13C shows an illustrative physical address confirmation page confirming the location of the OMPA. Depending on a subscription model used by the owner of the OMPA, shipping containers may be mailed to this physical address so that the user can mail the OMPA output, or a collection agency may show up at the physical address to retrieve the OPMA output.

If the user selects device settings 1312 in FIG. 13B, GUI page 1330 of FIG. 13D can be displayed. GUI page 1330 can include kid and pet lock element 1332 that enables the user to set the kid and pet lock. When the kid and pet lock is set to ON, the lid may automatically lock each time it is closed. Alternatively, if the user selects icon 1306 in GUI page 1300, the front end may transition to GUI page 1330 to enable the user to set or disable kid and pet lock element 1332.

GUI page 1330 can also include dry and grind schedule element 1334, which if selected, causes GUI page 1340 of FIG. 13E to be displayed. In GUI page 1340, the user can select the daily start time for the dry and grind schedule by manipulating time dial 1342 and save it by selecting element 1344. In response to selection of save element 1344, this may trigger an executable script that is processed by the entity processor by transmitting the new updated dry and grind schedule to the OMPA. Alternatively, if the user selects icon 1306 in GUI page 1300, the front end may transition to GUI page 1340 to enable the user to set or set the dry and grind schedule.

GUI page 1300 can include max weight setting element 1336, which if selected, causes the GUI page 1350 of FIG. 13F to be displayed. In GUI page 1350, a user sets a maximum weight of the bucket, inclusive of OMPA input and/or food grounds, that he or she prefers to lift. The user can select a weight in pounds or kilograms, for example, by rotating interactive dials 1351 as desired. For example, if the user selects 16.2 pounds, the OMPA may operate to ensure that the total weight of the bucket, OMPA input, and/or FOOD GROUNDS contained therein do not exceed 16.2 pounds. The user can save the maximum weight by pressing save button 1352.

FIGS. 14A-14G show different GUI pages that may be generated and displayed in connection with errors detected by the OMPA according to an embodiment. The OMPA, may during the course of its operation, experience events that prevent it from performing a dry and grind cycle. These errors can include those that occur before a grind and dry cycle can start or occur during operation of a dry and grind cycle. The entity processor running on the OMPA can monitor for error events and relay detection thereof to the entity processor running on the front end to inform the user of the error. For example, if the OMPA is scheduled to begin a dry and grind process and the lid is open, GUI error page 1400 of FIG. 14A may be displayed to inform the user that the lid should be closed to start the dry and grind cycle. As another example, if the OMPA is schedule to begin a dry and grind process, but the bucket is not detected, GUI page 1410 of FIG. 14B may be displayed to inform the user that the dry and grind cannot start until the bucket is properly situation within the OMPA. In yet another example, if the OMPA has gone offline (e.g., not connected to WiFi, but can communicate with the Front End via Bluetooth), GUI screen 1420 of FIG. 14C may be displayed to inform the user that the OMPA is offline.

An OMPA may jam if someone places a utensil or hard object (e.g., bone) into the OMPA. In other embodiments, the contents of the OMPA input may coalesce into a solid mass that jams the grinding mechanism. The OPMA can detect when the grinding mechanism is jammed can cause GUI page 1430 of FIG. 14D be displayed. GUI page 1430 can include user interface element 1431, which when selected, may provide additional GUI pages that provide troubleshooting steps for unjamming the OMPA. GUI page 1430 may also include user interface element 1432 that can include cancel element 1433, status identifier 1434, and progress bar 1435 showing the progression status of the dry and grind cycle. Cancel element 1433 may be associated with an executable script that can instruct the OMPA to cancel the dry and grind cycle. Progress bar 1435 can be subdivided into different stages of the dry and grind cycle (e.g., shown here as dry and grind, sanitize, and cool down) and each stage has a relative length indicative of the time required to complete that stage. In response to being presented with GUI page 1430, the user can open the lid of the OMPA and possibly remove the bucket to address the cause of jam. After the bucket is returned and the lid is closed, the OMPA may execute a quick mix as indicated in GUI page 1440 of FIG. 14E to confirm that the cause of the jam has been removed. If the jam has been cleared, the front end may revert back to home screen, otherwise, if the jam has not been cleared, the front end re-display GUI page 1430 or transitions to GUI page 1450 of FIG. 14F.

Figures 14A, 14B, 14C:
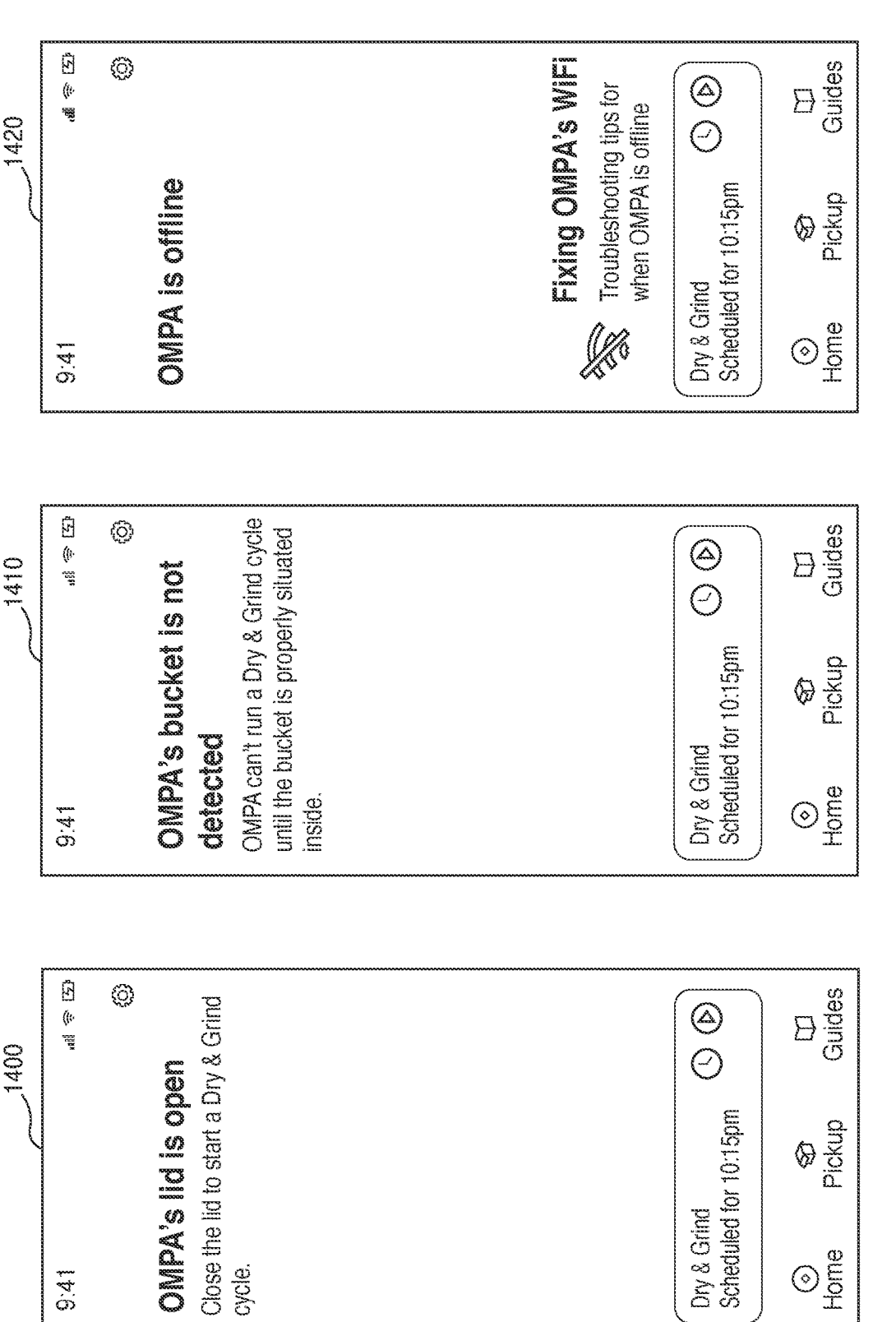
FIGS. 14A-14G show different GUI pages that may be generated and displayed in connection with errors detected by the OMPA according to an embodiment.
Figures 14D, 14E, 14F:
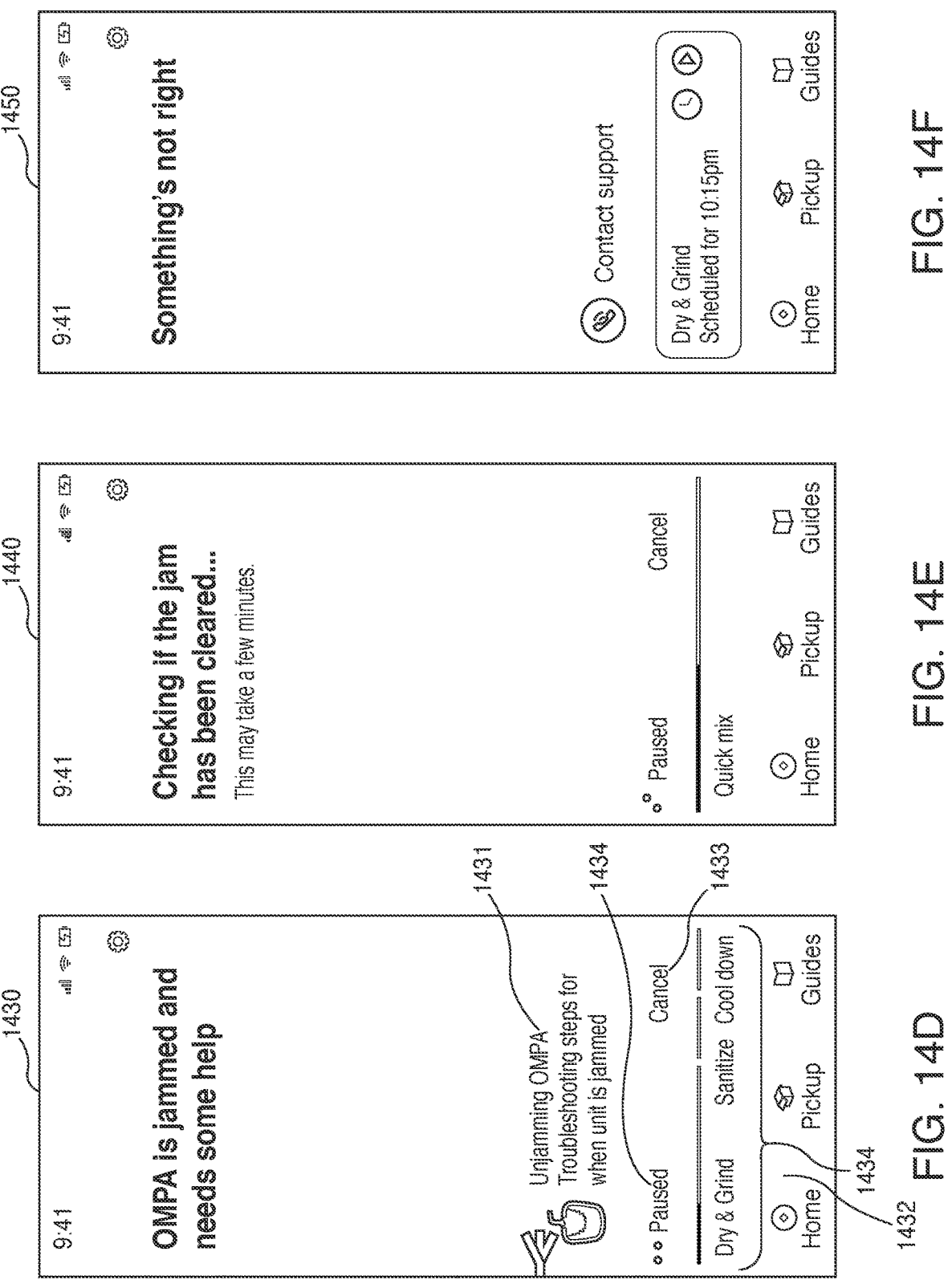
Figure 14G:
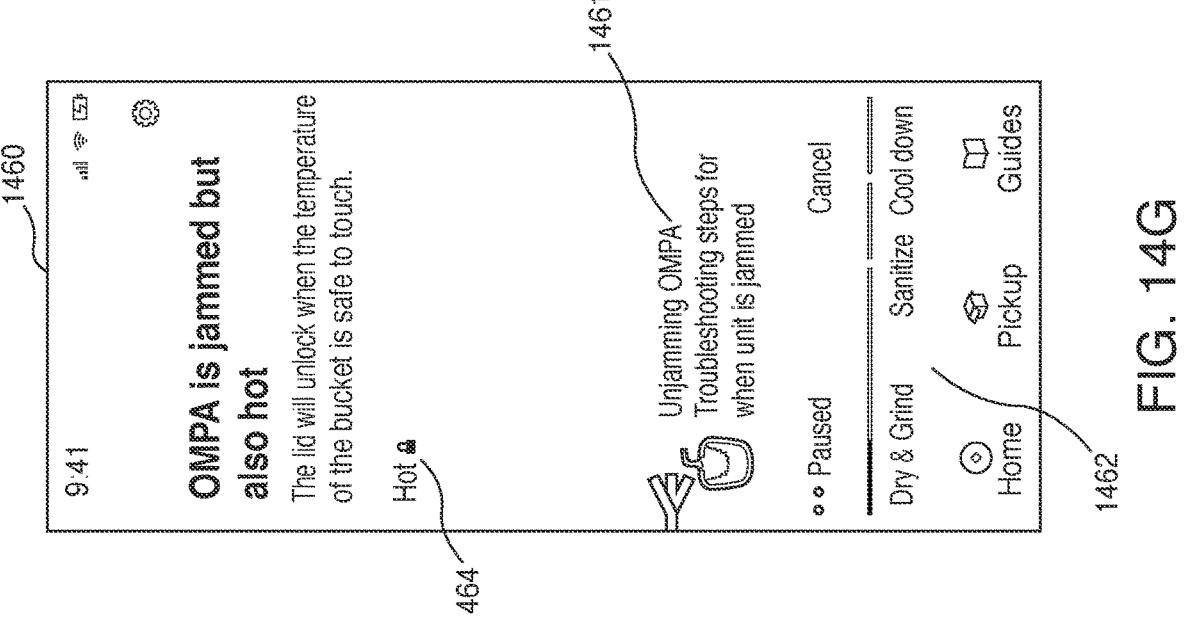

FIG. 14G shows alternative GUI page 1460 informing the user that the OMPA is jammed and is hot. GUI page 1460 can include user interface element 1461 (which is similar to element 1431) and user interface element 1462 (which is similar to element 1432). GUI page 1460 can also include icon 1464, which shows a locked icon, indicating that the bucket is considered too hot to handle. As a result, the OMPA may keep the lid locked until the temperature of the bucket reaches or falls below a temperature threshold. When the bucket temperature reaches or falls below the temperature threshold, the OMPA entity processor may cause the front end to display GUI page 1430.

Figures 15A, 15B, 15C:
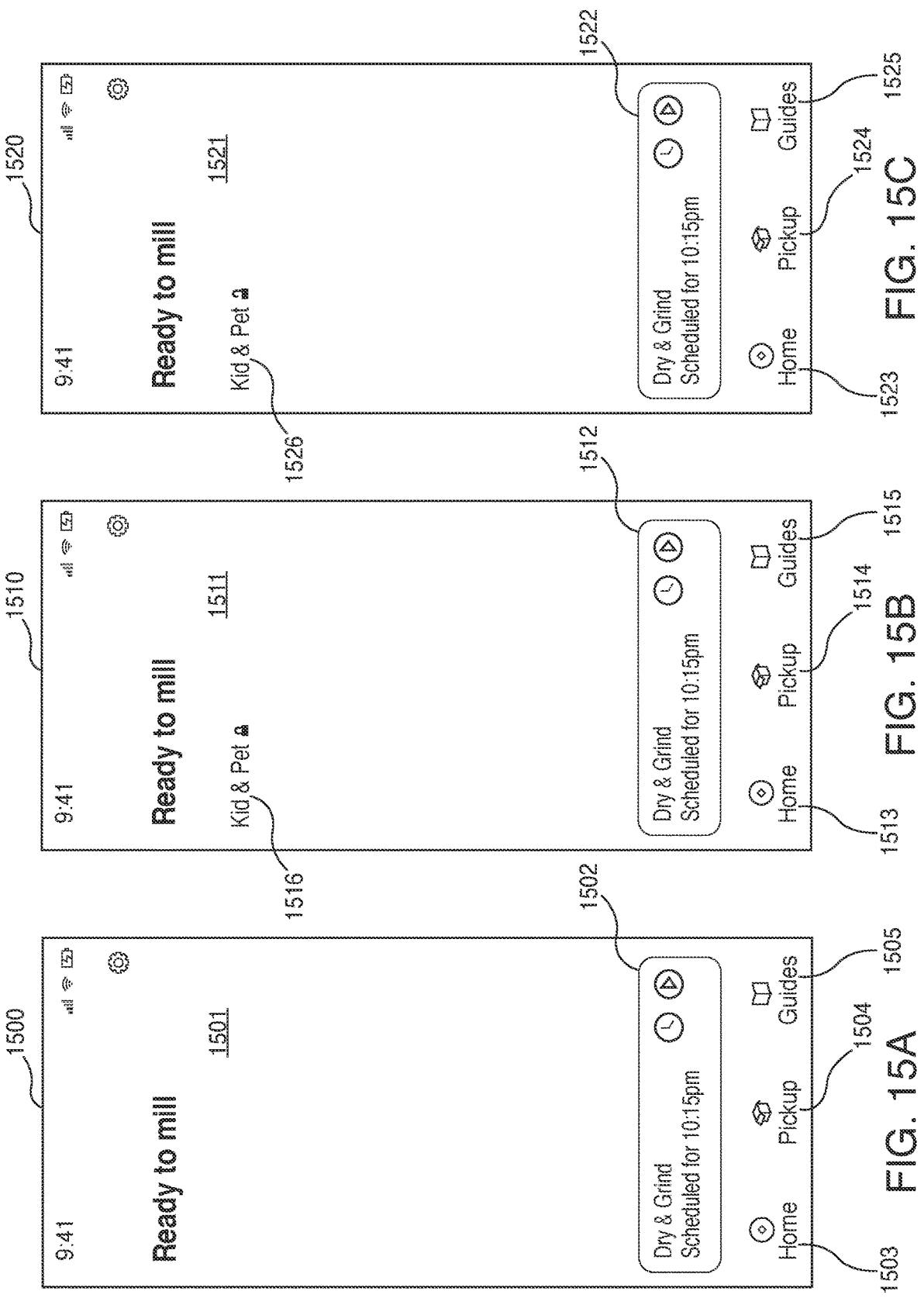
FIGS. 15A-15K show various GUI pages presented by the front end according to various embodiments.

FIGS. 15A-15K show various GUI pages presented by the front end according to various embodiments. FIGS. 15A-15C show different home GUI pages 1500, 1510, and 1520 in which the OMPA is ready to mill. Each of GUI pages 1500, 1510, and 1520 include overlay 1501, 1511, and 1521, respectively, user interface element 1502, 1512, and 1522, home button 1503, 1513, and 1523, pickup button 1504, 1514, and 1524, and guides button 1505, 1515, and 1525. GUI page 1510 and 1520 differ from GUI page 1500 in that they include icon element 1516 and 1526, respectively. Icon element 1516 indicates that the kid and pet lock is enabled, and icon element 1526 indicates that the kid and pet lock is not enabled.

Figures 15D, 15E, 15F:
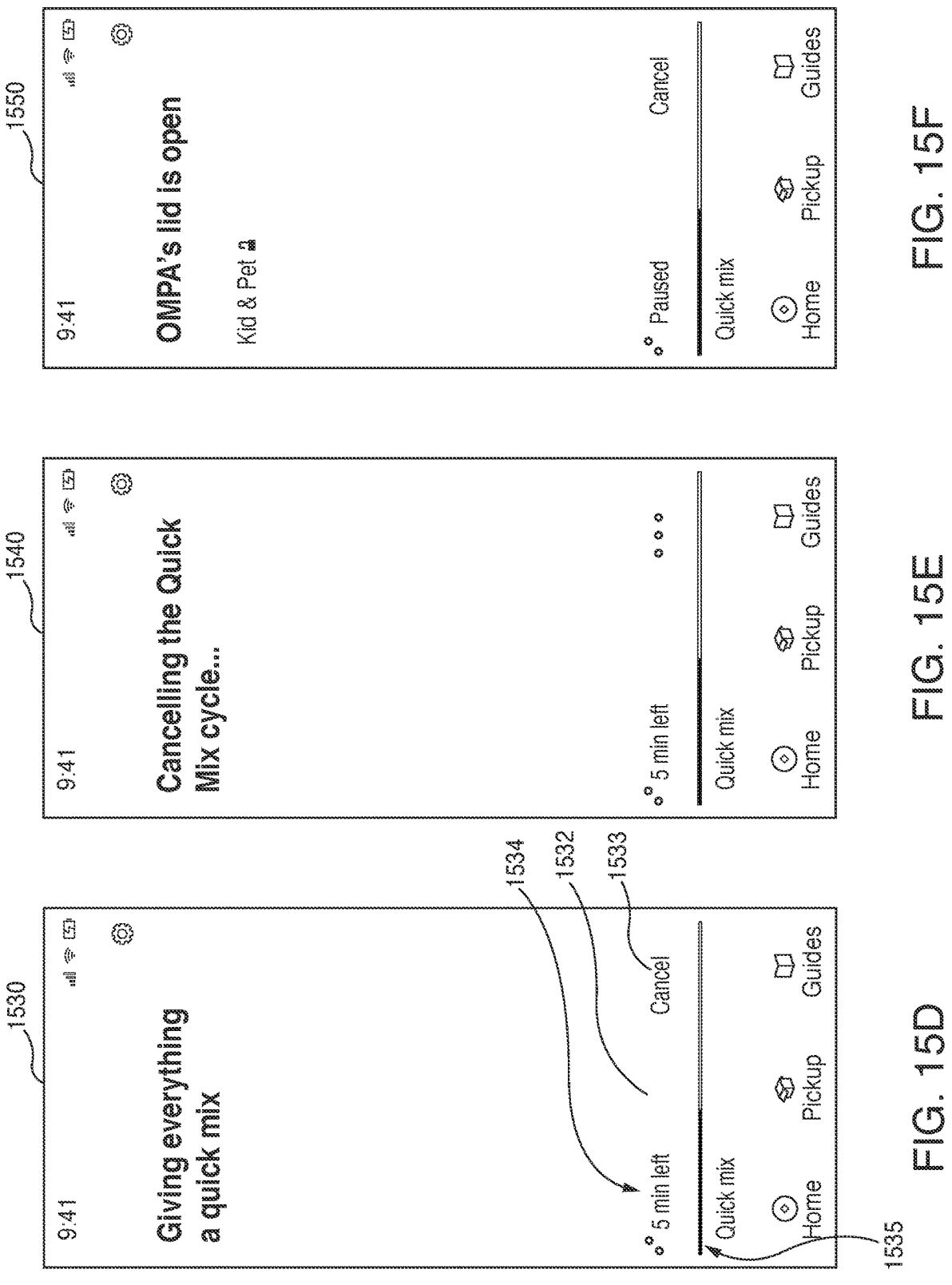

FIGS. 15D-15F show different quick mix GUI pages according to an embodiment. A quick mix occur may after the user inputs a minimum weight quantity of OMPA input into the OMPA. The quick mix is designed to pre-mix the contents with the bucket with previously inputted OMPA input and/or OMPA output (e.g., FOOD GROUNDS). FIG. 15D shows GUI page 1530 with user interface element 1532, which includes cancel element 1533, status indicator 1534, and progress bar 1535. Status indicator 1534 may specify how much time remains for the quick mix operation. Progress bar 1535 may be a visual representation of the progress of the quick mix operation. The user may press cancel element 1533 to cancel the quick mix operation. If the user presses cancel element 1533, this may trigger an executable script that is relayed to the OMPA so that the OMPA can cancel the quick mix operation, as shown in GUI page 1540 of FIG. 15E. FIG. 15F shows illustrative GUI page 1550 showing that the lid is open and that the quick mix cycle is paused.

Figures 15G, 15H, 15I:
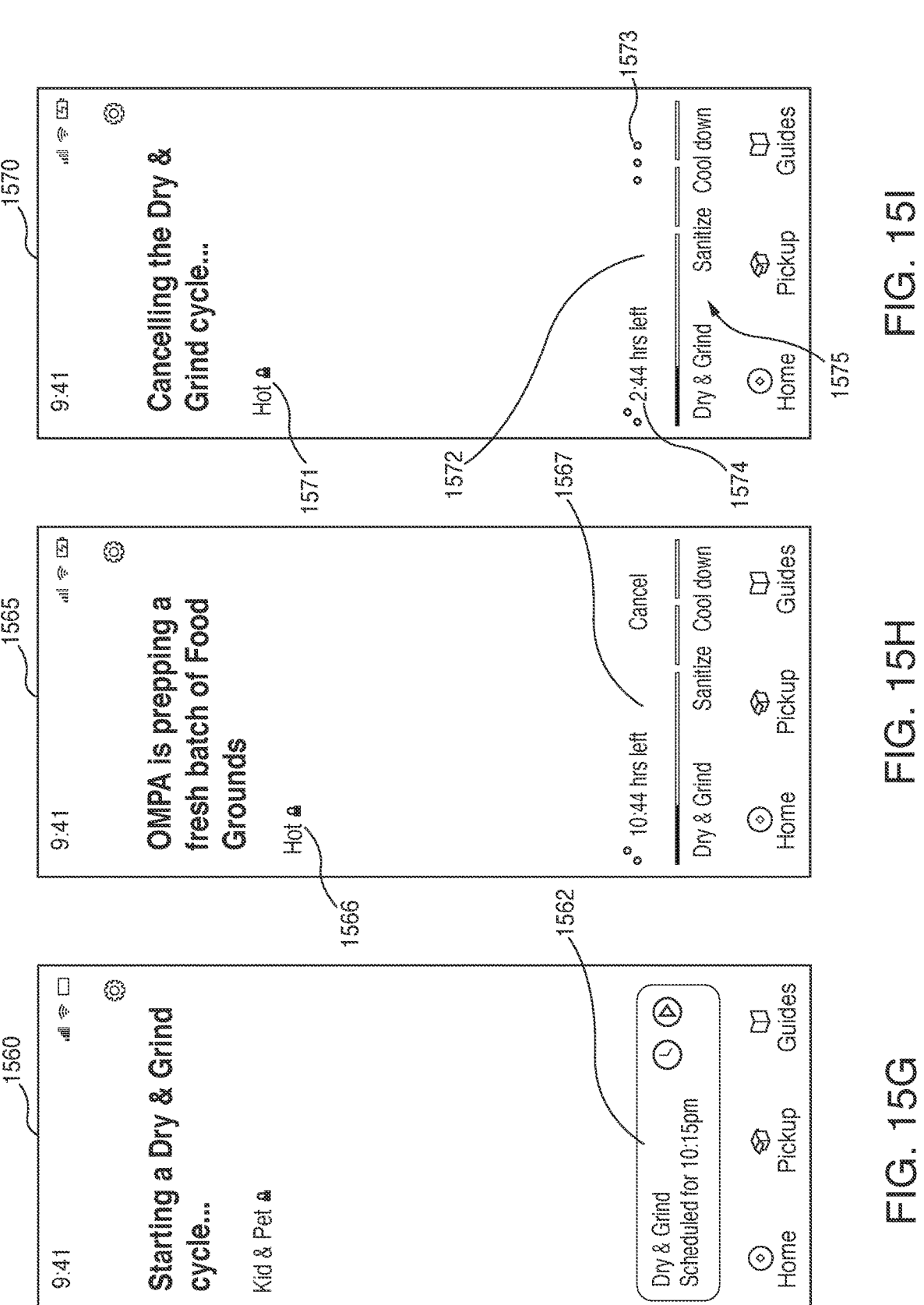

FIGS. 15G-15I show different dry and grind GUI pages according to an embodiment. GUI page 1560 (of FIG. 15G) includes an overlay indicating the dry and grind cycle is starting. GUI page 1560 can also include user interface element 1562. FIG. 15H shows GUI page 1565 that includes an overlay that indicates that a fresh batch of OMPA is being prepared. GUI page 1565 also includes bucket is hot icon 1566, and user interface element 1567. GUI page 1570 (of FIG. 15I) includes an overlay indicating that the dry and grind cycle is being cancelled. GUI page 1570 can include icon 1571 that indicates that the bucket is hot and will remain locked until it is safe to access. GUI page 1570 also includes user interface element 1572, which includes cancel element 1573, status display 1574 (which shows how much time is left in the dry and grind cycle), and progress bar 1575.

Figures 15J, 15K, 16:
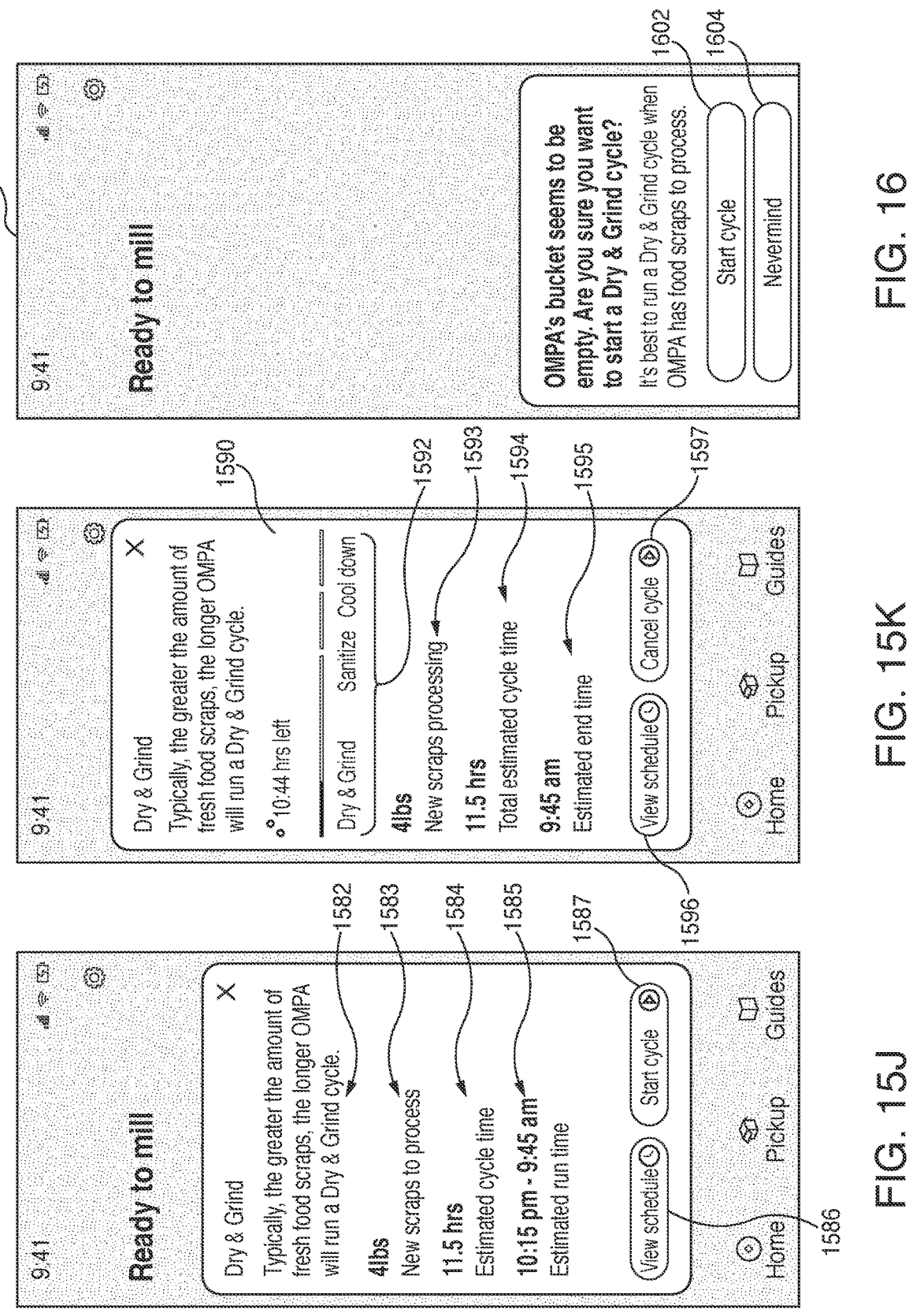
FIG. 16 shows an illustrative GUI page in which the OMPA is asking the user whether he or she desires to start a dry and grind cycle because the OMPA detects that bucket is empty or that no need OMPA input has been added according to an embodiment.

FIG. 15J shows an illustrative dry and grind details GUI overlay 1582 that may be displayed, for example, when the user swipes up on user interface 1562. GUI overlay 1582 may specify how much new mass of OMPA input will be processed during the dry and grind cycle, as shown by 1583, an estimated cycle time, as shown by 1584, and estimated start and end times of the cycle as shown by 1585. GUI overlay 1582 can also include view schedule element O86 and start cycle element 1587.

FIG. 15K shows an illustrative dry and grind details GUI overlay 1590 that may be displayed after the dry and grind schedule has started. Overlay 1590 can include progress bar 1592, mass of newly added OMPA input 1593, an estimated cycle time 1594, and estimated end time 1585. GUI overlay 1590 can also include view schedule element 1596 and start cycle element 1597.

It should be appreciated that the values shown overlays 1580 and 1590 can be derived from the OMPA and that if any of these values change throughout operation of the dry and grind cycle, the OMPA entity processor can relay these values to the front end so that they available for the front end to display them when needed. For example, the OMPA may initially estimate that the cycle time will take 11.5 hours, but as the cycle progresses the sensor data may indicate that the cycle time will only take 10 hours. Such a change can be relayed to the front end for storage in its datastore so that the front end can retrieve the appropriate components from the data store to populate the GUI page defined a GUI page format tree.

FIG. 16 shows an illustrative GUI page 1600 in which the OMPA is asking the user whether he or she desires to start a dry and grind cycle because the OMPA detects that bucket is empty or that no need OMPA input has been added. GUI page M00 is effectively a double check or confirmation of a user's desire to start a dry and grind cycle. The OMPA sensors and onboard processor can detect and keep track of how much OMPA matter has been added before activation of a dry and grind cycle. With this understanding, the OMPA entity processor, in response to a request received from the front end to start a dry and grind cycle, can temporarily prevent the OMPA from starting the dry and grind cycle while the OMPA entity processor prompts the front end to display GUI page 1600. The user can select start cycle element 1602 to reconfirm the desire to start the dry and grind cycle or cancel element 1604 to cancel the dry and grind cycle.

Figures 17A, 17B, 17C:
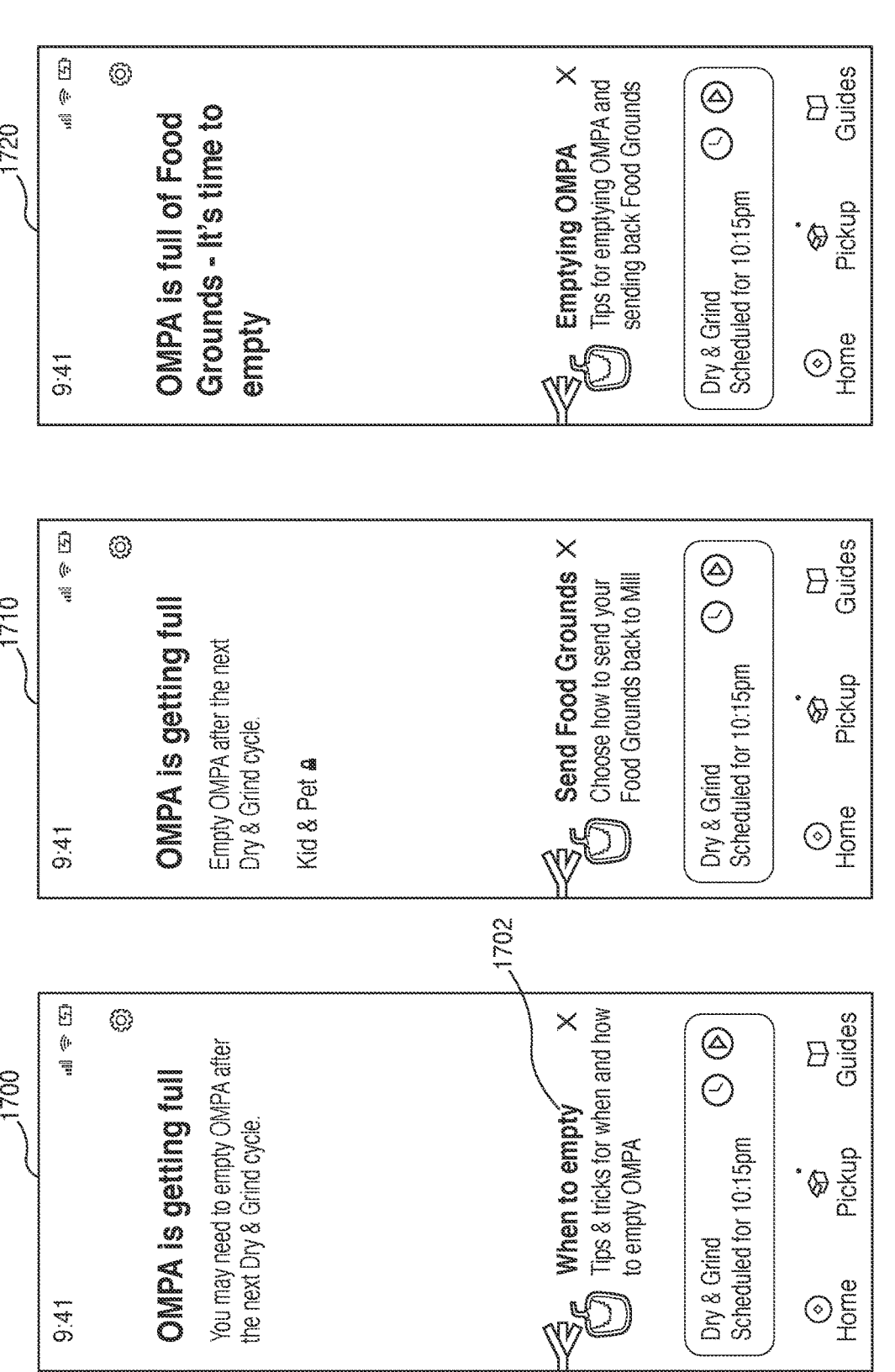
FIGS. 17A-17C show different GUI pages that inform the user that the bucket is or is nearly full according to various embodiments.

FIGS. 17A-17C show different GUI pages that inform the user that the bucket is or is nearly full of FOOD GROUNDS according to various embodiments. The OMPA has data knowledge of the contents contained in the bucket, including knowing when contents contained therein are ready to be emptied. For example, the OMPA has knowledge of the moisture content and weight of the contents contained therein, and when the moisture content is within a predetermined range and the weight of the contents meets or exceeds an extraction threshold, the OMPA entity processor can update state information for the front end to enable the front end to display the appropriate GUI page with the relevant information as defined by the GUI page format tree. GUI page 1700 of FIG. 17A can include an overlay that informs the user that the OMPA is getting full and that the FOOD GROUNDS contained therein may need to be emptied after the next dry and grind cycle. GUI page 1700 can also include user interface element 1702 that can present additional information on when to empty the OMPA. GUI page 1710 of FIG. 17B can include an overlay that informs the user that the OMPA is getting full and that the FOOD GROUNDS contained therein should be emptied after the next dry and grind cycle. GUI page 1710 can also include user interface element 1712 that can present additional information on how to ship the FOOD GROUNDS. GUI page 1720 of FIG. 17C can include an overlay that informs the user that the OMPA is full and that the FOOD GROUNDS contained therein must be emptied now. GUI page 1720 can also include user interface element 1722 that can present additional information on how to empty the OMPA.

Figures 18A, 18B, 18C:
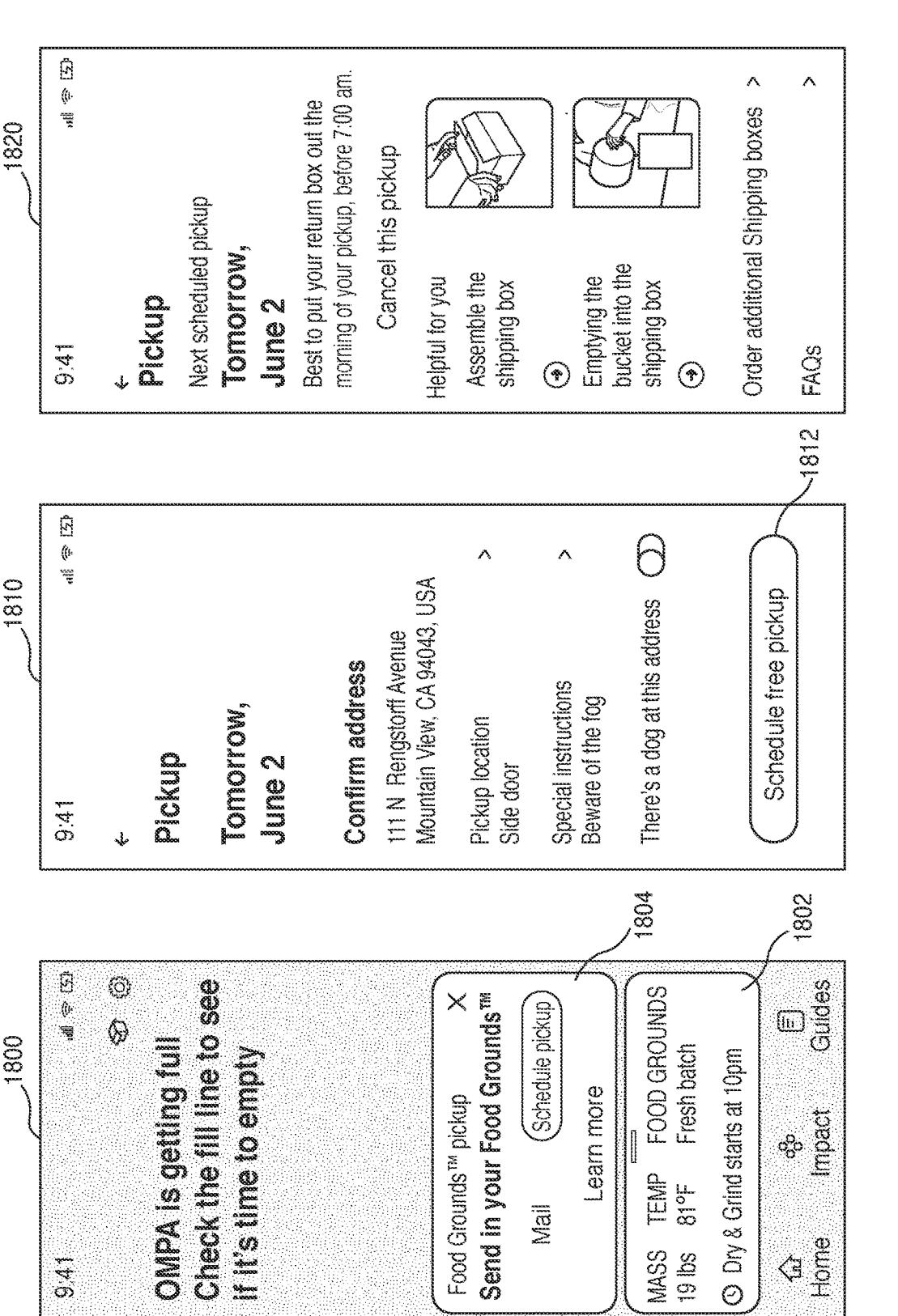
FIGS. 18A-18D show different GUI pages according to an embodiment.

FIGS. 18A-18C show different GUI pages for arranging pickup or shipment of the FOOD GROUNDS according to various embodiments. FIG. 18A shows an illustrative home GUI page 1800 informing the user that FOOD GROUNDS are ready to be emptied from the OMPA and inserted into a shipping box. GUI page 1800 can include statistics 1802 on the FOOD GROUNDS and user interface element 1804 that enables the user to schedule a drop off or pickup of the FOOD GROUNDS. FIG. 18B shows GUI page 1810 that can include pick up details such as the address, a pickup location at the address, special instructions, and whether there is a dog. The user can update any information in GUI page 1810 and select user interface element 1812 when ready to schedule the pickup. Selection of element 1812 may trigger an executable script that informs a third party or other party (e.g., manufacturer of the OMPA) that a pickup has been scheduled. FIG. 18C shows GUI page 1820 showing confirmation of the scheduled pickup and other helpful information (e.g., interactive elements that show a user how to assemble a shipping box and how to empty the bucket into the shipping box).

In some embodiments, the user can mail the shipping box as opposed to scheduling a pickup of the shipping box. In these embodiments, the shipping box can have pre-paid, self-addressed label, with unique identifying information contained therein, affixed to the box. When the user empties the bucket contents into the shipping box, he or she can leave the box out by his or her mailbox for retrieval by postal carrier.

Figure 18D:
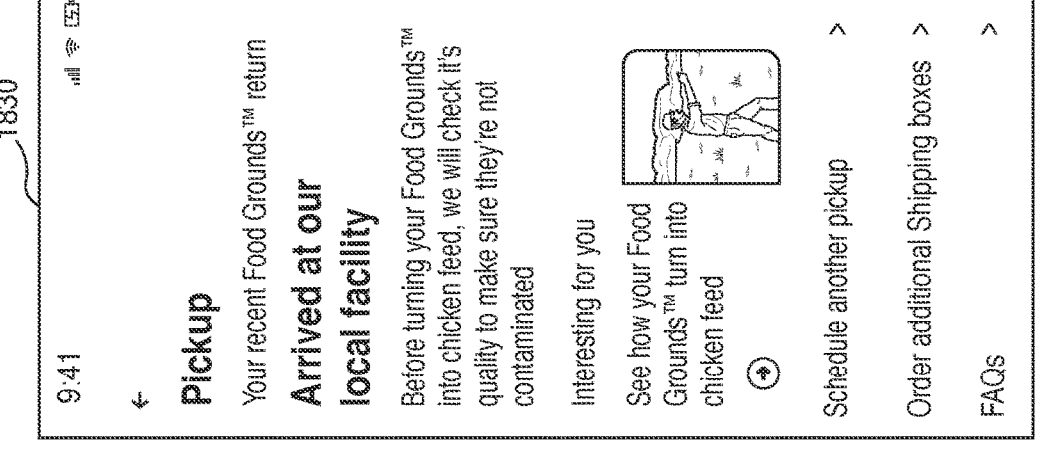

After the box is picked up or mailed, it is delivered to an OMPA processing center that can use contents of the shipping box in a food upcycling process. FIG. 18D shows GUI page 1830 to confirm that the recent FOOD GROUNDS shipping box was received by the OMPA processing center.

FIG. 19 shows illustrative process 1900 for setting a daily start time for processing organic matter according to an embodiment. For example, process 1900 may be implemented in front end 810 and can communicate with OMPA 830. Starting at step 1910, a device settings screen can be displayed on a client device. For example, screen 1330 of FIG. 13D can be device setting screen. The device settings screen can include a processing schedule setting element for defining a daily start time for processing organic matter in an organic matter processing apparatus (OMPA) and a lock setting element for activating a lid lock on the OMPA. At step 1920, in response to receiving, on the client device, user selection of the processing schedule setting element can cause a processing schedule configuration screen to be displayed (e.g., screen 1340 of FIG. 13E). The processing schedule configuration screen can include a time dial for setting the daily start time and a save element. At step 1930, user input is received via the time dial to set the daily start, and at step 1940, user selection of the save element is received to confirm selection of the daily start time. At step 1950, in response to receiving user selection of the save element, process 1900 can transmit, via a server, the daily start time to an OMPA that is associated with an account held by the client device such that the OMPA is configured to begin organic matter processing at the daily start time. At step 1960, in response to receiving, on the client device, user selection of the lock setting element to activate the lid lock, process 1900 can transmit a lid lock command to the OMPA such that the OMPA locks a lid.

It should be understood that the steps shown in FIG. 19 are illustrative and the order of the steps may be changed, additional steps may be added, or steps may be omitted.

FIG. 20 shows process 2000 on how a user can set a maximum fill weight of the bucket according to an embodiment. Starting at step 2010, a user configuration settings screen including a weight threshold configurator for defining a maximum weight of a removable bucket assembly with food grounds contained therein can be displayed on a client device. For example, screen 1350 may be displayed. At step 2020, the weight threshold can be received via the weight threshold configurator. At step 2030, the received weight threshold can be transmitted to an organic matter processing apparatus (OMPA), via a server, that is associated with an account held by the client device, wherein the OMPA is configured to monitor a weight of the removable bucket assembly with OMPA output contained therein and send a food grounds ready notice to the client device, via the server, when the monitored weight is at or above the weight threshold. At step 2040, the food grounds ready notice can be received on the client device. At step 2050, in response to receiving the food ground ready notice, a notification that the food grounds are ready for shipment or collection can be displayed on the client device.

It should be understood that the steps shown in FIG. 20 are illustrative and the order of the steps may be changed, additional steps may be added, or steps may be omitted. For example, in some embodiments, communications can occur directly between the client device and OMPA (e.g., via Bluetooth™ or WiFi).

FIG. 21 shows process 2100 on how a user can be alerted to OMPA operational issues according to an embodiment. Starting at step 2110, an error status code transmitted from an organic matter processing apparatus (OMPA) that is associated with the client device can be received at a client device. The OMPA can be experiencing an error event corresponding to the error status code. The error status code can indicate that a lid to the OMPA is open, that a bucket assembly is not present within the OMPA, that the OMPA is offline, or that the OMPA is jammed or is jammed and exceeds a temperature threshold. At step 2120, in response to receiving the error status code, memory on the client device can be accessed to retrieve error content that correlates to the error status code. At step 2130, first display content including the error content can be generated, wherein the error content specifies an issue with the OMPA and a solution to the issue. At step 2140, the first display content can be displayed. At step 2150, a non-error status code transmitted from the OMPA can be received at the client device, when the OMPA is no longer experiencing the error event. At step 2160, in response to receiving the non-error status code, memory on the client device can be accessed to retrieve status content that correlates to the non-error status code. At step 2170, second display content including the status content can be generated, wherein the status content specifies a current status of the OMPA that is not experiencing an error event. At step 2180, the second display content can be displayed.

It should be understood that the steps shown in FIG. 21 are illustrative and the order of the steps may be changed, additional steps may be added, or steps may be omitted. For example, an input can be received at the client device or the OMPA indicating that a user has addressed the issue displayed in the first display content, wherein the OMPA self-diagnoses whether the issue has been resolved and transmits another error code or the non-error code based on the self-diagnosis.

FIG. 22 shows process 2200 on how status information indicative of an OMPA is displayed on a client device according to an embodiment. In response to instantiating a client application on a mobile device and authenticating a first user of the mobile device, a request for status information can be transmitted from a backend application operable to communicate with an organic matter processing apparatus (OMPA) associated with the first user or directly from the OMPA, the status information indicative of the OMPA, at step 2205. At step 2210, in response to the transmitted request, the status information can be received. At step 2215, the status information can be evaluated to generate a graphical user interface (GUI) page defined by a GUI page format tree. The GUI page format tree can include a set of status identifiers contextually related to the status information, a set of icons, a set of overlays, a set of user interface elements contextually related to the status information, and a set of client application-executable script elements, each defining a functionality associated with at least a respective one of the set of user interface elements that controls operation of the OMPA. At step 2220, process 2200 can cause display of the generated GUI page within the client application on a display of the mobile device. At step 2230, in response to user selection of a first user interface element displayed in the generated GUI page, process 2200 can execute the functionality associated with the first user interface element by transmitting a commensurate command for executing the functionality on the OMPA to the backend application or to the OMPA.

In one embodiment, the status information includes a ready to process OMPA input status, wherein the generated GUI page includes a status identifier selected from the set of status identifiers, icons selected from the set of icons, an overlay selected from the set of overlays, and a start OMPA processing user interface element selected from the set of user interface elements. For example, the screens 1500, 1510 of FIGS. 15A and 15B, respectively, may represent the generated GUI page. The status identifier can be "ready to mill" identifier 1501. The icon can include kid and pet icon 1516, for example. The overlay can be overlay 1502 or 1512. The start OMPA processing user element can be the "play symbol" element, that when selected, can cause execution of a start client application-executable script element that causes the OMPA to start an OMPA processing cycle.

In one embodiment, the status information can include an active processing status indicator, wherein the generated GUI page includes a locked lid icon (e.g., icon 1566) selected from the set of icons, a time remaining overlay (e.g., overlay 1567) selected from the set of overlays, and a cancel user interface element (e.g., cancel button shown in FIG. 15H) selected from the set of user interface elements, wherein the time remaining overlay specifies how much time is remaining to finish an active OMPA processing cycle. In response to selection of the cancel user interface element, the OMPA is instructed to cancel the active OMPA processing cycle.

In one embodiment, the status information can include bucket status, wherein the generated GUI page includes a bucket status identifier (e.g., as shown in FIG. 18A) selected from the set of status identifiers, an OMPA output collection overlay (e.g., overlay 1804) selected from the set of overlays, and an OMPA output processing user element (e.g., Mail button or schedule pickup button). In response to selection of the OMPA output processing user element, an OMPA output processing script element can be executed that arranges for OMPA output to be mailed to an OMPA processing facility or to be picked up.

It should be understood that the steps shown in FIG. 22 are merely illustrative and that the order of the steps may be changed, additional steps may be added, or steps may be omitted.

Each OMPA can generate an organic matter data set (OMDS). The OMDS can include data such as measured mass, measured volume, and measured water content. The mass, volume, and water content measurements may be obtained according to a data collection algorithm. For example, the measurements may be collected in real-time while the OMPA is operating (i.e., converting OMPA input to OMPA output). It should be understood that the measurements will change over time while the OMPA is processing OMPA input. The OMPA may require periodic measurements to make OMPA input processing decisions or to perform data analytics according to various embodiments. The measurements may be collected when an organic matter processing cycle is completed, but the bucket is not full, or the measurements may be collected when the organic matter processing cycle is complete and the bucket is full. The OMDS can also include a timestamp (e.g., when the measurements were recorded), location information (e.g., GPS coordinates or address), identifying information (e.g., a name or unique number assigned to the OMPA), and account number(s) (e.g., account number user has with the software platform and/or account number user has with an OMPA processor). The OMDS can include mass metrics such as mass in, water mass out, end of HIP cycle mass.

Each OMPA output processor can generate a processed organic matter data set (POMDS). The POMDS can include information on how many times a user has shipped OMPA output to the OMPA output processor. The POMDS includes quantity data on received OMPA output such as mass and water content. The POMDS can include quality data on the received OMPA output. That quality data can determine how the received OMPA is used for further processing. For example, whether the received OMPA output is used for food upcycling (e.g., converted into chicken feed) or used in compost. The OMPA processors can be part of an output pathway that controls where the processed OMPA output is provided. For example, one particular OMPA processor may provide Food Grounds to a chicken farm located in a particular location and another OMPA processor may provide Food Grounds to a salmon farm located in another location. The location of where a particular user's Food Grounds went within the output pathway may be reported back to the user in the software platform or an email or notification.

The software platform running on the client device can generate a software platform data set (SPDS). The SPDS can keep track of various software platform data such as, for example, user interactions with the OMPA (e.g., setting schedules, setting a lid lock, setting preferences, and activation of LIP, HIP, or burst grind cycles, etc.), user interactions with specific features provided on the software platform (e.g., viewing user guides, accessing statistics related to impact, etc.), and other data that can assist analytics to curate OMPA operational algorithms that are specific to the user of the OMPA. The SPDS can include OMPA use metrics such as the number of times the lid has been opened, how many OMPA processing cycles have occurred, how many jam events have occurred, statistics regarding processing cycles (e.g., average run time, shortest run time, longest run time, average start time for OMPA processing cycles, etc.), user cancellations after OMPA processing cycle has started, button press events, and application initiated events.

A backend processor can generate an analytics data set (ADS) based on the OMDS, the POMDS, the SPDS, or a combination of the OMDS, the POMDS, and the SPDS. The ADS can benefit from being able to pull data from these multiple sources of data in a way that has not previously been possible. The ADS can include quantitative data (e.g., impact data that accurately measures impact realized using the OMPA and handling of the OMPA output). For example, metrics showing real-time statistics (e.g., quantity of OMPA output provided to an OMPA output processor for the current month) and long-term summary statistics (e.g., quantity of OMPA output processed over the past year) can be included in the ADS. The ADS can include intelligent inferences that can be provided to a user via the software platform or in an email. For example, if the user accesses a food guide in the software platform about a certain food (e.g., bananas), the backend processor can provide a recommendation for an alternative use of that food (e.g., provide a recipe for making banana bread) as opposed to placing the banana in the OMPA. As another example, the backend processor can suggest that a user freeze a food item instead of placing it into the OMPA. These two examples illustrate how the ADS can be used to influence user behavior in a way that ultimately reduces an environmental impact. If desired, competition can be fostered by sharing user to user, or region by region impact reports that show how a user or region is performing with respect to the other user or region. Another example data included in the ADS can include consumption totals such as number of activated carbon packages or shipping boxes that have been sent to a user. Such information can be provided to a logistics team or processor.

The backend processor can determine that algorithm updates may be required based on analysis of the ADS. After the update is provided to the OMPA, the backend processor can evaluate the results and make any necessary changes. Furthermore, the algorithm can account for clean energy sources (e.g., solar and/or battery backup systems) and weather reports to determine the best time to run the OMPA, to further reduce unnecessary $CO_2$ generation while processing OMPA input to OMPA output.

Another example of impact data included in the ADS or other data set can include the output pathway and the impact realized by using the user's Food Grounds. Such information may be curated into a message that is presented to the user.

Yet another example of impact data that can be included in the ADS or other data set can include total mass input into the OMPA and a calculation of how much material was diverted from the landfill. And yet another example of impact data can include known reduction of OMPA output from OMPA input, the amount of energy required by the OMPA to convert the OMPA input to OMPA output, and a calculation of how much methane has been diverted. Impact data can track trends over time (e.g., quantity of OMPA input) and can result in rewards or encouraging messages in response to positive trends or suggestions in response to negative trends. Furthermore, another example of impact data can include identified discrepancies between data associated with OMPA output received by an OMPA processor and the data obtained by the OMPA prior to when the OMPA output was emptied from the bucket. The discrepancy can be reported to the user in the form of a question that asks where the extra OMPA output went.

FIGS. 22A-22E show an illustrative GUI page including an impact assessment according to an embodiment. Impact GUI page 2200 is spread out over FIGS. 22A-22E and is meant to represent a vertical scrolling within a display screen of a mobile device, however, a user can "jump" to a different portion of page 2200 by selecting one of user interface elements 2201-2203. FIG. 22A of GUI page 2200 can inform the user how much OMPA input was received for a given day. As shown, GUI page 2200 indicates that 3.2 pounds of OMPA input was received yesterday, and that an average of 1.1 pounds of OMPA input is received daily. FIG. 22B shows OMPA input statistics that show quantity of OMPA input received on user selectable time frame selected from daily, weekly, monthly, time of day, and all time. As shown, the daily time frame is selected, and shows the amount of OMPA input received on each day of the week.

FIGS. 22C and 22D show impact calculations based on OMPA input processed by the OMPA. As shown, the impact calculations show how much $CO_2$ is saved by diverting OMPA input away from a landfill, how much $CO_2$ is used to power the OMPA, how much $CO_2$ is generated based on how the user treat the OMPA output (e.g., mailing OMPA output to a processor, adding the OMPA output to a personal compost, or adding the OMPA output to a green bin for municipal collection), and the net amount of $CO_2$ avoided by using the OMPA.

FIG. 22E can also show community based impact calculations that take into account cumulative totals associated with several OPMAs within a geographic region such as a community, city, zip code, metropolitan area, etc. These cumulative totals can include the total amount of $CO_2$ emissions that have been avoided, the total quantity of OMPA input that is diverted from landfills, and a contextual equivalent thereof (e.g., ten basketball courts filled ten feet high). FIG. 22E can also indicate how much OMPA output is repurposed by OMPA processors.

Figure 23A:
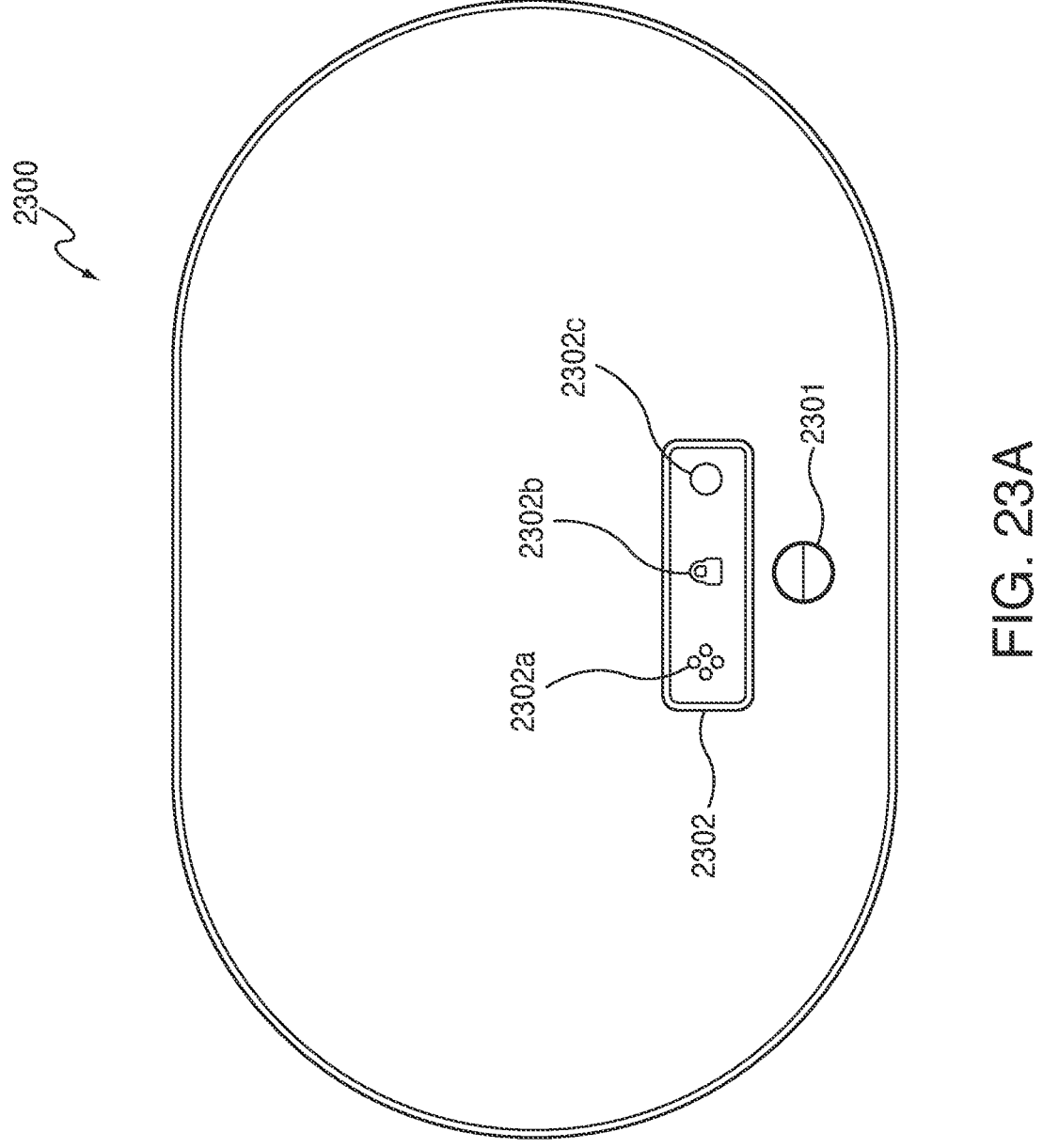
FIG. 23A shows an illustrative top view of lid of an OMPA according to an embodiment.

FIG. 23A shows an illustrative top view of lid 2300 of an OMPA according to an embodiment. A cosmetic cover member is removed to reveal button 2301 and display element region 2302. Display element region 2302 can include dead fronted displays 2302a-2302c. Dead fronted displays 2302a-2302c may be LEDs that can light up with different brightness intensities and colors to convey status information indicative of OMPA status and/or emulate status information being displayed by the software platform. Display 2302a may correspond to a processing icon, display 2302b may correspond to a lock icon, and display 2302c may correspond to a status icon. Display 2302a may include four separate circles arranged in diamond configuration (as shown). Each circle can light up independent of the other or can be simultaneously lit up. Each circle can display different light intensities and a different color. In one approach, the sequence of the circles being lit up and turned off can show a circular motion in the clockwise or counterclockwise direction. Display 2302b shows a lock icon that can be displayed in different colors and/or light intensity. Display 2302c shows a circle (larger than the small circles of display 2302a) that can be displayed in different colors and/or light intensity. Each of displays 2302a-c can be turned off so that they are not visible to a person looking at lid 2300.

FIGS. 23B-23V show different status conditions and how displays 2302a-2302c are used to convey a particular status condition. FIG. 23B shows visual references for displays 2302a-2302c when the OMPA is in an Idle state. Each of displays 2302a-2302c are off when the OMPA is inactive or disconnected from power. FIGS. 23C-23F show visual references for booting the OMPA and pairing the OMPA with a mobile device. FIG. 23C shows visual references for a startup/hello sequence in which all displays 2302a-2302c are turned on and cycle through all colors. FIG. 23D shows visual references for waiting stage of a device pairing in which displays 2302a and 2302b are turned off, and display 2302c can pulse a first color (e.g., blue). FIG. 23E shows visual references for a connecting stage of device pairing in which displays 2302a and 2302b are turned off, and display 2302c can pulse a second color (e.g., white). FIG. 23F shows visual references for a confirming connection of device pairing in which displays 2302a and 2302b are turned off, and display 2302c can pulse a third color (e.g., green).

FIGS. 23G and 23H show visual references of processing cycles. FIG. 23G shows visual references for low intensity processing (LIP) in which displays 2302b and 2302c are turned off and display 2302a rotates in a first color (e.g., white). FIG. 23H shows visual references for high intensity processing (LIP) in which displays 2302b and 2302c are turned off and display 2302a rotates in a second color (e.g., orange).

FIGS. 23I and 23J show visual references of manual control cycles. FIG. 23I shows visual references for a manual HIP start in which display 2302a pulses at least once in a first color (e.g., white) and remains displayed in that color for the duration of the HIP cycle. A user may manually start HIP cycle by pressing button 2301 twice or by pressing the appropriate button on the client device. Lock display 2302b may be set based on a user defined setting. Status display 2303c may be turned off. FIG. 23J shows visual references for manual cancellation of a LIP or HIP cycle. A LIP or HIP cycle can be cancelled when the user holds down button 2301 for a fixed period of time or in response to command received from the client device. Processing display 2302a may "count down" by turning off individual circles in a counterclockwise rotation. Lock display 2302b may be set based on a user defined setting. Status display 2303c may be turned off.

FIGS. 23K-23P show visual references for lock behavior. Processing display 2302a is displayed depending on the current processing status and status display 2302c is displayed depending on current status of the OMPA for each of lock behaviors shown in FIGS. 23k-23P. FIG. 23k shows visual representations of an active kid and pet lock in which lock icon 2302b is displayed in a first color (e.g., white) at a first brightness level. FIG. 23L shows visual representations of a manual lock disengagement in which lock icon 2302a can increase in brightness intensity in a first color and then turns off. FIG. 23M shows visual representations of kid and pet lock reminder in which lock icon 2302b blinks several times in response to lid open command. FIG. 23N shows visual representations that a high temperature lock is active in which lock display 2302b is shown in a second color (e.g., orange). FIG. 23O shows visual representations of manual disengagement of the lock in which lock display 2302b brightens to its highest setting before turning off. FIG. 23P shows visual representations of a high temperature lock reminder when the user attempts to open the lid, in which case display 2302b can blink a few times.

FIGS. 23Q-23S show visual references for material and bucket behavior. FIG. 23Q shows visual representations of addition of OMPA input to the bucket in which case status display 2302c can display a multicolor sequence. Displays 2302a and 2302b may be turned off. FIG. 23R shows visual representations of an empty bucket in which case status display 2302c can pulse a particular color in predetermined intervals (e.g., pulses green in three second intervals). Displays 2302a and 2302b may be turned off. FIG. 23S shows visual representations of a successful bucket empty event in which all displays 2302a-2302c cycle through colors.

FIGS. 23T-23V show visual references for warnings and errors. FIG. 23T shows visual representation for checking the application running on the client device in which status display 2302c can pulse a particular color (e.g., yellow) at a fixed time interval (e.g., every six seconds). FIG. 23U shows a visual representation of a jam error in which processing display 2302a can blink two of the four circles in a particular color (e.g., red). FIG. 23V shows a visual representation of a critical error in which status display 2302c blinks a particular color (e.g., red) according to a time interval (e.g., every 4 seconds).

FIG. 24 shows an exemplary impact report 2400 according to an embodiment. Impact report 2400 can be provided in an email, a notification, or as dedicated GUI page within the user's software platform running on his or her mobile device. Impact report 2400 may be generated, for example, by a back end (e.g., entity processor 852) that has been provided with OMDS, POMDS, SWDS, ADS, or a combination thereof and has curated impact report 2400 for a specific user. Impact report 2400 can include title 2410, mission statement 2420, user's monthly summary 2430 (which can report the quantity of organic matter inserted into the OMPA and an approximation of a quantity of $CO_2$ emission averted), and monthly summary for a group of OMPA users 2440 (which can report the quantity of organic matter inserted into a collection of OMPA devices and an approximation of a quantity of $CO_2$ emission averted). It should be understood that impact report 2400 can include a multitude of data, facts, suggestions, etc., and the example shown in FIG. 24 is merely illustrative. For example, impact report 2400 can include OMPA specific facts such as how many times the lid has been opened, how many hours of OMPA processing have been performed, how many jam events have occurred, how much weight in OMPA input has been added, how much weight in OMPA output has been removed, etc. over a fixed period of time (e.g., month, year, lifetime).

FIG. 25 shows an exemplary OMPA output report 2500 according to an embodiment. Output report 2500 can be curated to each OMPA user and can provide specific information related to an OMPA output shipped to an OMPA processor, wherein that OMPA processor evaluated the contents of the OMPA output and generated a POMDS based on that evaluation. As shown, output report 2500 can include title 2510 that identifies the purpose of the report. Report 2500 can include details 2520 regarding the last batch of OMPA output received by the OMPA processor. Details 2520 can specify the date the OMPA output was received and the weight thereof. Details 2520 can also specify whether the OMPA output has been approved or rejected as part of a quality analysis performed by the OMPA processor. Notes section 2530 can provide custom tailored notes with respect to the last batch of OMPA outputs received by the OMPA processor. As shown in this example, the note indicates that the last batch had produce stickers and hard shells contained therein, but such items were able to be removed. In some embodiments, output report 2500 can include a photo of the OMPA output that has been received by an OMPA processor. That is, after the user's OMPA output has been placed on an inspection table, for example, a camera may take a picture of the OMPA output and include that picture with the POMDS. Lifetime report 2540 can provide a lifetime status of OMPA output batches received from a particular user. As shown, lifetime report 2540 shows the number approved batches and their associated weight, the number of batches approved with conditions and their associated weight, and the number of rejected batches, and the total number of batches received and the total weight thereof.

FIG. 26 shows an illustrative process 2600 in which curated reports are generated for specific OMPA users according to an embodiment. Process 2600 can start at step 2610 by receiving, at a back end processor, an organic matter data set (OMDS) from an organic matter processing apparatus (OMPA) indicative of a batch of OMPA output that has been provided to an OMPA processor. The OMPA and the batch of OMPA output are associated with a user, and the OMPA converted OMPA input to the batch of OMPA output. At step 2620, process 2600 can generate, at the back end processor, a first report based on the OMDS that is curated for the user, and transmit the first report to the user, at step 2630. At step 2640, process 2600 can receive, at the back end processor, a processed organic matter data set (POMDS) from the OMPA processor that evaluated the batch of OMPA output. At step 2650, process 2600 can generate, at the back end processor, a second report based on the OMDS and the POMDS that is curated for the user, and transmit the second report to the user, at step 2660.

It should be understood that the steps shown in FIG. 26 are illustrative and the order of the steps may be changed, additional steps may be added, or steps may be omitted. For example, additional checks may be performed by the OMPA itself or by the OMPA processing facility to verify data before it is published in a report. As a specific example, mass data from the OMPA can be inaccurate (e.g., when the device is bumped the scale can read erroneous values). To counter this, the OMPA can use lid open/close events along with a "stabilized mass" algorithm to accurately assess mass additions. The algorithm can track a stable mass value, which is only updated if the mass stays within some threshold for some time period. When the lid opens/closes, the last stable mass reading is read before the lid is opened, and after the lid is closed. The difference between the two mass reading can provide added mass value. If the added mass value exceeds the threshold (e.g., by 20 pounds), then this added mass value can be ignored and not be incorporated into a report. As another example, calculation of cycle impact numbers can be performed by a model that uses the runtime of various components (e.g., heaters, fans, motor, etc.) to compute energy usage. The model can be used in lieu of direct measurement of energy usage, which would require additional hardware (e.g., hall effect sensor) to be installed in the OMPA.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels, and/or various other storage mediums capable of storing that contain or carry instruction(s) and/or data.

Having described several embodiments, it will be recognized by those of skill in the art that various modifications, alternative constructions, and equivalents may be used without departing from the spirit of the invention. Additionally, a number of well-known processes and elements have not been described in order to avoid unnecessarily obscuring the present invention. Accordingly, the above description should not be taken as limiting the scope of the invention.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included.

As used herein and in the appended claims, the singular forms "a", "an", and "the" include plural referents unless the context clearly dictates otherwise. Thus, for example, reference to "a process" includes a plurality of such processes and reference to "the device" includes reference to one or more devices and equivalents thereof known to those skilled in the art, and so forth.

Also, the words "comprise," "comprising," "include," "including," and "includes" when used in this specification and in the following claims are intended to specify the presence of stated features, integers, components, or steps, but they do not preclude the presence or addition of one or more other features, integers, components, steps, acts, or groups.

The following provides a listing of various claim sets focusing on OMPAs and the use thereof. The claims, including the incorporated disclosures, cover various embodiments or configurations, methods, algorithms, and structures related to the embodiments defined herein. Features may be mixed between the various claim sets. Thus, various concepts covered in these claims can be integrated into different embodiments. The statement sets below are organized into different concepts. Each statement can be combined with any other statement. References to "any previous statement" expressly extend beyond just the particular subset of statements but refers to any of the statements below.

Statement 1. A method comprising:

in response to instantiating a client application on a mobile device and authenticating a first user of the mobile device:

transmitting a request for status information from a backend application operable to communicate with an organic matter processing apparatus (OMPA) associated with the first user or directly from the OMPA, the status information indicative of the OMPA;

receiving, in response to the transmitted request, the status information;

evaluating the status information to generate a graphical user interface (GUI) page defined by a GUI page format tree comprising:

a set of status identifiers contextually related to the status information;

a set of icons;

a set of overlays;

a set of user interface elements contextually related to the status information; and a set of client application-executable script elements, each defining a functionality associated with at least a respective one of the set of user interface elements that controls operation of the OMPA; and causing display of the generated GUI page within the client application on a display of the mobile device; and in response to user selection of a first user interface element displayed in the generated GUI page:

executing the functionality associated with the first user interface element by transmitting a commensurate command for executing the functionality on the OMPA to the backend application or to the OMPA.

Statement 2. The method of any previous statement, wherein the status information comprises a ready to process OMPA input status, wherein the generated GUI page comprises a status identifier selected from the set of status identifiers, icons selected from the set of icons, an overlay selected from the set of overlays, and a start OMPA processing user interface element selected from the set of user interface elements; and wherein in response to selection of the start OMPA processing user interface element, executing a start client application-executable script element that causes the OMPA to start an OMPA processing cycle.

Statement 3. The method of any previous statement, wherein the status information comprises an active processing status, wherein the generated GUI page comprises a locked lid icon selected from the set of icons, a time remaining overlay selected from the set of overlays, and a cancel user interface element selected from the set of user interface elements, wherein the time remaining overlay specifies how much time is remaining to finish an active OMPA processing cycle; and wherein in response to selection of the cancel user interface element, executing a cancel client application-executable script element that causes the OMPA to cancel the active OMPA processing cycle.

Statement 4. The method of any previous statement wherein the status information comprises bucket status, wherein the generated GUI page comprises a bucket status identifier selected from the set of status identifiers, an OMPA output collection overlay selected from the set of overlays, and an OMPA output processing user element;

wherein in response to selection of the OMPA output processing user element, executing an OMPA output processing script element that arranges for OMPA output to be shipped to an OMPA processing facility or to be picked up.

Statement 5. The method of any previous statement, wherein the OMPA processing facility analyzes the OMPA output and generates a processing facility data set, and wherein the OMPA processing facility transmits, to the first user, a message comprising content derived from the processing facility data set.

Statement 6. The method of any previous statement, wherein the content includes a quantity metric and a quality metric of the OMPA output.

Statement 7. The method of any previous statement, wherein the status information comprises an error status, wherein the generated GUI page comprises an error status identifier selected from the set of status identifiers.

Statement 8. The method of any previous statement, wherein the generated GUI page comprises an overlay selected from the set of overlays and a cancel user interface element selected from the set of user interface elements; and wherein in response to selection of the cancel user interface element, executing a cancel client application-executable script element that causes the OMPA to cancel the active OMPA processing cycle.

Statement 9. The method of any previous statement, wherein the status information comprises impact calculation status, wherein the generated GUI page comprises impact calculations derived from an OMPA data set.

Statement 10. The method of any previous statement, wherein the impact calculation comprises net $CO_2$ saved by using the OMPA in lieu of allowing the OMPA input to be placed in a landfill.

Statement 11. A computer program product comprising at least one non-transitory computer-readable storage medium having computer-readable program code portions stored therein, the computer-readable program code portions comprising an executable portion configured to perform any of statements 1-10.

Statement 12. An apparatus comprising at least one processor and at least one non-transitory memory comprising program code, the at least one non-transitory memory and the program code configured to, with the at least one processor, cause the apparatus to at least perform any of statements 1-10.

Statement 13. A method comprising:

displaying, on a client device, a device settings screen comprising:

a processing schedule setting element for defining a daily start time for processing organic matter in an organic matter processing apparatus (OMPA) and a lock setting element for activating a lid lock on the OMPA;

in response to receiving, on the client device, user selection of the processing schedule setting element:

displaying a processing schedule configurations screen comprising a time dial for setting the daily start time and a save element;

receiving user input via the time dial to set the daily start; and receiving user selection of the save element to confirm selection of the daily start time;

in response to receiving user selection of the save element, transmitting, via a server or directly to the OMPA, the daily start time to the OMPA associated with an account held by the client device such that the OMPA is configured to begin organic matter processing at the daily start time; and in response to receiving, on the client device, user selection of the lock setting element to activate the lid lock, transmitting a lid lock command to the OMPA such that the OMPA locks a lid.

Statement 14. The method of any previous statement, wherein the lid lock is a kid and pet safety lock that prevents a kid, pet, or unauthorized person from opening the lid of the OMPA.

Statement 15. The method of any previous statement, wherein the OMPA comprises a lock icon, wherein lock icon operative to emulate the lock setting element displayed on the client device.

Statement 16. The method of any previous statement, further comprising:

displaying, on the client device, a setup sequence of GUI pages that prompt a user to setup the OMPA and to connect the OMPA to the client device and to a WiFi router; and displaying, on the OMPA, a status icon that changes depending on the setup sequence.

Statement 17. The method of any previous statement, further comprising:

displaying, on the client device, a GUI guides page comprising a food index GUI element and an educational topics GUI element, wherein the food index GUI element comprises an interactive text box operative to receive user input;

receiving user input via the interactive text box, the user input associated with an OMPA input item; and displaying information pertaining to suitability of the OMPA input item, or portions thereof, for use in the OMPA as OMPA input.

Statement 18. The method of any previous statement, wherein suitability of the OMPA input item, or portions thereof, is classified as one of OK to add to the OMPA, OK to add to the OMPA with caution, and not OK to add to the OMPA.

Statement 19. A computer program product comprising at least one non-transitory computer-readable storage medium having computer-readable program code portions stored therein, the computer-readable program code portions comprising an executable portion configured to perform any one of statements 13-18:

Statement 20. An apparatus comprising at least one processor and at least one non-transitory memory comprising program code, the at least one non-transitory memory and the program code configured to, with the at least one processor, cause the apparatus to at least perform any one of statements 13-18.

Statement 21. A method comprising:

displaying, on a client device, a user configuration settings screen comprising a weight threshold setting for defining a maximum weight of a removable bucket assembly with food grounds contained therein;

receiving the weight threshold via the weight threshold setting;

transmitting the received weight threshold to an organic matter processing apparatus (OMPA), via a server, that is associated with an account held by the client device, wherein the OMPA is configured to monitor a weight of the removable bucket assembly with OMPA output contained therein and send a food grounds ready notice to the client device, via the server, when the monitored weight is at or above the weight threshold;

receiving, on the client device, the food grounds ready notice; and in response to receiving the food ground ready notice, displaying, on the client device, a notification that the food grounds are ready for shipment or collection.

Statement 22. The method of any previous statement, further comprising:

receiving, at the client device, statistics with respect to contents contained in the OMPA, wherein the statistics are obtained by the OMPA; and displaying, on the client device, the received statistics in GUI overlay.

Statement 23. The method of any previous statement, wherein the received statistics displayed in the GUI overly comprise a total mass of the OMPA output.

Statement 24. The method of any previous statement, further comprising:

detecting, at the OMPA, that the removable bucket assembly has been emptied of its contents;

receiving, at the client device, a notice that the contents of the removable bucket assembly have been received by an OMPA processor; and displaying, at the client device, the notice.

Statement 25. The method of any previous statement, wherein the food grounds ready notice is transmitted when the OMPA output satisfies OMPA output conditions and the monitored weight is at or above the weight threshold.

Statement 26. The method of any previous statement, further comprising:

receiving, at client device, an OMPA status code transmitted from the OMPA;

in response to receiving the OMPA status code, accessing memory on the client device to retrieve OMPA status content corresponding to the received OMPA status code;

generating first display content comprising the OMPA status content; and displaying the first display content.

Statement 27. A computer program product comprising at least one non-transitory computer-readable storage medium having computer-readable program code portions stored therein, the computer-readable program code portions comprising an executable portion configured to perform any one of statements 21-26.

Statement 28. An apparatus comprising at least one processor and at least one non-transitory memory comprising program code, the at least one non-transitory memory and the program code configured to, with the at least one processor, cause the apparatus to at least to perform any one of statements 21-26.

Statement 29. A method comprising:

receiving, at a client device, an error status code transmitted from an organic matter processing apparatus (OMPA) that is associated with the client device, wherein the OMPA is experiencing an error event corresponding to the error status code;

in response to receiving the error status code, accessing memory on the client device to retrieve error content that correlates to the error status code;

generating first display content comprising the error content, wherein the error content specifies an issue with the OMPA and a solution to the issue;

displaying the first display content;

receiving, at the client device, a non-error status code transmitted from the OMPA, wherein the OMPA is no longer experiencing the error event;

in response to receiving the non-error status code, accessing memory on the client device to retrieve status content that correlates to the non-error status code;

generating second display content comprising the status content, wherein the status content specifies a current status of the OMPA that is not experiencing an error event; and displaying the second display content.

Statement 30. The method of any previous statement, wherein the error code indicates that a lid to the OMPA is open.

Statement 31. The method of any previous statement, wherein the error code indicates that a bucket assembly is not present within the OMPA.

Statement 32. The method of any previous statement, wherein the error code indicates that the OMPA is offline.

Statement 33. The method of any previous statement, wherein the error code indicates that the OMPA is jammed or is jammed and exceeds a temperature threshold.

Statement 34. The method of any previous statement, further comprising:

receiving, at the client device or at the OMPA, an input indicating that a user has addressed the issue displayed in the first display content, wherein the OMPA self-diagnoses whether the issue has been resolved and transmits another error code or the non-error code based on the self-diagnosis.

Statement 35. A computer program product comprising at least one non-transitory computer-readable storage medium having computer-readable program code portions stored therein, the computer-readable program code portions comprising an executable portion configured to: to perform any one of statements 29-34.

Statement 36. An apparatus comprising at least one processor and at least one non-transitory memory comprising program code, the at least one non-transitory memory and the program code configured to, with the at least one processor, cause the apparatus to at least perform any one of statements 29-34.

Statement 37. A method comprising:

receiving, at a back end processor, an organic matter data set (OMDS) from an organic matter processing apparatus (OMPA) indicative of a batch of OMPA output that has been provided to an OMPA processor, the OMPA and batch of OMPA output being associated with a user, and wherein the OMPA converted OMPA input to the batch of OMPA output;

generating, at the back end processor, a first report based on the OMDS that is curated for the user; and transmitting the first report to the user.

Statement 38. The method of any previous statement, wherein the first report is an impact report including a mass of OMPA output received by the OMPA processor.

Statement 39. The method of any previous statement, wherein the impact report further includes an estimate of how much $CO_2$ has been averted by using the OMPA to convert the OMPA input to the OMPA output.

Statement 40. The method of any previous statement, wherein the first report is emailed to the user or displayed in a software platform of a mobile device associated with the user.

Statement 41. The method of any previous statement, further comprising:

receiving, at the back end processor, a processed organic matter data set (POMDS) from the OMPA processor that evaluated the batch of OMPA output;

generating, at the back end processor, a second report based on the OMDS and the POMDS that is curated for the user; and transmitting the second report to the user.

Statement 42. The method of any previous statement, wherein the second report comprises:

an indication of whether the batch is approved or rejected;

date the OMPA processor received the batch;

mass of the batch; and a note related to the analysis of the batch.

Statement 43. The method of any previous statement, wherein the second report is emailed to the user or displayed in a software platform of a mobile device associated with the user.

Statement 44. A computer program product comprising at least one non-transitory computer-readable storage medium having computer-readable program code portions stored therein, the computer-readable program code portions comprising an executable portion configured to perform any one of statements 37-43.

Statement 45. An apparatus comprising at least one processor and at least one non-transitory memory comprising program code, the at least one non-transitory memory and the program code configured to, with the at least one processor, cause the apparatus to at least perform any one of statements 37-43.

What is claimed is:

1. A method comprising:

in response to instantiating a client application on a mobile device and authenticating a first user of the mobile device:

transmitting a request for status information from a backend application operable to communicate with an organic matter processing apparatus (OMPA) associated with the first user or directly from the OMPA, the status information indicative of the OMPA;

receiving, in response to the transmitted request, the status information;

evaluating the status information to generate a graphical user interface (GUI) page defined by a GUI page format tree comprising:

a set of status identifiers contextually related to the status information;

a set of icons;

a set of overlays;

a set of user interface elements contextually related to the status information; and a set of client application-executable script elements, each defining a functionality associated with at least a respective one of the set of user interface elements that controls operation of the OMPA; and causing display of the generated GUI page within the client application on a display of the mobile device; and in response to user selection of a first user interface element displayed in the generated GUI page:

executing the functionality associated with the first user interface element by transmitting a commensurate command for executing the functionality on the OMPA to the backend application or to the OMPA.

2. The method of claim 1, wherein the status information comprises a ready to process OMPA input status, wherein the generated GUI page comprises a status identifier selected from the set of status identifiers, icons selected from the set of icons, an overlay selected from the set of overlays, and a start OMPA processing user interface element selected from the set of user interface elements; and wherein in response to selection of the start OMPA processing user interface element, executing a start client application-executable script element that causes the OMPA to start an OMPA processing cycle.

3. The method of claim 1, wherein the status information comprises an active processing status, wherein the generated GUI page comprises a locked lid icon selected from the set of icons, a time remaining overlay selected from the set of overlays, and a cancel user interface element selected from the set of user interface elements, wherein the time remaining overlay specifies how much time is remaining to finish an active OMPA processing cycle; and wherein in response to selection of the cancel user interface element, executing a cancel client application-executable script element that causes the OMPA to cancel the active OMPA processing cycle.

4. The method of claim 1, wherein the status information comprises bucket status, wherein the generated GUI page comprises a bucket status identifier selected from the set of status identifiers, an OMPA output collection overlay selected from the set of overlays, and an OMPA output processing user element;

wherein in response to selection of the OMPA output processing user element, executing an OMPA output processing script element that arranges for OMPA output to be shipped to an OMPA processing facility or to be picked up.

5. The method of claim 4, wherein the OMPA processing facility analyzes the OMPA output and generates a processing facility data set, and wherein the OMPA processing facility transmits, to the first user, a message comprising content derived from the processing facility data set.

6. The method of claim 5, wherein the content includes a quantity metric and a quality metric of the OMPA output.

7. The method of claim 1, wherein the status information comprises an error status, wherein the generated GUI page comprises an error status identifier selected from the set of status identifiers.

8. The method of claim 1, wherein the generated GUI page comprises an overlay selected from the set of overlays and a cancel user interface element selected from the set of user interface elements; and wherein in response to selection of the cancel user interface element, executing a cancel client application-executable script element that causes the OMPA to cancel the active OMPA processing cycle.

9. The method of claim 1, wherein the status information comprises impact calculation status, wherein the generated GUI page comprises impact calculations derived from an OMPA data set.

10. The method of claim 9, wherein the impact calculation comprises net $CO_2$ saved by using the OMPA in lieu of allowing the OMPA input to be placed in a landfill.

11. A computer program product comprising at least one non-transitory computer-readable storage medium having computer-readable program code portions stored therein, the computer-readable program code portions comprising an executable portion configured to:

in response to instantiating a client application on a mobile device and authenticating a first user of the mobile device:

transmit a request for status information from a backend application operable to communicate with an organic matter processing apparatus (OMPA) associated with the first user or directly from the OMPA, the status information indicative of the OMPA;

receive, in response to the transmitted request, the status information;

evaluate the status information to generate a graphical user interface (GUI) page defined by a GUI page format tree comprising:

a set of status identifiers contextually related to the status information;

a set of icons;

a set of overlays;

a set of user interface elements contextually related to the status information; and a set of client application-executable script elements, each defining a functionality associated with at least a respective one of the set of user interface elements that controls operation of the OMPA; and cause display of the generated GUI page within the client application on a display of the mobile device; and in response to user selection of a first user interface element displayed in the generated GUI page:

execute the functionality associated with the first user interface element by transmitting a commensurate command for executing the functionality on the OMPA to the backend application or to the OMPA.

12. The computer program product of claim 11, wherein the status information comprises a ready to process OMPA input status, wherein the generated GUI page comprises a status identifier selected from the set of status identifiers, icons selected from the set of icons, an overlay selected from the set of overlays, and a start OMPA processing user interface element selected from the set of user interface elements; and wherein in response to selection of the start OMPA processing user interface element, the computer-readable program code portions comprise the executable portion configured to execute a start client application-executable script element that causes the OMPA to start an OMPA processing cycle.

13. The computer program product of claim 11, wherein the status information comprises an active processing status, wherein the generated GUI page comprises a locked lid icon selected from the set of icons, a time remaining overlay selected from the set of overlays, and a cancel user interface element selected from the set of user interface elements, wherein the time remaining overlay specifies how much time is remaining to finish an active OMPA processing cycle; and wherein in response to selection of the cancel user interface element, the computer-readable program code portions comprise the executable portion configured to execute a cancel client application-executable script element that causes the OMPA to cancel the active OMPA processing cycle.

14. The computer program product of claim 11, wherein the status information comprises bucket status, wherein the generated GUI page comprises a bucket status identifier selected from the set of status identifiers, an OMPA output collection overlay selected from the set of overlays, and an OMPA output processing user element;

wherein in response to selection of the OMPA output processing user element, the computer-readable program code portions comprise the executable portion configured to execute an OMPA output processing script element that arranges for OMPA output to be shipped to an OMPA processing facility or to be picked up.

15. The computer program product of claim 14, wherein the OMPA processing facility analyzes the OMPA output and generates a processing facility data set, and wherein the OMPA processing facility transmits, to the first user, a message comprising content derived from the processing facility data set.

16. The computer program product of claim 15, wherein the content includes a quantity metric and a quality metric of the OMPA output.

17. The computer program product of claim 11, wherein the status information comprises an error status, wherein the generated GUI page comprises an error status identifier selected from the set of status identifiers.

18. The computer program product of claim 11, wherein the generated GUI page comprises an overlay selected from the set of overlays and a cancel user interface element selected from the set of user interface elements; and wherein in response to selection of the cancel user interface element, the computer-readable program code portions comprise the executable portion configured to execute a cancel client application-executable script element that causes the OMPA to cancel the active OMPA processing cycle.

19. The computer program product of claim 11, wherein the status information comprises impact calculation status, wherein the generated GUI page comprises impact calculations derived from an OMPA data set.

20. An apparatus comprising at least one processor and at least one non-transitory memory comprising program code, the at least one non-transitory memory and the program code configured to, with the at least one processor, cause the apparatus to at least:

in response to instantiating a client application on a mobile device and authenticating a first user of the mobile device:

transmit a request for status information from a backend application operable to communicate with an organic matter processing apparatus (OMPA) associated with the first user or directly from the OMPA, the status information indicative of the OMPA;

receive, in response to the transmitted request, the status information;

evaluate the status information to generate a graphical user interface (GUI) page defined by a GUI page format tree comprising:

a set of status identifiers contextually related to the status information;

a set of icons;

a set of overlays;

a set of user interface elements contextually related to the status information; and a set of client application-executable script elements, each defining a functionality associated with at least a respective one of the set of user interface elements that controls operation of the OMPA; and cause display of the generated GUI page within the client application on a display of the mobile device; and in response to user selection of a first user interface element displayed in the generated GUI page:

execute the functionality associated with the first user interface element by transmitting a commensurate command for executing the functionality on the OMPA to the backend application or to the OMPA.

21. The apparatus of claim 20, wherein the status information comprises a ready to process OMPA input status, wherein the generated GUI page comprises a status identifier selected from the set of status identifiers, icons selected from the set of icons, an overlay selected from the set of overlays, and a start OMPA processing user interface element selected from the set of user interface elements; and wherein in response to selection of the start OMPA processing user interface element, the at least one non-transitory memory and the program code are configured to, with the at least one processor, cause the apparatus to execute a start client application-executable script element that causes the OMPA to start an OMPA processing cycle.

22. The apparatus of claim 20, wherein the status information comprises an active processing status, wherein the generated GUI page comprises a locked lid icon selected from the set of icons, a time remaining overlay selected from the set of overlays, and a cancel user interface element selected from the set of user interface elements, wherein the time remaining overlay specifies how much time is remaining to finish an active OMPA processing cycle; and wherein in response to selection of the cancel user interface element, the at least one non-transitory memory and the program code are configured to, with the at least one processor, cause the apparatus to execute a cancel client application-executable script element that causes the OMPA to cancel the active OMPA processing cycle.

23. The apparatus of claim 20, wherein the status information comprises bucket status, wherein the generated GUI page comprises a bucket status identifier selected from the set of status identifiers, an OMPA output collection overlay selected from the set of overlays, and an OMPA output processing user element;

wherein in response to selection of the OMPA output processing user element, the at least one non-transitory memory and the program code are configured to, with the at least one processor, cause the apparatus to execute an OMPA output processing script element that arranges for OMPA output to be shipped to an OMPA processing facility or to be picked up.

24. The apparatus of claim 20, wherein the status information comprises an error status or impact calculation status, wherein the generated GUI page comprises an error status identifier selected from the set of status identifiers or impact calculations derived from an OMPA data set, and wherein the generated GUI page comprises an overlay selected from the set of overlays and a cancel user interface element selected from the set of user interface elements; and wherein in response to selection of the cancel user interface element, the at least one non-transitory memory and the program code are configured to, with the at least one processor, cause the apparatus to execute a cancel client application-executable script element that causes the OMPA to cancel the active OMPA processing cycle.

* * * * *